(12) United States Patent
Takayama et al.

(10) Patent No.: US 6,621,592 B1
(45) Date of Patent: Sep. 16, 2003

(54) DATA STORAGE CONTROL APPARATUS AND DATA STORAGE CONTROL METHOD

(75) Inventors: Makoto Takayama, Yokohama (JP); Yoshinori Abe, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/309,493

(22) Filed: May 11, 1999

(30) Foreign Application Priority Data

| May 13, 1998 | (JP) | ............................................. 10-146726 |
| Jul. 15, 1998 | (JP) | ........................................... 10-200370 |
| Sep. 9, 1998 | (JP) | ........................................... 10-255139 |

(51) Int. Cl.$^7$ ........................... G06F 15/00; H04N 1/21; H04N 1/23; H04N 1/40
(52) U.S. Cl. ...................... 358/1.16; 358/1.15; 358/1.17; 358/404; 358/426.05; 358/444; 358/296; 358/300; 358/301; 358/305
(58) Field of Search ............................... 358/1.15, 1.16, 358/1.17, 296, 300, 301, 305, 404, 426.05, 444

(56) References Cited

U.S. PATENT DOCUMENTS

| 5,371,793 | A | * | 12/1994 | Kimura | ....................... 713/193 |
| 5,548,740 | A | * | 8/1996 | Kiyohara | ...................... 345/543 |
| 6,437,875 | B1 | * | 8/2002 | Unno | ....................... 358/1.16 |
| 6,480,296 | B1 | * | 11/2002 | Ozaki | ....................... 358/1.16 |
| 2002/0048046 | A1 | * | 4/2002 | Unno | ....................... 358/1.16 |

* cited by examiner

*Primary Examiner*—Edward Coles
*Assistant Examiner*—Monica Mitchell
(74) *Attorney, Agent, or Firm*—Fitzpatrick, Cella, Harper & Scinto

(57) ABSTRACT

To provide data storage control apparatus and method capable of performing plural processes including processes that data are required to be processed in real time, without increasing cost and decreasing productivity, a RAM for storing data, a hard disk (HD) for storing data, a printer for printing an image, a scanner for reading an image, a facsimile for performing memory transmission/reception, and a CPU are provided. The CPU performs control to use the RAM if high speed is required and capacity is not so required, to use a high-speed accessible area in the HD if predetermined speed is required and capacity is required, and to use a low-speed accessible area in the HD if required speed may be low and capacity is required. In the control unit of a copying machine having the HD including plural storage areas of different access speeds, the predetermined storage area is selected from among these areas according to the purpose of image data to be stored in the HD, and the data is stored in the selected area. To increase the productivity of the process that the data are required to be processed in real time, the control unit performs control that a dummy access to the HD is automatically performed according as a second predetermined time shorter than a first predetermined time elapses from a time when the access to the HD terminates, so as to maintain rotation of the HD.

46 Claims, 35 Drawing Sheets

| LBA MODE | DISK FACE | ZONE |
|---|---|---|
| 0 | 0 | 0 |
|  | 1 | 0 |
|  | 2 | 0 |
|  | 3 | 0 |
|  | 0 | 1 |
|  | 1 | 1 |
|  | 2 | 1 |
|  | 3 | 1 |
|  | 0 | 2 |
|  | ⋮ | ⋮ |

FIG. 32

| WORD | VALUE | MEANING |
|---|---|---|
| 0 | | |
| 1 | 13DE (HEX)<br>5086 | THE NUMBER OF CYLINDERS |
| 3 | 0010 (HEX)<br>16 | THE NUMBER OF HEADS |
| 6 | 003F (HEX)<br>63 | THE NUMBER OF SECTORS FOR EACH TRACK |
| ⋮ | | |
| 61—62 | 4E3B34 (HEX)<br>5126964 | THE TOTAL NUMBER OF USER-ACCESSIBLE SECTORS |
| ⋮ | | |
| 160—255 | | RESERVE |

DATA STORAGE CONTROL APPARATUS AND DATA STORAGE CONTROL METHOD

BACKGROUND OF THE INVENTION

1. Field of the Invention

The present invention relates to data storage control apparatus and method which perform a data writing process and a data reading process for a storage medium.

2. Related Background Art

In recent years, a multifunctional peripheral (MFP) such as a digital multifunctional apparatus having plural functions, e.g., a copying function, a facsimile (FAX) function, a printer function, a scanner function and the like became widespread. Such the apparatus has been developed in a style that a conventional monofunctional apparatus is added with another function. For example, a copying machine added with the FAX function, a FAX machine added with the printer function have been developed.

Therefore, the MFP having such the plural functions as above uses an image data memory and a system memory for each function. For example, in the copying function (including later-described electronic sort function), a memory for storing the image data to be subjected to copying rotation and image reduction layout, a memory for storing the image data to be used for an electronic sorter, and a hard disk (HD) are used. In the FAX function, a memory for performing memory transmission, memory reception and a printing image rotation process, and an HD are used. In the printer function, a memory for storing the image data to be subjected to spooling (i.e., simultaneous peripheral operation online) of PDL (page description language) data and electronic sort printing, and an HD are used. In the scanner function, a memory for storing all documents on a feeder, and an HD are used.

As above, in the conventional MFP, since the image data memory and the system memory are provided for each function, there has been a problem that the cost of the MFP increases according to the prices of lots of memories.

Therefore, in order to improve such a conventional state, it has been thought that the plural memories are made common to the plural functions.

However, if the structure that the required image data memory and the required system memory are common to the respective functions of the MFP is applied, it is necessary to construct the memory with a high-speed random access memory (RAM) to obtain satisfactory writing/reading speed for the memory used in each function of the MFP. Further, to store a large-capacity document, the large-capacity high-speed RAM is necessary. Thus, there is a problem that the cost of the system increases.

Further, if the structure that the required image data memory and the system memory common to each function of the MFP are provided with low-cost storage media such as HD's is applied, since it is impossible to obtain the satisfactory writing/reading speed for the memory used in each function of the MFP, there is a problem that system productivity deteriorates.

In recent years, there has been a digital copying machine having a large-capacity HD. Such the large-capacity HD is used to mainly execute an electronic sort function.

The electronic sort function is to read the images of all the originals to be copied, store the image data obtained from the read images in the HD, repeatedly read the image data in the order of page, and print out the read data. Thus, even if the copying machine does not have a mechanical sorter including plural bins, it is possible to discharge copying paper sheets in a sorted state.

Further, a mailbox function has been proposed in recent years. The mailbox function is to divide the storage area of the HD into plural areas each corresponding to each user, once store the image data received from a host computer at the area (i.e., mailbox) indicated by the host computer, and print out the image data from the mailbox. If the user inputs from an operation unit a password to access his own area, the image stored in the corresponding mailbox is printed out. Thus, since the image in the mailbox of one user can not be printed out by the copying machine without his permission, there is no fear that the image data in the mailbox of one user is viewed by the other users.

Further, a form synthesis function has been proposed. The form synthesis function is to previously store in the HD plural form images (i.e., tables and illustrations) as registration images, synthesize or composite the form image and an image read by the scanner, and print out the synthesized image.

In the digital copying machine having such the plural functions as above, a general-purpose HD ordinarily used in a computer or the like is used.

The general-purpose HD applies a zone bit recording system. Hereinafter, the zone bit recording system will be explained with reference to FIG. 26. The disk of the HD is divided into 16 to 20 areas in accordance with its recording density, and each area is called a zone. In this system, the quantity of the data stored at the outer circumference (i.e., zone 0 side) of the disk is made larger than that of the data stored at the inner circumference (i.e., zone 15 side) thereof. Therefore, processing speed in case of accessing the outer circumference is higher than that in case of accessing the inner circumference.

For this reason, in order to obtain access speed according to the process such as the electronic sort function in which it is required to perform the operations in real time, the digital copying machine uses only the outer circumference of the HD at which access speed is high because of the zone bit recording system.

However, since the digital copying machine having the plural functions including the electronic sort function merely uses only the outer circumference of the HD, efficiency in use of the HD is low. For this reason, in order to perform plural processes, it is necessary to use a HD having a too large capacity or use plural HD's, thereby increasing the cost.

Further, the general-purpose HD used in the computer or the like provided in such the digital copying machine as above has an automatic power-down function. Hereinafter, the automatic power-down function will be explained with reference to FIG. 34 which illustrates a state transition of the HD.

In the drawing, an active state 3561 is the state that the HD is operating (i.e., being accessed), and an idle state 3562 is the process wait state. Since a spindle motor for rotatively driving the HD is being driven in the idle state 3562, this state can immediately change into the active state 3561. The idle state 3562 is the state that it is possible to immediately start to access the HD. Further, the HD is of course operating in the active state 3561, whereby no time is necessary before the access to the HD starts. A standby state 3563 is the state that the spindle motor completely stops. Further, a sleep state 3564 is the state that the spindle motor completely stops and a power supply also stops.

The above state transition is determined according to standardized commands concerning the HD or specifications peculiar to the HD.

If the access to the HD (i.e., data writing/reading to/from HD) is not performed for a predetermined time, such the general-purpose HD automatically changes its state from the active state 3561 or the idle state 3562 into the standby state 3563, whereby the spindle motor for rotatively driving the HD stops.

However, if it accesses the HD in the standby state, it is necessary to start the spindle motor which has completely stopped. Thus, a time (about 20 seconds) to start the spindle motor is necessary when the access to the HD starts.

For this reason, in case of performing the process such as the electronic sort function in which it is required to perform the operations in real time, if the HD is in the standby state, it is impossible to immediately start the access to the HD, whereby process efficiency is low. Thus, there is some fear that such a drawback influences productivity.

SUMMARY OF THE INVENTION

An object of the present invention is to provide a data storage control apparatus and a data storage control method which solved the above problems.

Another object of the present invention is to provide a data storage control apparatus and a data storage control method which can prevent an increase of cost, and can also perform plural processes including the process in which it is required to perform operations in real time, without decreasing productivity.

Still another object of the present invention is to provide a data storage control apparatus and a data storage control method which can increase the productivity in the process in which it is required to perform the processes in real time.

Other objects and features of the present invention will become apparent from the following detailed description and the attached drawings.

BRIEF DESCRIPTION OF THE DRAWINGS

FIG. 32 is a view showing a table concerning device information of the HD according to the third embodiment;

DETAILED DESCRIPTION OF THE PREFERRED EMBODIMENTS

[1] First Embodiment

Figure 1:
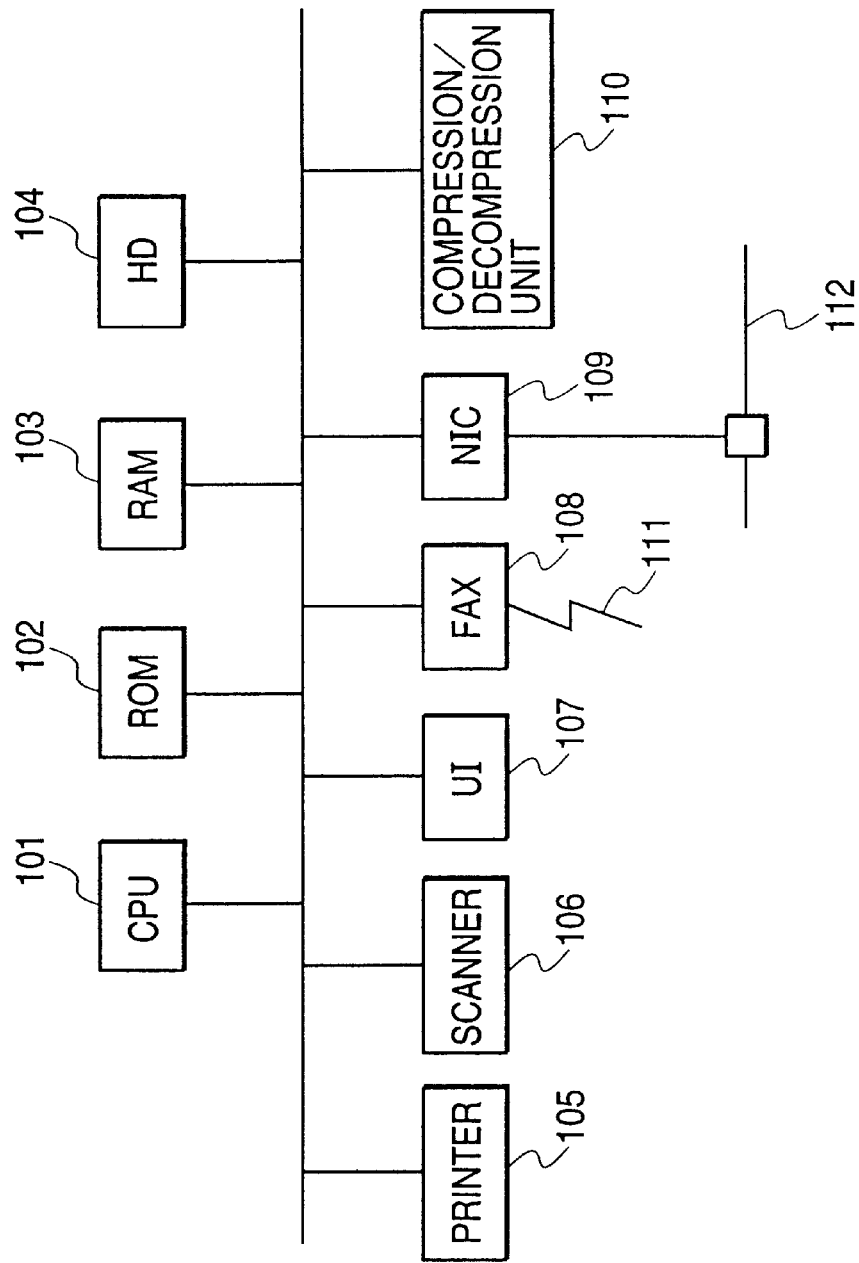
FIG. 1 is a block diagram showing the entire structure of an MFP according to the first embodiment of the present invention.

FIG. 1 is a block diagram showing the entire structure of an MFP according to the first embodiment. This MFP has plural functions such as a copying function, a FAX function, a printer function and a scanner function. Further, the structure of the MFP includes a central processing unit (CPU) 101, a read only memory (ROM) 102, a RAM 103, an HD 104, a printer 105, a scanner 106, a user interface (UI) 107, a FAX 108, a network interface card (NIC) 109, and a compression/decompression unit 110. In the drawing, numerals 111 and 112 denote a line and a network, respectively.

Hereinafter, the structure of each unit will be explained in detail. The CPU 101 controls an entire system, and performs the processes shown in later-described flow charts of FIGS. 2 to 10 and FIG. 13 on the basis of a control program stored in the ROM 102. The ROM 102 stores the control program of the CPU 101, fixed data and the like. The RAM 103 temporarily stores various data, and is used as a working memory for the CPU 101.

The HD 104 is used to store various data, the printer 105 prints and outputs an image under the control of the CPU 101, and the scanner 106 scans and reads an image from an original. The UI 107 composed of a keyboard, a pointing device and the like is used to input various instructions and various data. The FAX 108 performs FAX communication with an external apparatus through the line 111, and the NIC 109 performs communication control between the MFP and the network 112. The compression/decompression unit 110 compresses image data and decompresses the compressed image data.

Subsequently, a copying operation (in copying mode), a FAX operation (in FAX mode), a printing operation (in printer mode) and a scan operation (in scanner mode) of the MFP according to the present embodiment as structured above will be explained with reference to the flow charts shown in FIGS. 2 to 10 and 13 and explanatory views shown in FIGS. 11 and 12.

Figure 2:
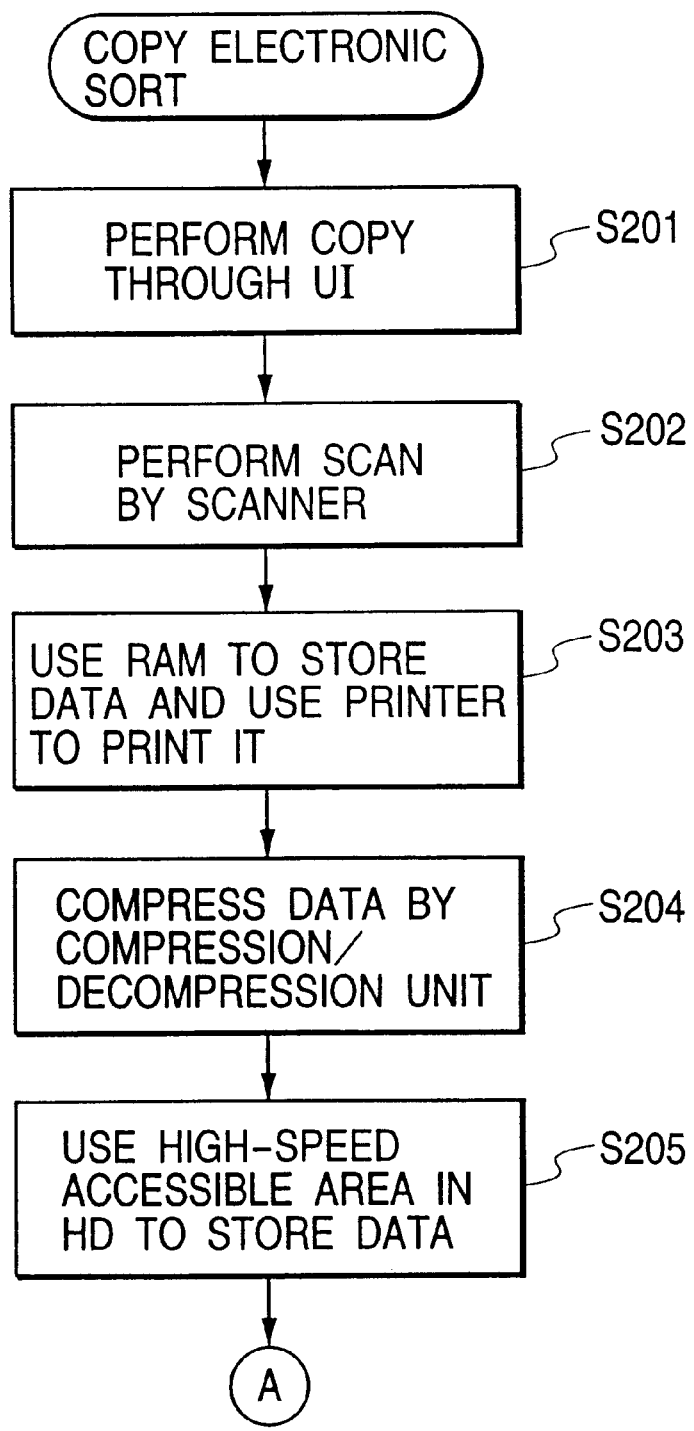
FIG. 2 is a flow chart showing a copying electronic sort process by the MFP according to the first embodiment.
Figure 3:
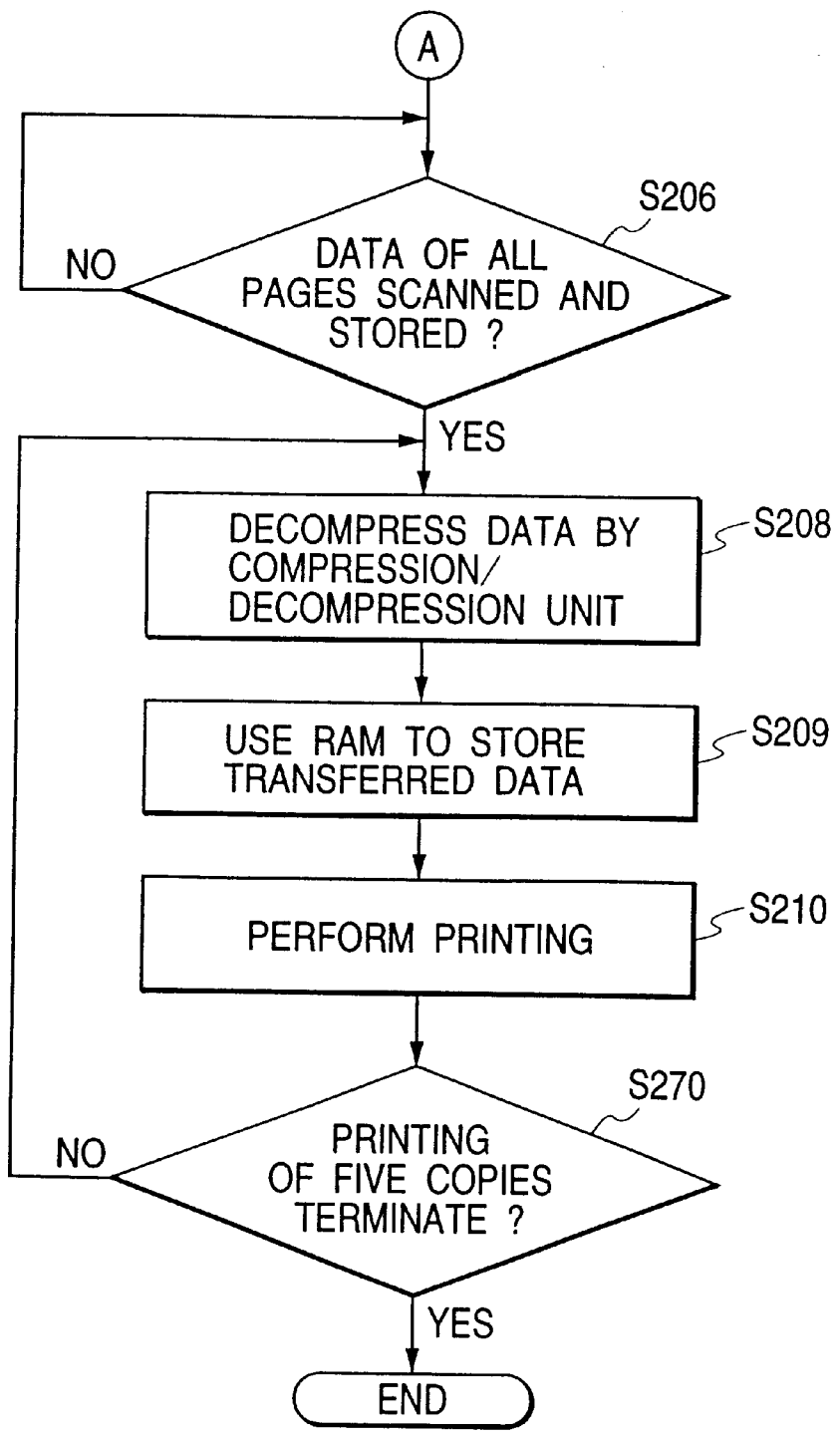
FIG. 3 is a flow chart showing the copying electronic sort process by the MFP according to the first embodiment.

FIGS. 2 and 3 are the flow charts showing the process (i.e., process in copying mode) by a copying electronic sorter function of the MFP according to the first embodiment. For example, these drawings show, e.g., a sequence to form five copies of prints one by one.

If an operator performs the copying operation through the UI 107 (step S201), then the scanner 106 scans the original put on a feeder to convert a scanned image into electronic data (step S202). As the CPU 101 stores the original data into the RAM 103 in synchronism with data transfer speed of the scanner 106, it transfers the original data to the printer 105 in synchronism with printing speed, whereby the printer 105 prints the transferred data (step S203). Further, the CPU 101 causes the compression/decompression unit 110 to compress the original data stored in the RAM 103 (step S204), and then stores the compressed data at a high-speed data accessible area in the HD 104 (step S205).

If the data of all the originals put on the feeder are scanned and read by the scanner 106 and the data storage into the HD 104 terminates ("YES" in step S206), then the CPU 101 fetches the scanned original data for each copy from the HD 104 and causes the compression/decompression unit 110 to decompress the fetched data (step S208). Further, the CPU 101 transfers the decompressed data to the RAM 103 (step S209), and then transfers the data from the RAM 103 to the printer 105 in synchronism with the printing speed, whereby the printer prints the transferred data (step S210). After then, it is judged whether or not the printing of the five copies terminates (step S270). If judged that such the printing does not terminate, then the flow returns to the step S208. On the other hand, if judged that such the printing terminates, a series of processes terminates.

As described above, in the case where the data synchronous with the scanner 106 or the printer 105 is used, the RAM 103 enough for the access speed is used. For example, if it is assumed that an image formation apparatus of which recording speed is 60 sheets/minute at A4 size is used, the access speed required in this case is at least about 4 Mbyte×2=8 Mbyte/sec or more. Further, in the case where the compressed data of the original of which speed is not so high (e.g., access speed required in this case is about 6 Mbyte/sec) is used and the quantity of the data is large, a high-speed data transfer area in the HD 104 is used.

Figure 4:
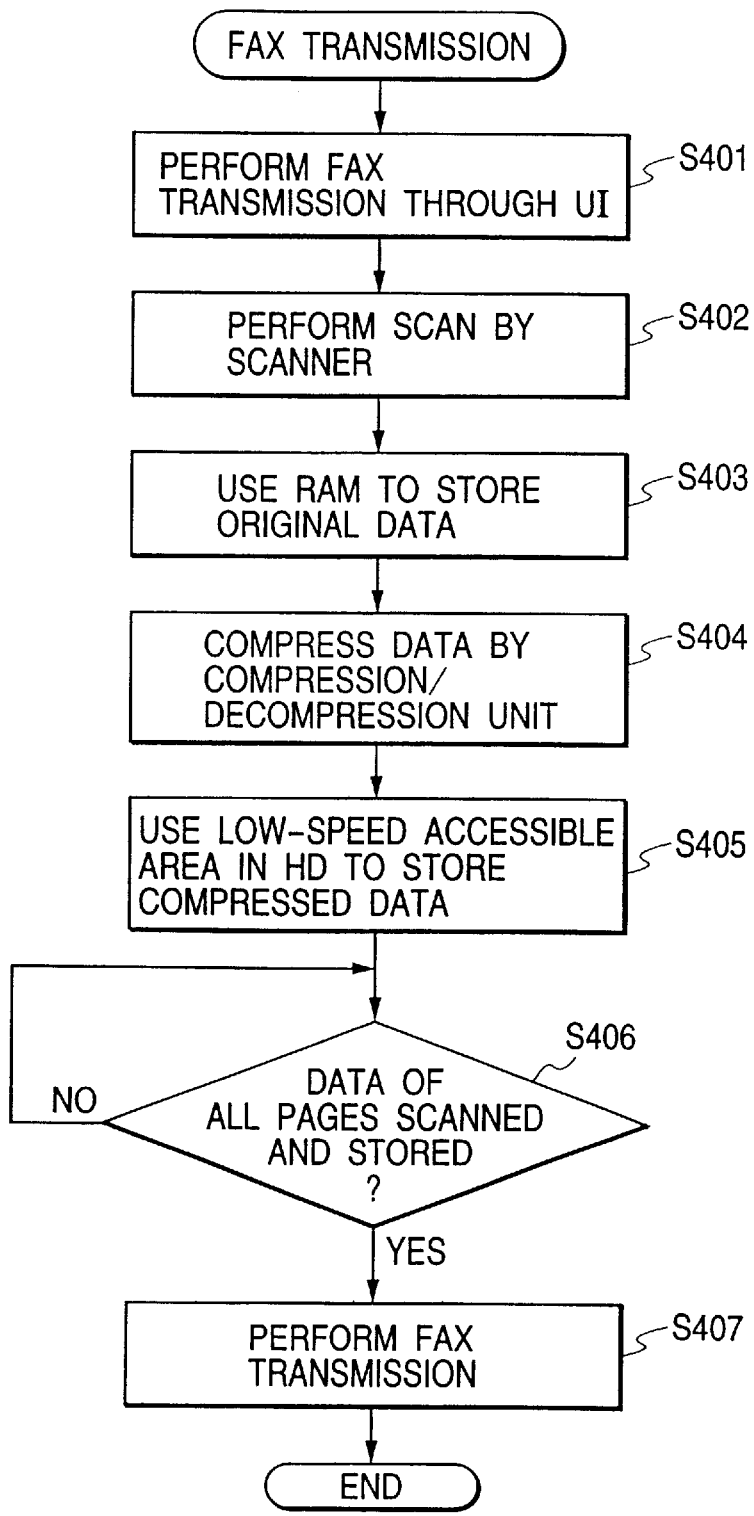
FIG. 4 is a flow chart showing a FAX memory transmission process by the MFP according to the first embodiment.

FIG. 4 is the flow chart showing a memory transmission process in the FAX mode by the MFP according to the first embodiment.

If the operator performs the FAX transmission operation through the UI 107 (step S401), then the scanner 106 scans the original put on the feeder to convert the scanned image into the electronic data (step S402). Subsequently, the CPU 101 stores the original data into the RAM 103 in synchronism with the data transfer speed of the scanner 106 (step S403). Further, the CPU 101 causes the compression/decompression unit 110 to compress the original data stored in the RAM 103 (step S404), and then stores the compressed data at a low-speed data accessible area in the HD 104 (step S405).

If the data of all the originals put on the feeder are scanned and read by the scanner 106 and the data storage into the HD 104 terminates ("YES" in step S406), then the CPU 101 fetches the scanned original data from the HD 104 and causes the FAX 108 to transfer the fetched data to the line 111 (step S407). Thus, the memory transmission of the FAX 108 terminates.

As described above, in the case where the data synchronous with the scanner 106 is used, the RAM 103 enough for the access speed is used. Further, in the case where the compressed data of the original is used and the data transfer speed necessary for the communication line of the FAX 108 is not so high (e.g., access speed is about 4 Mbyte/sec), the low-speed data transfer area in the HD 104 is used.

Figure 5:
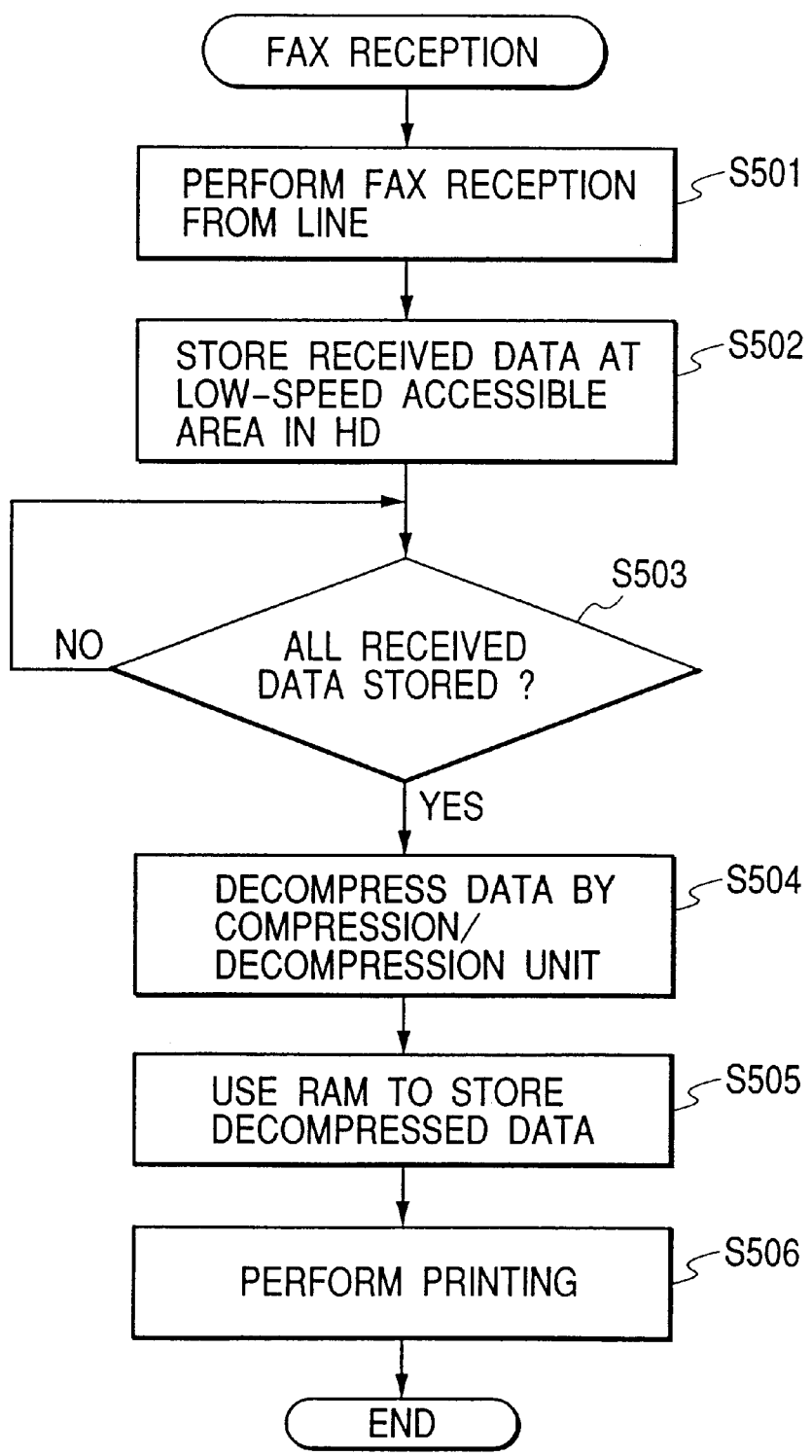
FIG. 5 is a flow chart showing a FAX memory reception process by the MFP according to the first embodiment.

FIG. 5 is the flow chart showing a memory reception process in the FAX mode by the MFP according to the first embodiment.

If the FAX 108 receives the data from the line 111 (step S501), then the CPU 101 stores the received data at the low-speed data transfer area in the HD 104 (step S502). Subsequently, if all the received data are stored in the HD 104 ("YES" in step S503), then the CPU 101 reads the received data from the HD 104 and causes the compression/decompression unit 110 to decompress the read data (step S504). Further, CPU 101 writes the decompressed data into the RAM 103 (step S505), the printer 105 outputs the written data (step S506), and the memory reception by the FAX 108 terminates.

As described above, in the case where the FAX image is received from the line 111, since the data speed (or data rate) is not so high, the low-speed data transfer area in the HD 104 is used. Further, in the case where the data is output in synchronism with the printer 105, the RAM 103 enough for the access speed required for such the process is used.

Figure 6:
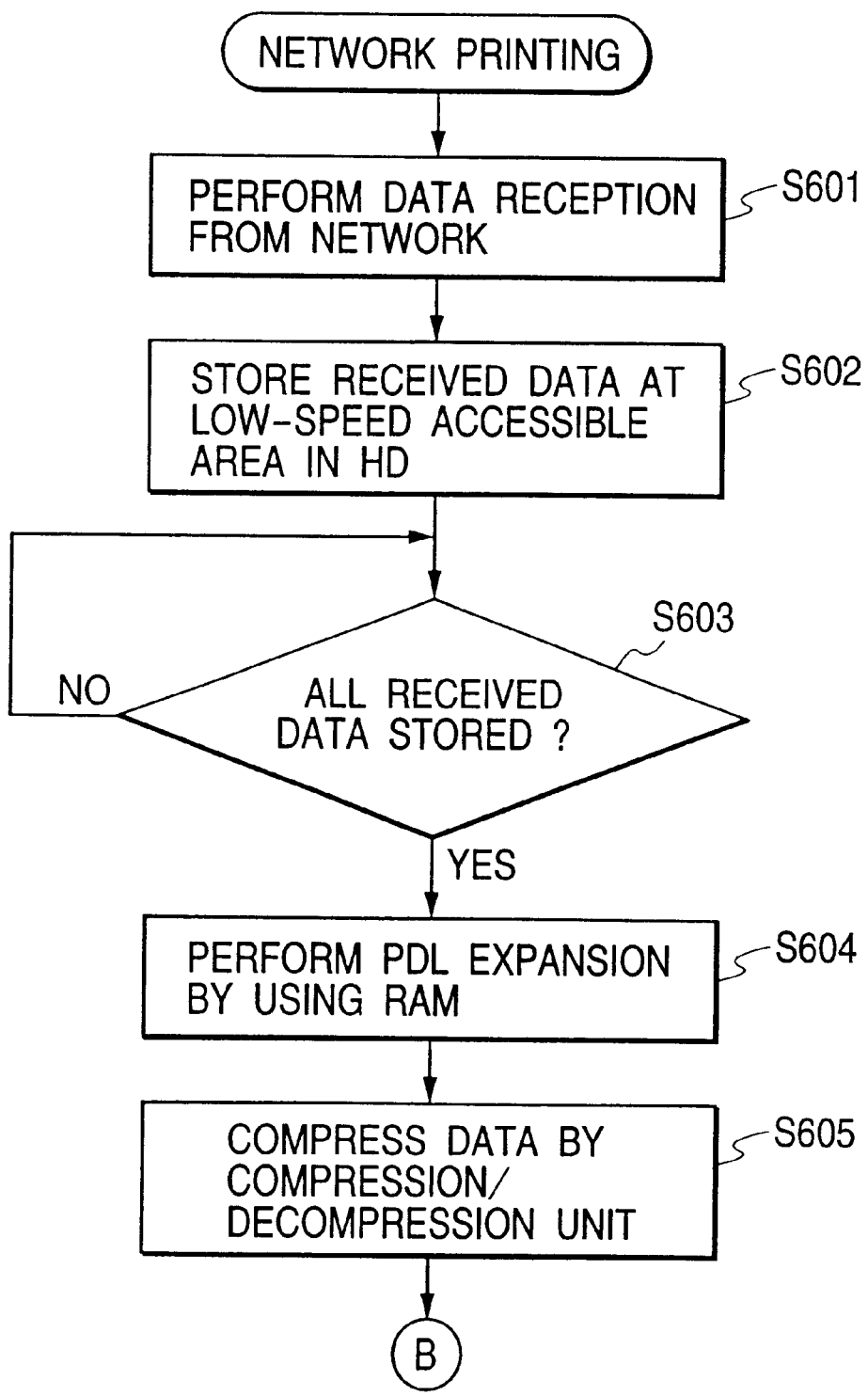
FIG. 6 is a flow chart showing a network printing process by the MFP according to the first embodiment.
Figure 7:
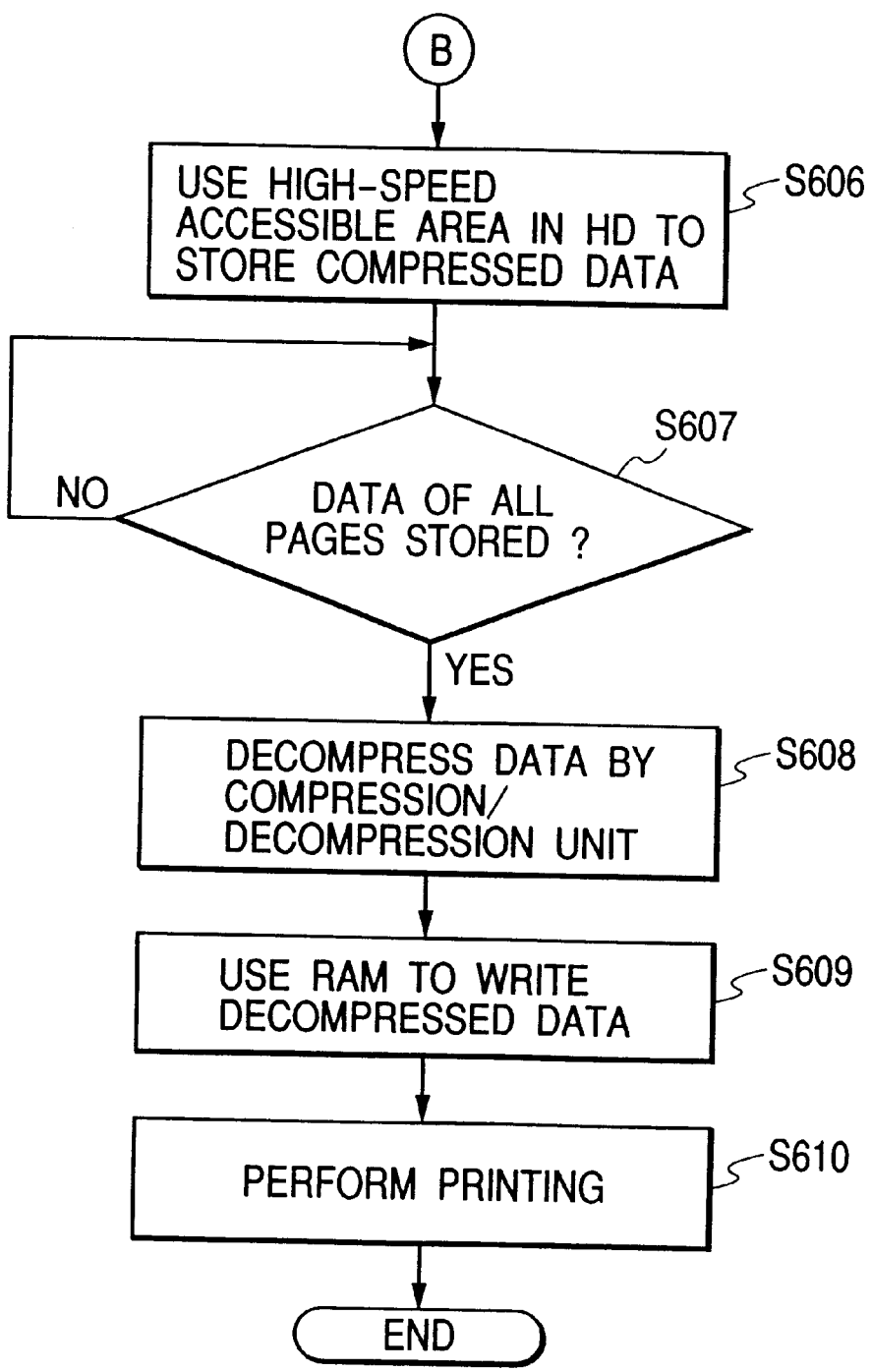
FIG. 7 is a flow chart showing the network printing process by the MFP according to the first embodiment.

FIGS. 6 and 7 are the flow charts showing a network printing process (i.e., process in printer mode) by the MFP according to the first embodiment.

If the NIC 109 receives PDL data from the network 112 (step S601), then the CPU 101 stores the received data at the low-speed data transfer area in the HD 104 (step S602). If the CPU 101 stores all the received data into the HD 104 ("YES" in step S603), then the CPU 101 expands the PDL data in the RAM 103 (step S604) and causes the compression/decompression unit 110 to compress the expanded data (step S605). Further, the CPU 101 stores the compressed data at the high-speed data transfer area in the HD 104 (step S606).

If all the expanded PDL data are stored into the HD 104 ("YES" in step S607), then the CPU 101 causes the compression/decompression unit 110 to decompress the data (step S608) and writes the decompressed data into the RAM 103 (step S609). Further, the CPU 101 causes the printer 105 to output the data (step S610), and the network printing process terminates.

As described above, in the case where the data synchronous with the printer 105 is used, the RAM 103 enough for the data transfer speed is used. Further, in the case where the compressed PDL data of which transfer speed is not so high and of which quantity is large is used, the high-speed data transfer area in the HD 104 is used. On the other hand, if the PDL data from the network 112 of which data speed (or data rate) is not so high and of which quantity is large is used, the low-speed data transfer area in the HD 104 is used.

Figure 8:
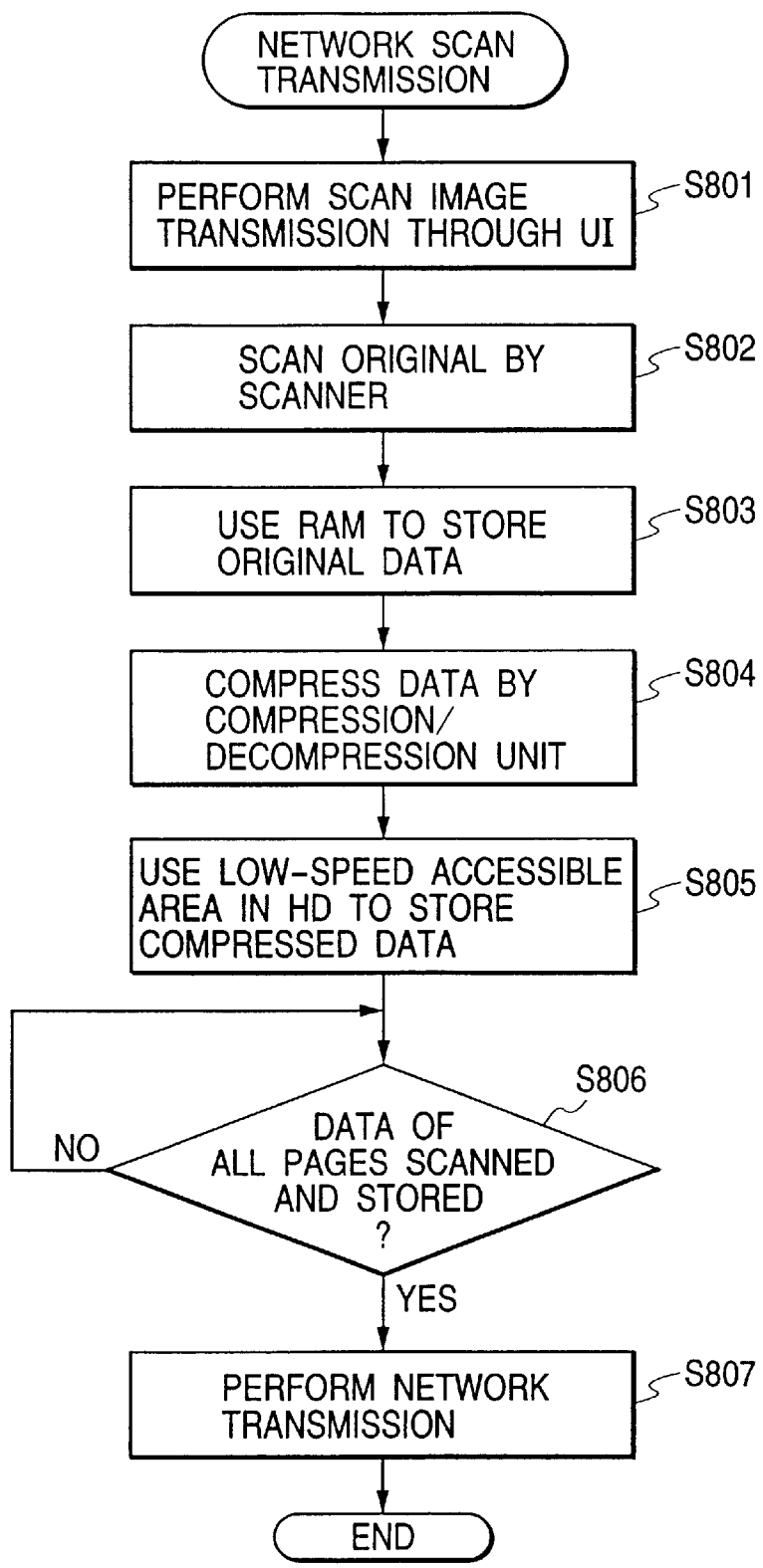
FIG. 8 is a flow chart showing a network scan transmission process by the MFP according to the first embodiment.

FIG. 8 is the flow chart showing a network scan transmission process (i.e., transmission process in scanner mode) by the MFP according to the first embodiment.

If the operator performs a scan image transmission operation through the UI 107 (step S801), then the scanner 106 scans the original put on the feeder to convert the scanned image into the electronic data (step S802). Subsequently, the CPU 101 stores the original data into the RAM 103 in synchronism with the data transfer speed of the scanner 106 (step S803). Further, the CPU 101 causes the compression/decompression unit 110 to compress the original data stored in the RAM 103 (step S804), and then stores the compressed data at the low-speed data accessible area in the HD 104 (step S805).

If the data of all the originals put on the feeder are scanned and read by the scanner 106 and the data storage into the HD 104 terminates ("YES" in step S806), then the CPU 101 fetches the scanned original data from the HD 104 and causes the NIC 109 to transfer the fetched data to the network 112 (step S807). Thus, the network scan transmission process terminates.

As described above, in the case where the data synchronous with the scanner 106 is used, the RAM 103 enough for the data access speed is used. Further, in the case where the compressed data of the original is used and the data transfer speed thereof necessary for the network communication is not so high, the low-speed data transfer area in the HD 104 is used.

Figure 9:
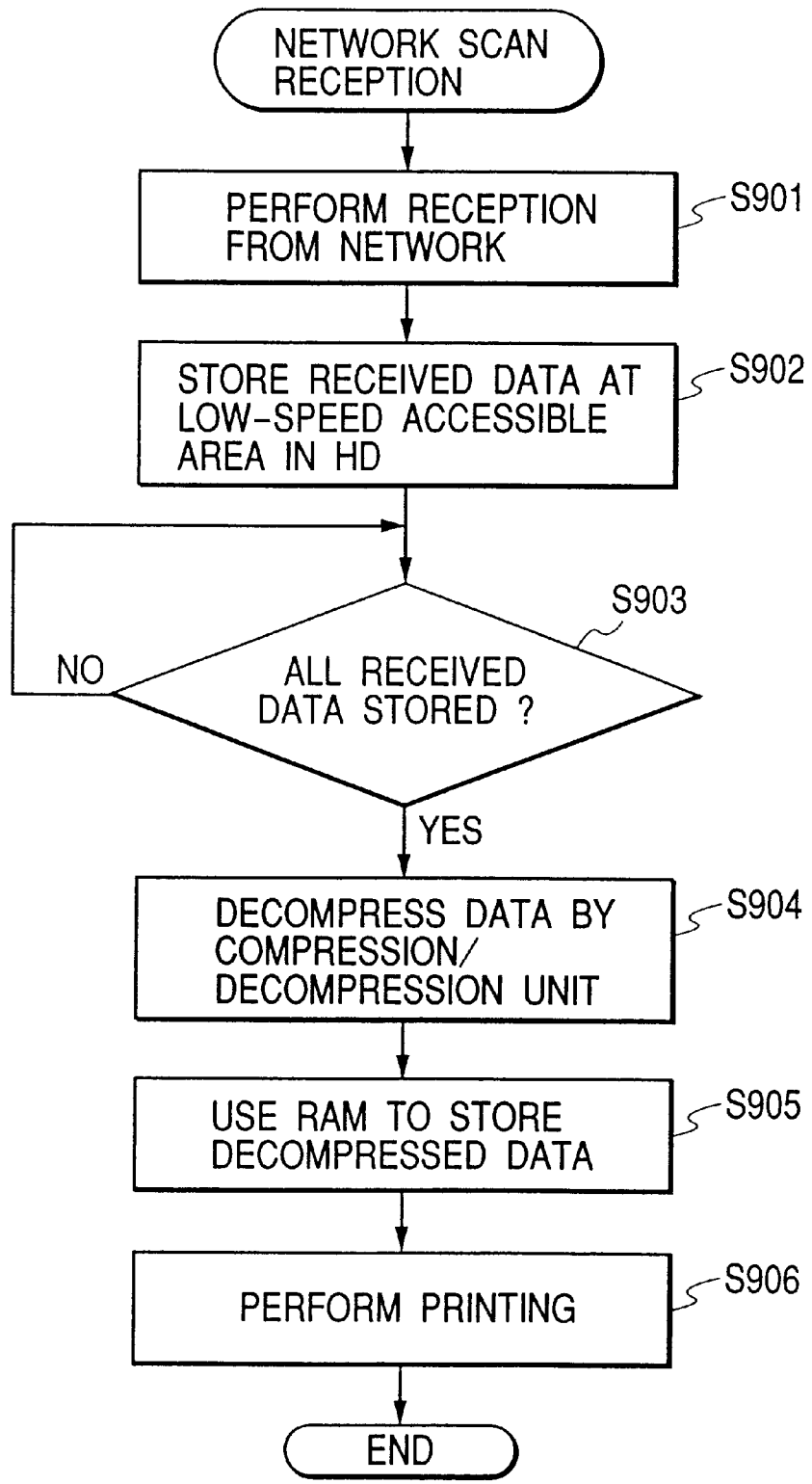
FIG. 9 is a flow chart showing a network scan reception process by the MFP according to the first embodiment.

FIG. 9 is the flow chart showing a network scan reception process (i.e., reception process in scanner mode) by the MFP according to the first embodiment.

If the NIC 109 receives the data from the network 112 (step S901), then the CPU 101 stores the received data at the low-speed data transfer area in the HD 104 (step S902). Subsequently, if all the received data are stored in the HD 104 ("YES" in step S903), then the CPU 101 reads the received data from the HD 104 and causes the compression/decompression unit 110 to decompress the read data (step S904). Further, CPU 101 writes the decompressed data into the RAM 103 (step S905), the printer 105 outputs the written data (step S906), and the network scan reception process terminates.

As described above, in the case where the scan image is received from the network 112, since the data speed (or data rate) is not so high, the low-speed data transfer area in the HD 104 is used. Further, in the case where the data is output in synchronism with the printer 105, the RAM 103 enough for the access speed required for such the process is used.

Figure 10:
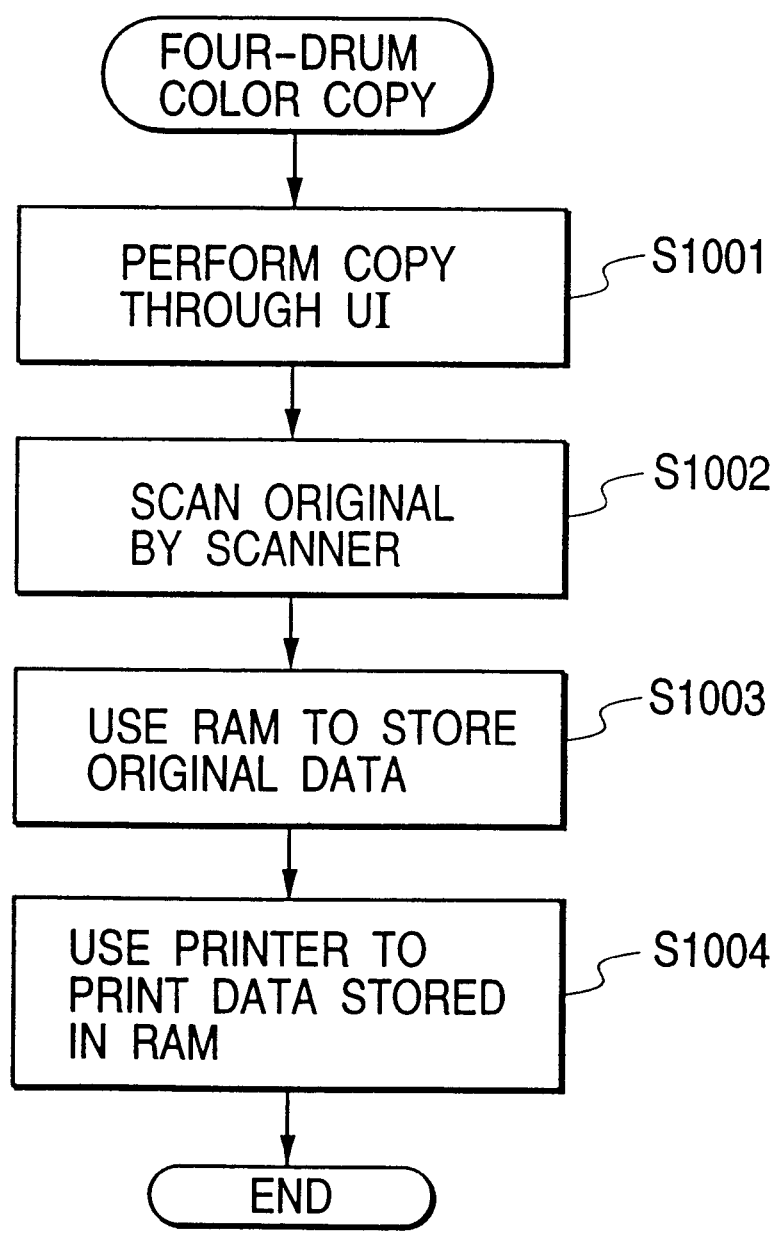
FIG. 10 is a flow chart showing a copying process of a color copying machine according to the first embodiment.
Figure 11:
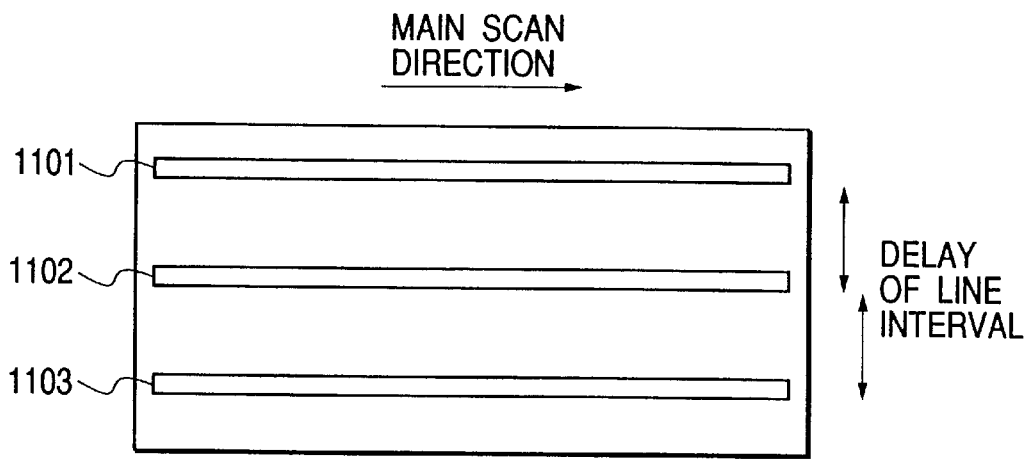
FIG. 11 is an explanatory view showing an arrangement state of CCD (charge coupled device) sensors in a scanner of the color copying machine according to the first embodiment.

FIG. 10 is the flow chart showing a copying process (i.e., process in color copying mode) of a color copying machine having, e.g., four photosensitive drums, according to the first embodiment. FIG. 11 is the explanatory view showing an arrangement state of CCD sensors in the scanner of the color copying machine. In FIG. 11, numerals 1101, 1102 and 1103 respectively denote R (red), G (green) and B (blue) CCD sensors. FIG. 12 is the explanatory view showing an arrangement state of the photosensitive drums in the color copying machine. In FIG. 12, numerals 1201, 1202, 1203 and 1204 respectively denote Bk (black), C (cyan), M (magenta) and Y (yellow) photosensitive drums, and numeral 1205 denotes a transfer belt. It should be noted that the function of the color copying machine can be realized by the scanner 106 and the printer 105 both shown in FIG. 1.

If the operator performs the copying operation through the UI 107 (step S1001), then the scanner 106 scans the original put on the feeder to convert the scanned image into the electronic data (step S1002). Subsequently, the CPU 101 stores the original data into the RAM 103 in synchronism with the data transfer speed of the scanner 106 (step S1003). As shown in FIG. 11, the scanner used to realize the function of the color copying machine has the separately arranged R, G and B CCD sensors 1101, 1102 and 1103. The image data read from each CCD sensor is stored into the RAM 103 at different timing, with a delay corresponding to the interval between the adjacent CCD sensors.

Figure 12:
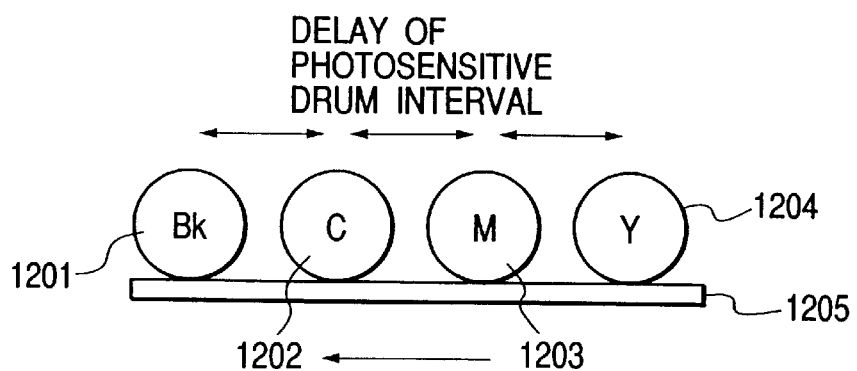
FIG. 12 is an explanatory view showing an arrangement state of photosensitive drums of the color copying machine according to the first embodiment.

Subsequently, as shown in FIG. 12, the CPU 101 transfers the printing image data from the RAM 103 to the Y, M, C and Bk photosensitive drums 1204 to 1201 in that order at drum rotation timing, in synchronism with the printing speed (step S1004).

In the case where the copying is performed by the color copying machine, even if image positions of the R, G and B CCD sensors 1101 to 1103 at the scanner side are out of register, these positions can be registered on the RAM 103. Further, color registration among the four photosensitive drums 1201 to 1204 is performed in the printing, as follows. That is, in case of transferring the image data from the RAM 103 to the printer 105, the phases of the image data of the four colors are shifted from others, whereby the phases of these four colors are registered in the printing. The printing by the four photosensitive drums 1201 to 1204 can be performed not only in the copying but also in the color printing.

Figure 13:
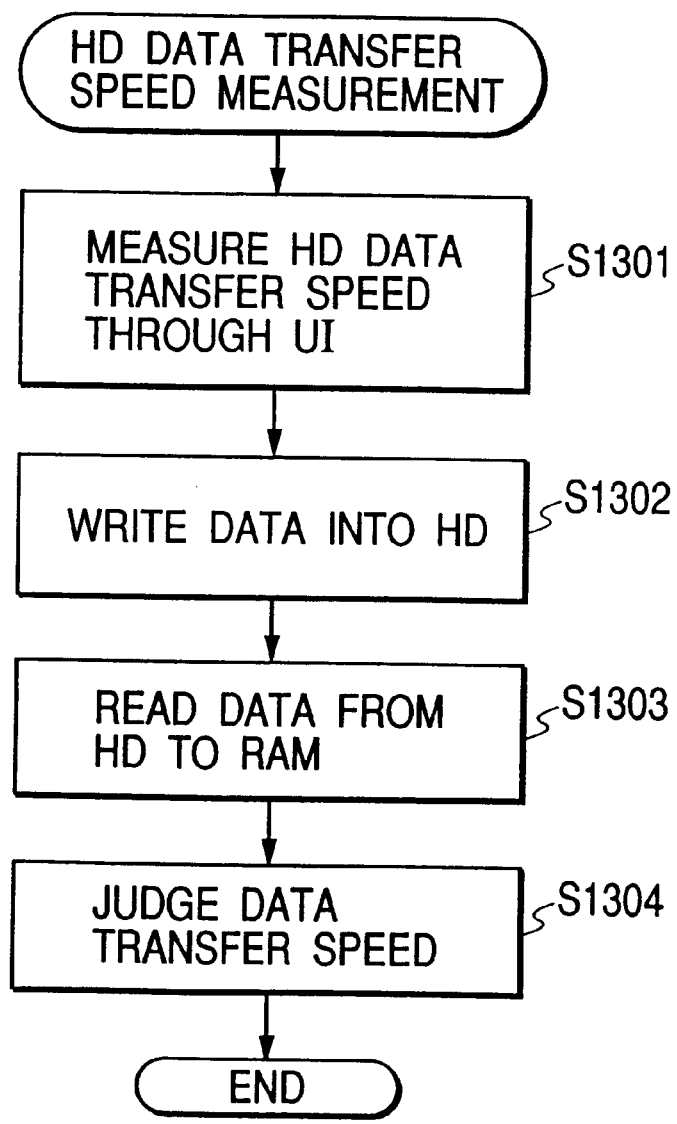
FIG. 13 is a flow chart showing a judgment process to judge a high-speed data transfer area/low-speed data transfer area of an HD in the MFP according to the first embodiment.

Subsequently, a method to judge or discriminate the high-speed data transfer area and the low-speed data transfer area in the HD of the MFP according to the first embodiment will be explained with reference to the flow chart shown in FIG. 13. FIG. 13 is the flow chart showing the judgment process to judge the high-speed and low-speed data transfer areas in the HD of the MFP according to the first embodiment.

If the operator performs a data transfer speed measurement operation of the HD 104 through the UI 107 (step S1301), the CPU 101 transfers the data to the HD 104, and the HD 104 then stores the transferred data at each predetermined track (step S1302). Subsequently, the CPU 101 reads the data from the predetermined track in the HD 104 and transfers it to the RAM 103 every predetermined unit time (step S1303). Then, the data transfer speed at each track is calculated by counting the number of data at each track read and transferred from the HD 104 into the RAM 103. Thus, the high-speed data transfer area (i.e., area of which data transfer speed is high) and the low-speed data transfer area (i.e., area of which data transfer speed is low) are judged or discriminated (step S1304), and the judgment process terminates.

As above, the data is previously stored at each predetermined track in the HD 104, the data transfer speed of the HD 104 is calculated at each predetermined track on the basis of the data quantity reproducible within a unit time, and the high-speed data transfer area and the low-speed data speed area in the HD 104 are judged or discriminated based on the calculated result.

Further, as explained above, the MFP according to the first embodiment has the RAM 103 for storing the data, the HD 104 for storing the data, the printer 105 for forming the image on the paper sheet, the scanner 106 for scanning the image, the FAX 108 for performing the memory transmission/reception, the CPU 101 and the like. In such the structure, the CPU 101 performs the following control. That is, in the case where the high-speed data access is required and the data capacity is not so required, e.g., in the case where the quantity of the data to be processed at the access speed of 8 Mbytes/sec or more is small, the RAM 103 is used. Further, in the case where the certain data access speed is required and the data capacity is required, e.g., in the case where the quantity of the data to be processed at the access speed of 6 Mbytes/sec or so is large, the high-speed accessible area (i.e., area at which access speed is high) in the HD 104 is used. Further, in the case where the data access speed may be low and the data capacity is required, e.g., in the case where the quantity of the data to be processed at the access speed of 4 Mbytes/sec or so is large, the low-speed accessible area (i.e., area at which access speed is low) in the HD 104 is used. As a result, it is possible to derive the following operations and effects.

It is featured that the shared memories are selectively used according to the access speed and the capacity (i.e., data quantity) required for the memory installed in the MFP system. Especially, the shared memories are classified into those to which high access speed is required and capacity is not so required, those to which predetermined access speed is required and capacity is required, and those of which data access speed may be low and to which capacity is required.

The memories to which high access speed (e.g., equal to or higher than 8 Mbytes/sec) is required and capacity is not so required include a page memory which must store the image in synchronism with the scanner 106 in the copying or the scanning; a page memory which must output the image in synchronism with the printer 105 in the copying, the printing of the FAX 108 or the image printing of the printer 105; a working memory which is used for the PDL image expansion by the printer 105; a memory which is used to adjust timing among the CCD sensors of respective colors in the scanner 106 and the timing of respective colors in the printer 105; a system memory; and the like.

The memories to which the predetermined access speed (e.g., lower than 8 Mbytes/sec and equal to or higher than 6 Mbytes/sec) is required and capacity is required include a copying electronic sorter memory which must previously store all the originals put on the feeder of the scanner 106, a memory which is used for the scanner 106, an electronic sorter memory which must previously store all the documents to be printed out by the printer 105, and the like.

The memories of which data access speed may be low (e.g., lower than 6 Mbytes/sec) and to which capacity is required include a memory which stores program data and system data as control data other than the image data to be reproduced on the sheet, a memory which stores backup data, a memory which stores a system program, a memory which is used to spool PDL codes for the printer 105, a memory which stores font data, a memory which is used for the memory transmission/reception of the FAX 108, and the like.

Therefore, as the memory to which the high data access speed is required and the capacity is not so required (i.e., data access speed is equal to or higher than a first predetermined speed and data quantity is small), e.g., the RAM 103 is used. As the memory to which the predetermined data access speed (i.e., lower than access speed of RAM 103) is required and the capacity is required (i.e., data access speed is equal to or higher than a second predetermined speed lower than the first predetermined speed and data quantity is large), the high-speed accessible area in the HD 104 is used. Further, as the memory of which data access speed may be low and the data quantity is required (i.e., data access speed is lower than the second predetermined speed and data quantity is large), the low-speed accessible area in the HD 104 is used.

That is, in the first embodiment, it is possible to share the image data memory and the system memory with the respective functions of the MFP, whereby it is possible to structure the MFP in which the number of used memories can be made smaller as compared with the conventional MFP.

Further, in the first embodiment, according to the access speed and the capacity required for the memory installed in the MFP system, the shared memories are selectively used. Especially, it is structured that the shared memories to which the high access speed is required and the capacity is not so required, the shared memories to which the predetermined access speed is required and the capacity is required, and the shared memories of which data access speed may be low and to which the capacity is required are selectively used. By doing so, it is possible to effectively use the memories, prevent the increase of cost and also guarantee system productivity.

[2] Second Embodiment

Figure 14:
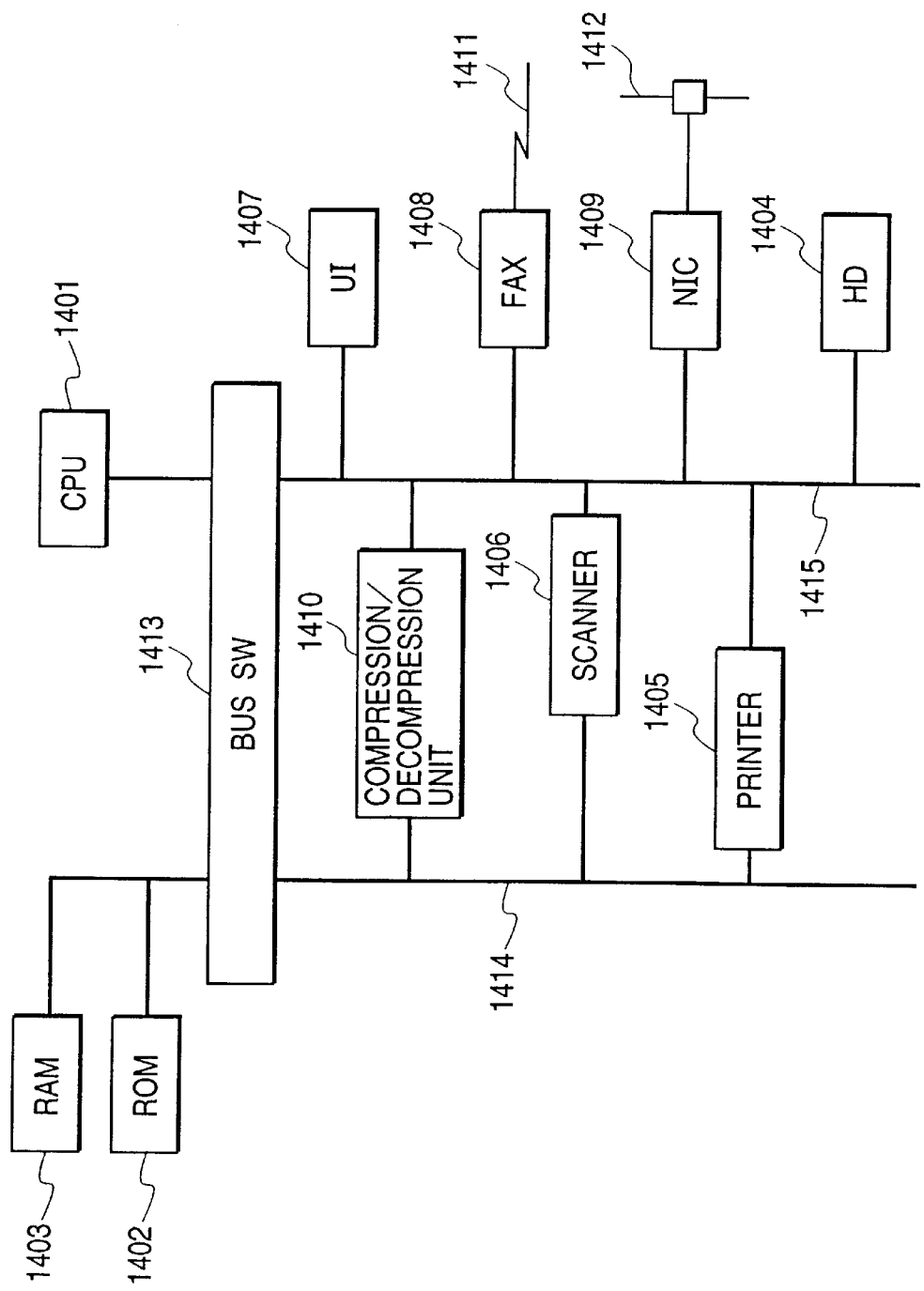
FIG. 14 is a block diagram showing the entire structure of an MFP according to the second embodiment.

FIG. 14 is a block diagram showing the entire structure of an MFP according to the second embodiment. This MFP has plural functions such as a copying function (i.e., copying mode), a FAX function (i.e., FAX mode), a printer function (i.e., printer mode) and a scanner function (i.e., scanner mode). Further, the structure of the MFP includes a CPU 1401, a ROM 1402, a RAM 1403, an HD 1404, a printer 1405, a scanner 1406, a UI 1407, a FAX 1408, an NIC 1409, a compression/decompression unit 1410, a bus switch (SW) 1413, a bus 1 1414 and a bus 2 1415. In the drawing, numerals 1411 and 1412 denote a line and a network, respectively.

Hereinafter, the structure of each unit will be explained in detail. The CPU 1401 controls an entire system, and performs the processes same as those in the first embodiment on the basis of a control program stored in the ROM 1402. The ROM 1402 stores the control program of the CPU 1401, fixed data and the like. The RAM 1403 temporarily stores various data, and is used as a working area for the CPU 1401.

The HD 1404 is used to store various data, the printer 1405 prints and outputs an image under the control of the CPU 1401, and the scanner 1406 scans and reads an image from an original. The UI 1407 composed of a keyboard, a pointing device and the like is used to input various instructions and various data. The FAX 1408 performs FAX communication with an external apparatus through the line 1411, and the NIC 1409 performs communication control between the MFP and the network 1412. The compression/decompression unit 1410 compresses image data and decompresses the compressed image data.

The bus SW 1413 is the crossbar switch to which the CPU 1401, the ROM 1402, the RAM 1403, the bus 1 1414 and the bus 2 1415 can be connected. Further, it is structured that either of the bus 1 1414 and the bus 2 1415 can be connected to each of the printer 1405 and the scanner 1406.

The MFP in the second embodiment performs copying, FAX, printing and scan operations through the bus SW 1413, and the main data flow in the MFP is substantially the same as that explained in the first embodiment. Although FIG. 14 is silent, if data such as system data, backup data, a system program, PDL font data of the printer 1405 and the like, of which access speed may be low and to which capacity is required, are stored at a low-speed data transfer area in the HD 1404, it is possible to effectively use the memories.

As explained above, the MFP according to the second embodiment has the RAM 1403 for storing the data, the HD 1404 for storing the data, the printer 1405 for forming the image on the paper sheet, the scanner 1406 for scanning the image, the FAX 1408 for performing the memory transmission/reception, the CPU 1401 and the like. In such the structure, the CPU 1401 performs the following control. That is, in the case where high-speed data access is required and data capacity is not so required, the RAM 1403 is used. Further, in the case where a predetermined data access speed (lower than data access speed of RAM 1403; intermediate speed in this case) is required and data capacity is required, a high-speed accessible area (i.e., area at which access speed is high) in the HD 1404 is used. Further, in the case where data access speed may be low and data capacity is required, a low-speed accessible area (i.e., area at which access speed is low) in the HD 1404 is used. As a result, it is possible to derive the following operations and effects.

It is featured that the shared memories are selectively used according to the access speed and the capacity required for the memory installed in the MFP system. Especially, the shared memories are classified into those to which high access speed is required and capacity is not so required, those to which the predetermined access speed (i.e., intermediate speed) is required and capacity is required, and those of which data access speed may be low and to which capacity is required.

The memories to which high access speed is required and capacity is not so required include a page memory which must store the image in synchronism with the scanner 1406 in the copying or the scanning; a page memory which must output the image in synchronism with the printer 1405 in the copying, the printing of the FAX 1408 or the image printing of the printer 1405; a working memory which is used for the PDL image expansion by the printer 1405; a memory which is used to adjust timing among the CCD sensors of respective colors in the scanner 1406 and the timing of respective colors in the printer 1405; a system memory; and the like.

The memories to which the predetermined access speed (i.e., intermediate speed) is required and capacity is required include a copying electronic sorter memory which must previously store all the originals put on the feeder of the scanner 1406, a memory which is used for the scanner 1406, an electronic sorter memory which must previously store all the documents to be printed out by the printer 1405, and the like.

The memories of which data access speed may be low and to which capacity is required include a memory which stores system data, a memory which stores backup data, a memory which stores a system program, a memory which is used to spool PDL codes for the printer 1405, a memory which stores font data, a memory which is used for the memory transmission/reception of the FAX 1408, and the like.

Therefore, as the memory to which the high data access speed is required and the capacity is not so required, e.g., the RAM 1403 is used. As the memory to which the predetermined data access speed (lower than access speed of RAM 1403; intermediate speed in this case) is required and the capacity is required, the high-speed accessible area (i.e., area at which access speed is high) in the HD 1404 is used. Further, as the memory of which data access speed may be low and the data quantity is required, the low-speed accessible area (i.e., area at which access speed is high) in the HD 1404 is used.

That is, in the second embodiment, it is possible to share the image data memory and the system memory with the respective functions of the MFP, whereby it is possible to structure the MFP in which the number of used memories can be made smaller as compared with the conventional MFP.

Further, in the second embodiment, according to the access speed and the capacity required for the memory installed in the MFP system, the shared memories are selectively used. Especially, it is structured that the shared memories to which the high access speed is required and the capacity is not so required, the shared memories to which the predetermined access speed is required and the capacity is required, and the shared memories of which data access speed may be low and to which the capacity is required are selectively used. By doing so, it is possible to effectively use the memories, prevent the increase of cost and also guarantee system productivity.

[3] Third Embodiment

In the first and second embodiments, it has been explained the case where the MFP has the plural functions such as the electronic sort function (i.e., copying function), the FAX function, the printer function, the scanner function, the color copying function and the like, and these functions are executed by using the RAM and the HD respectively having the different access speeds. In the third embodiment, it will be explained a case where an electronic sort function, a mailbox function and a form synthesis function are provided as plural functions, and these functions are executed by using an HD including plural storage areas to which accessible speeds are different from others. Further, in the third embodiment, it will be explained a process for improving productivity of a process such as the above electronic sort function in which it is required to perform operations in real time.

Figure 15:
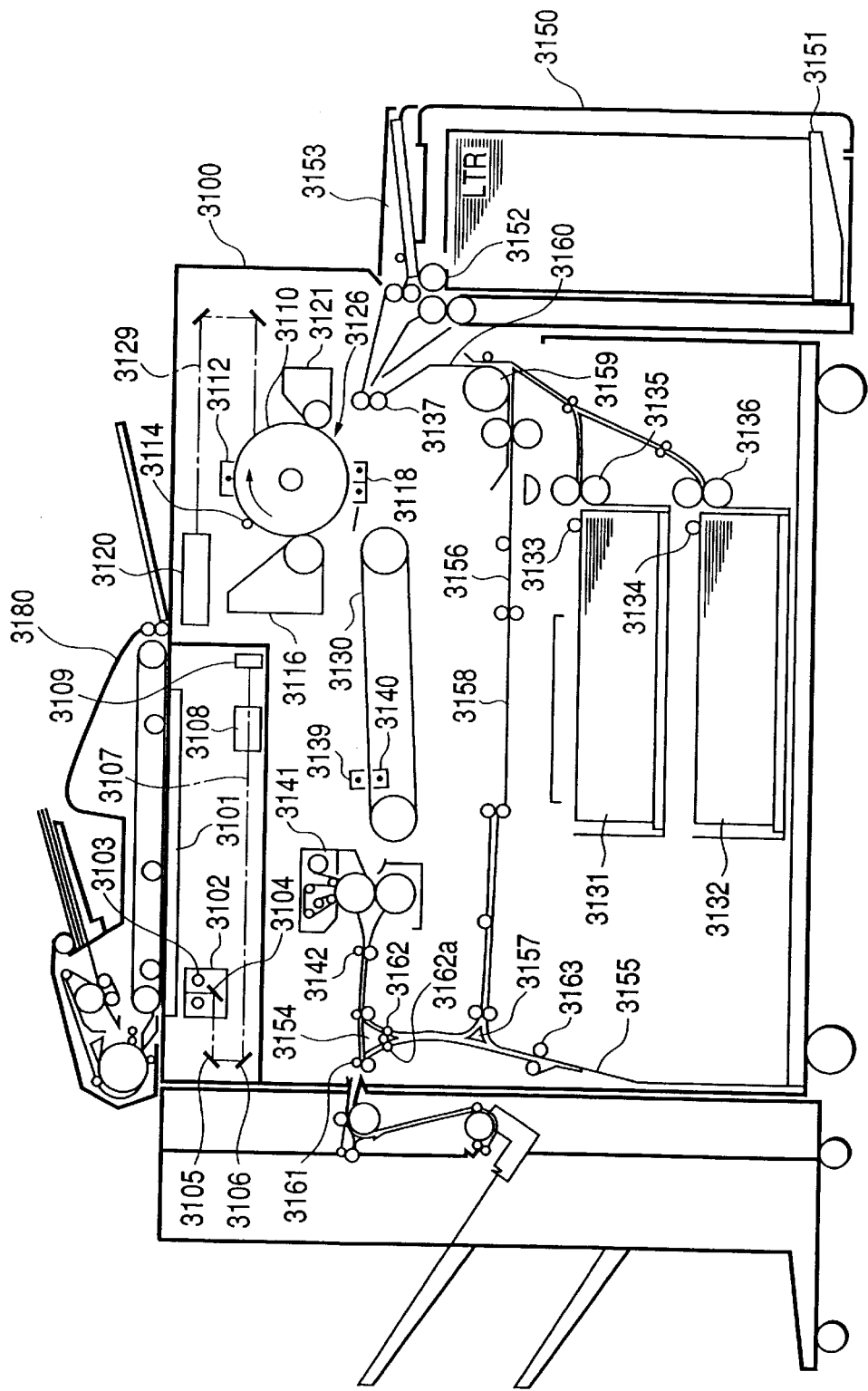
FIG. 15 is a sectional view showing a copying machine according to the third embodiment.

FIG. 15 is a sectional view showing one example of a copying machine according to the third embodiment. In the drawing, numeral 3100 denotes the body of the copying machine (or copying machine), and numeral 3180 denotes a rotary automatic document feeder (RDF).

In FIG. 15, numeral 3101 denotes a platen glass which acts as an original mounting board. Numeral 3102 denotes a scanner which is composed of an original illumination lamp 3103, a scan mirror 3104 and the like. The scanner 3102 is reciprocated in predetermined directions by a not-shown motor, and reflection light 3107 reflected from an original put on the platen glass 3101 is input to a CCD sensor (i.e., image sensor unit) 3109 through scan mirrors 3104 to 3106 and a lens 3108 so as to form an image.

Numeral 3120 denotes an exposure light control unit which is composed of a laser, a polygonal scanner and the like. The image is converted into an electrical signal by the image sensor unit 3109 and subjected to a later-described predetermined image process, thereby generating an image signal. The unit 3120 then irradiates a laser beam 3129 modulated based on the generated image signal, onto a photosensitive drum 3110.

A primary charger 3112, a developing unit 3121, a transfer charger 3118, a cleaning unit 3116 and a preexposure lamp 3114 are provided around the photosensitive drum 3110. In an image formation unit 3126, the drum 3110 is rotated in the direction indicated by the arrow in FIG. 15, by a not-shown motor. After the drum 3110 is charged at desired potential by the primary charger 3112, the laser beam 3129 from the exposure control unit 3120 is irradiated onto the drum 3110 to form an electrostatic latent image thereon. The electrostatic latent image is then developed by the developing unit 3121 to be visualized as a toner image. On the other hand, a transfer paper sheet fed from an upper cassette 3131 by a pickup roller 3133 or a lower cassette 3132 by a pickup roller 3134 is carried to the body by a paper feed roller 3135 or 3136. The sheet is then fed to a transfer belt 3130 by a registration roller 3137, whereby the visualized toner image is transferred onto the sheet by the transfer charger 3118. After the transfer operation, residual toner on the drum 3110 is cleaned up by the cleaning unit 3116, and residual charges are erased by the preexposure lamp 3114.

After the transfer operation, the sheet is separated from the transfer belt 3130, the toner image is recharged by prefixing chargers 3139 and 3140, and the sheet is then fed to a fixing unit 3141. The toner image is heat-pressed onto the sheet by the fixing unit 3141, and the sheet is then discharged to the outside of the body 3100 by a discharge roller 3161.

A deck 3150 capable of holding, e.g., 4000 transfer paper sheets, is provided in the body 3100. A lifter 3151 of the deck 3150 is moved upward according to a quantity of the sheets such that the sheet is always in contact with a paper feed roller 3152. Further, a manual feeder 3153 capable of holding 100 transfer paper sheets is provided on the deck 3150.

Further, in FIG. 15, numeral 3154 denotes a paper discharge flapper which is used to change a paper feed route among a double-face recording side, a multirecording side and a paper discharge side. The sheet fed by the paper discharge roller 3142 is guided to the double-face recording side or the multirecording side by the flapper 3154. A lower carrying path 3158 guides the sheet fed by the roller 3142 to a paper redischarge tray 3156. Numeral 3159 denotes a paper feed roller which feeds the sheet to the side of the photosensitive drum 3126 through a path 3160. Numeral 3161 denotes the discharge roller which is arranged in the vicinity of the flapper 3154 and discharges the sheet guided to the discharge side by the flapper 3154 to the outside of the body 3100. When double-face recording (double-face copying) is performed, the flapper 3154 is lifted, whereby the transfer sheet the copy from which has been obtained (referred as copy-end sheet hereinafter) is stored on the paper redischarge tray 3156 through paths 3155 and 3158 in the state that the sheet has been reversed or turned back.

When the sheet reversed is discharged from the body 3100, the flapper 3154 is lifted and a multirecording flapper 3157 is turned rightward, and the copy-end sheet is fed to the side of the path 3155. Then, after the trailing edge of the sheet passes a first feed roller 3162, the sheet is fed to the side of a second feed roller 3162a by a reverse roller 3163, and the sheet is reversed and discharged to the outside of the body 3100 by the discharge roller 3161.

Figure 16:
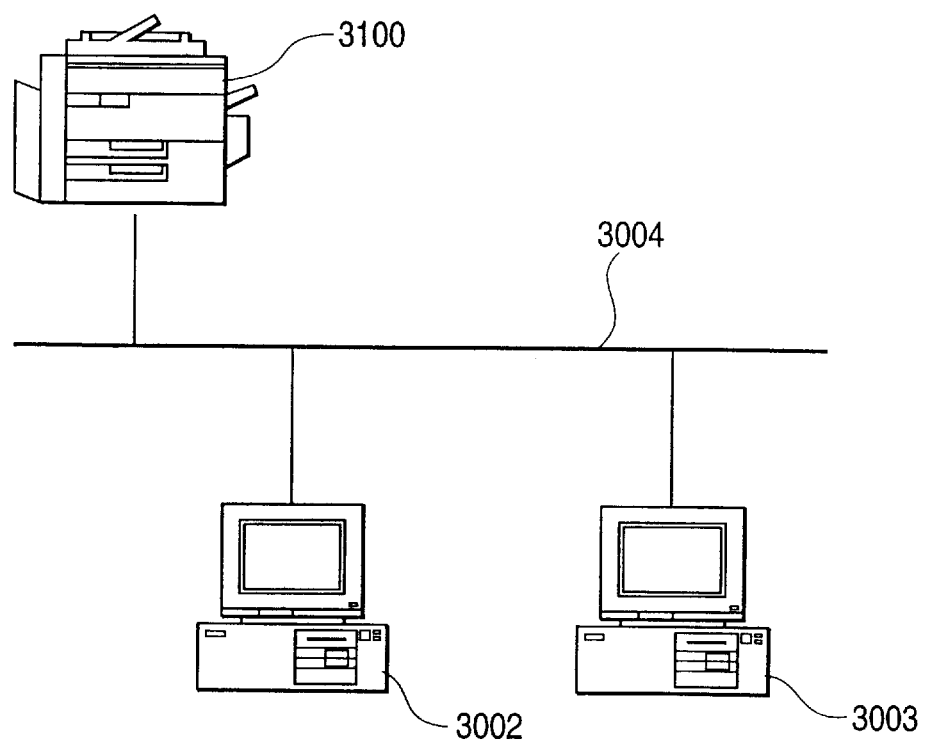
FIG. 16 is a view showing a state that the copying machine according to the third embodiment is connected to computers.

FIG. 16 is a view showing that the copying machine 3100 is connected to computers 3002 and 3003 through a network 3004. Although the two computers are connected to the copying machine 3100 in the present embodiment, three or more computers may be connected to the copying machine 3100 through the network.

The copying machine 3100 has a printer function and a mailbox function. The printer function is to print the image data received from the computer 3002 or 3003. The mailbox function is to read, if a user inputs a PIN (personal identification number) code from the operation unit of the copy machine 3100, the image data corresponding to the input PIN code from the HD 3309 and then print out the read image data.

Further, the copying machine 3100 has a form image function which is to previously register a table, an illustration and the like input from the scanner or the computer as plural registration images (i.e., form images), and then synthesize the read image and the registration image. In this case, it is possible to see information such as management information of the copying machine 3100, the kind of the registered form image and the like, from the computer 3002 or 3003 through the network.

Figure 17:
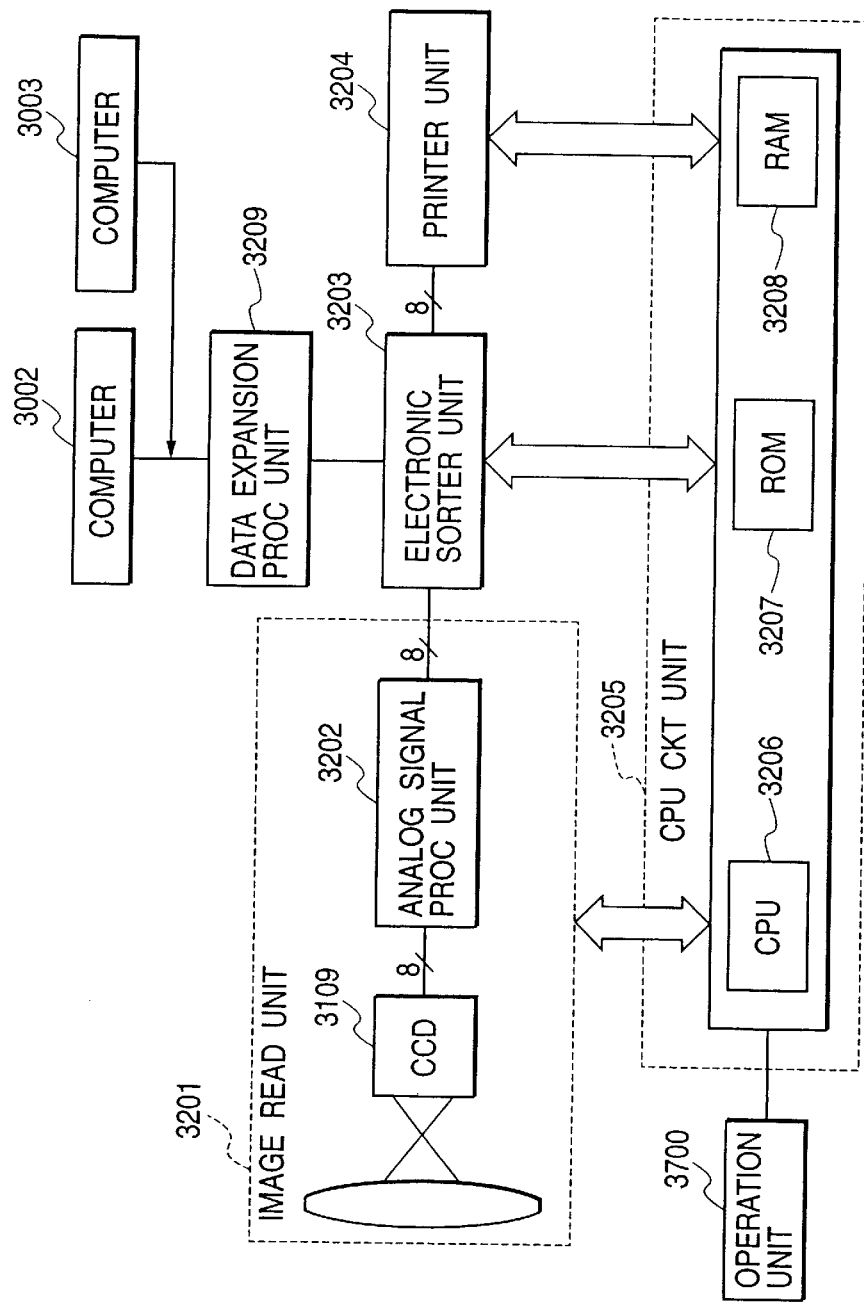
FIG. 17 is a block diagram showing the copying machine according to the third embodiment.

FIG. 17 is a block diagram showing the copying machine 3100 according to the third embodiment. In FIG. 17, an image read unit 3201 is composed of a CCD sensor 3109, an analog signal process unit 3202 and the like. The original image formed in the CCD sensor 3109 is converted into an analog electrical signal. Obtained such image information is then input to the analog signal process unit 3202, and subjected to a sample-and-hold (S/H) process, dark level correction and the like. The processed signal is then subjected to analog-to-digital (A/D) conversion, and an obtained digital signal is subjected to shading correction (i.e., process to correct dispersion of original read sensor and light distribution characteristic of original illumination lamp) and a zooming (or magnification changing) process. After then, the processed signal is input to an electronic sorter unit 3203.

In the electronic sorter unit 3203, correction processes such as gamma correction and the like necessary for an output system, a smoothing process, an edge emphasis process, and other processes are performed. The processed image data is then output to a printer unit 3204.

The printer unit 3204 is composed of the exposure control unit 3120 including the laser and the like, the image formation unit 3126, a feeding control unit of the transfer paper sheet, and the like all shown in FIG. 15. The unit 3204 records the image onto the sheet in response to the input image signal.

Further, a CPU circuit unit 3205 which is composed of a CPU 3206, a ROM 3207, a RAM 3208 and the like controls the image read unit 3201, the electronic sorter unit 3203, the printer unit 3204 and the like. That is, the unit 3205 integrally controls a sequence of processes.

Further, the CPU circuit unit 3205 has a standby timer, a timer for clocking a predetermined time, a clock function for recognizing the current time, and the like. An instruction set at an operation unit 3700 of the copying machine is input to the CPU circuit unit 3205.

Figure 18:
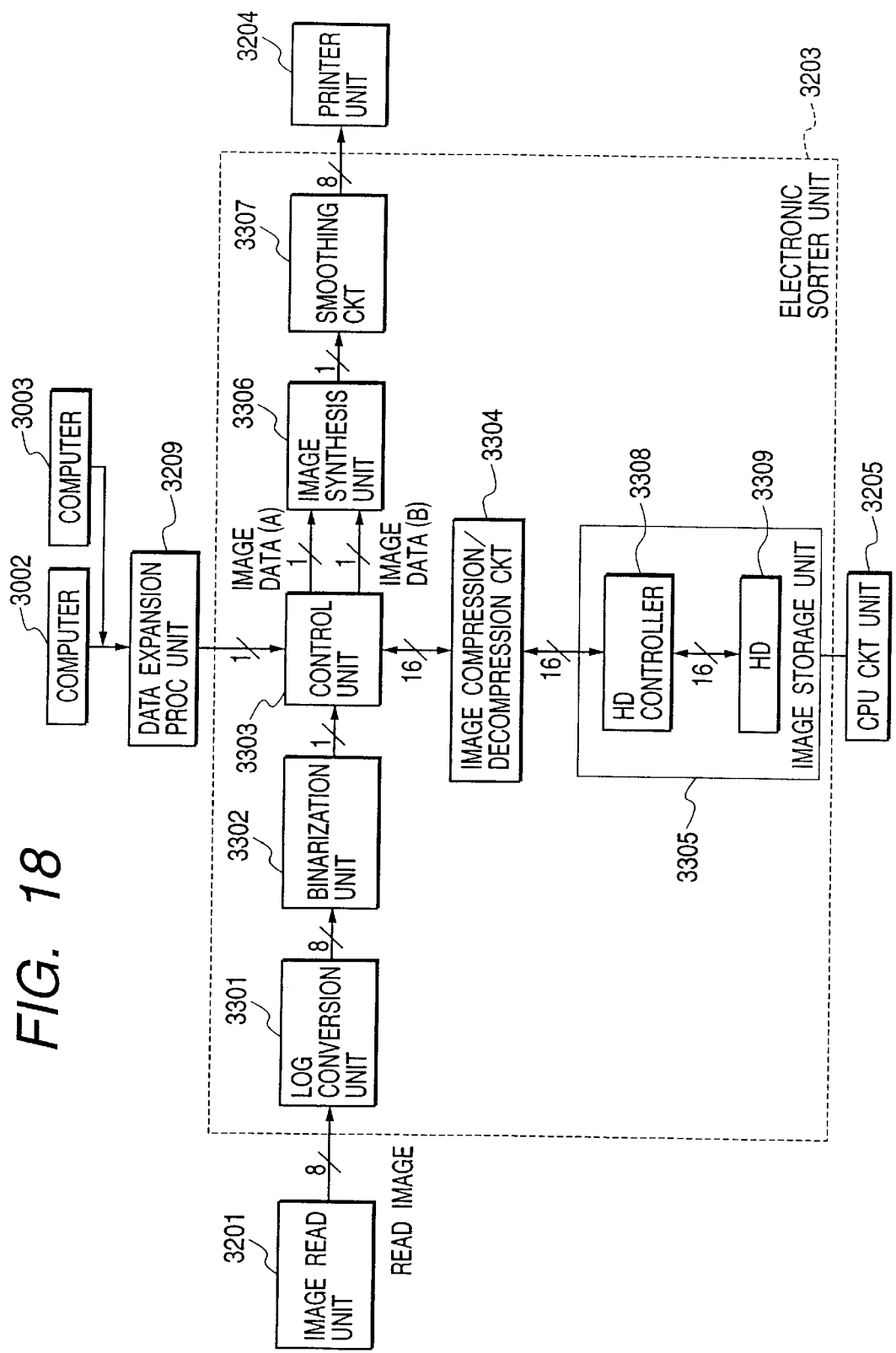
FIG. 18 is a block diagram showing the detailed structure of an electronic sorter unit according to the third embodiment.

FIG. 18 is a block diagram showing the detailed structure of the electronic sorter unit 3203. The image sent from the image read unit 3201 is input to the unit 3203 as luminance data, and then transferred to a logarithmic conversion unit 3301. The unit 3301 has previously stored a lookup table (LUT) for performing density conversion to the input luminance data. Thus, the unit 3301 converts the luminance data into density data on the basis of a table value corresponding to the input data.

After then, the density data is transferred to a binarization unit 3302. In the unit 3302, the multivalue density data is first converted into eight-bit density data of "0" or "255", and then converted into one-bit binary data of "0" or "1". Thus, it is possible to reduce an image data quantity to be stored in the memory.

The obtained binary image data is transferred to a control unit 3303. The unit 3303 has a layout memory 3406 which is composed of a dynamic random access memory (DRAM) and the like and performs an image layout. Since bit-map image data which has been obtained by expanding the PDL output from the computer 3002 or 3003 and is input from a data expansion process unit 3209 has been already processed as binary image data in the unit 3209, this bit-map image data is transferred to the control unit 3303 as it is.

In response to the instruction from the CPU circuit unit 3205, the control unit 3303 performs the control to once store the read original sent from the image read unit 3201 and the bit-map image data transferred from the data expansion process unit 3209 in an image storage unit 3305, and to sequentially read and output the stored image data from the unit 3305. The image storage unit 3305 includes an HD controller 3308 and an HD 3309.

The image data is transferred from the image storage unit 3305 to an image synthesis unit 3306 through the control unit 3303. The image synthesis unit 3306 synthesizes two kinds of image data output from the control unit 3303 and then outputs the synthesized data according to necessity.

For example, it is assumed that the two kinds of image data are image data (A) which represents the read image and image data (B) which represents the form image previously stored in the HD 3309. In this case, the image synthesis unit 3306 performs an image synthesis process by OR (logical sum) calculation of the input two kinds of image data.

On the other hand, if the unit 3306 does not perform the image synthesis process, the image data is input to a smoothing circuit 3307 as it is. The circuit 3307 performs calculation based on a predetermined coefficient obtained from a matrix to correct an edge portion of the image.

An image compression/decompression circuit 3304 performs compression of the image data transferred from the control unit 3303, or performs decompression of the image data read from the image storage unit 3305.

Figure 19:
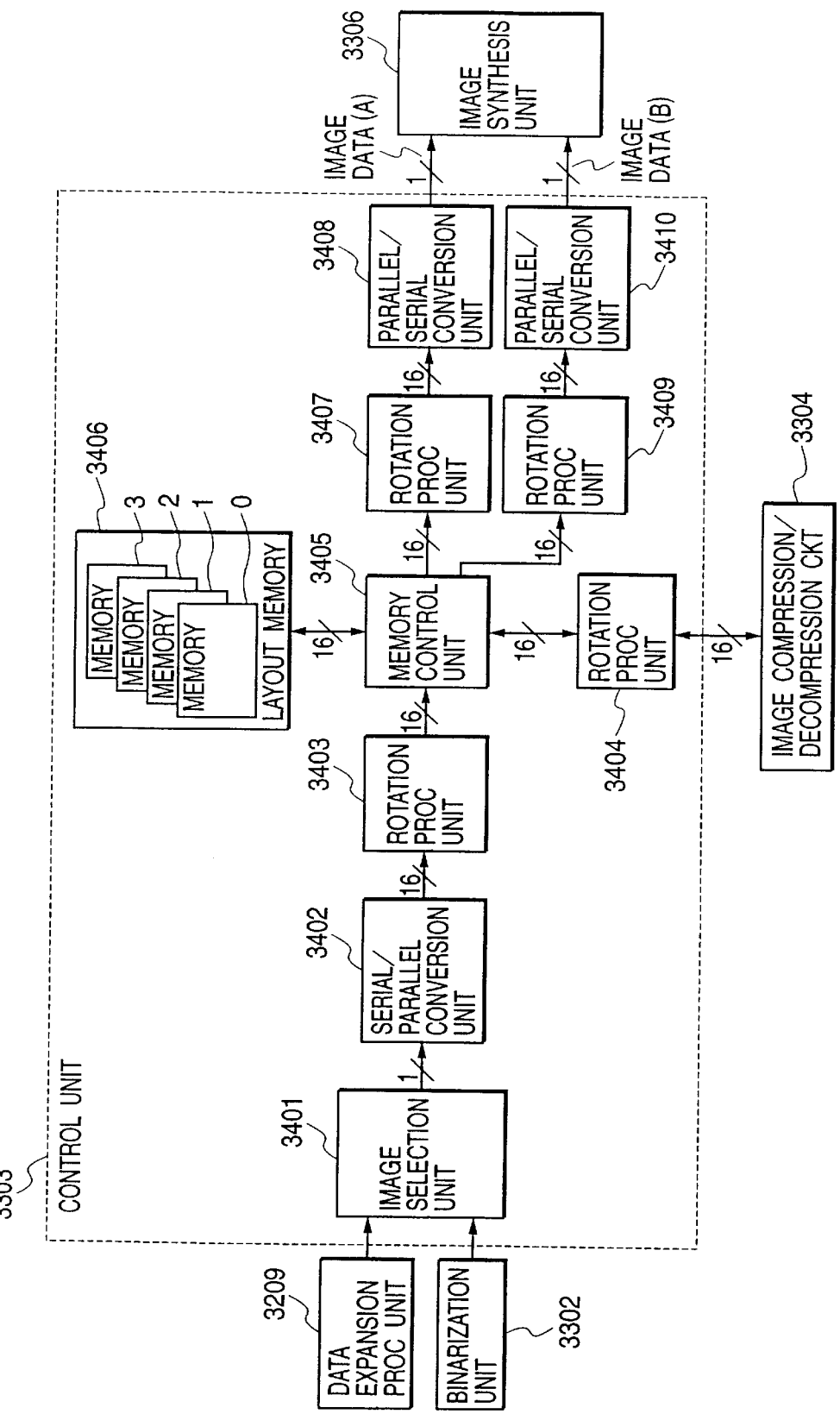
FIG. 19 is a block diagram for explaining the structure of a control unit according to the third embodiment.

Subsequently, the structure of the control unit 3303 will be explained with reference to FIG. 19.

The image data output from the data expansion process unit 3209 and the binarization unit 3302 are input to an image selection unit 3401. The image data output from the unit 3401 is then input to a serial/parallel conversion unit 3402 which converts the binary data into 16-bit parallel data. Practically, the unit 3402 converts the one-dimensional binary data into the 16-bit data of "four pixels×four lines" by using a not-shown line memory of four lines.

Then a rotation process unit 3403 changes an arrangement of the 16-bit image data transferred from the serial/parallel conversion unit 3402, and also changes a start value at a memory address (not shown) to perform an image rotation process when the image data is input to the memory.

A rotation process unit 3404 changes an arrangement of the 16-bit image data input from the image compression/decompression circuit 3304, and also changes a start value at the memory address to perform an image rotation process when the image data is read from or written into the layout memory.

A memory control unit 3405 controls the rotation process units 3403, 3404, 3407 and 3409 and the layout memory 3406, and also controls image data reading/writing from/into the layout memory 3406.

The layout memory 3406 includes a DRAM which has the capacity capable of holding A4-size data of four pages so as to perform high-speed reading and writing processes of the input image data (i.e., bit image).

In case of handling the image information among an input device (image reader or the like), an output device (printer or the like) and a large-capacity storage device (HD or the like), the differences in the data transfer speeds can be compensated or buffered by handling the data through the layout memory 3406, whereby the data transfer speed required for the HD may be low as compared with the operating frequency of the input device.

Therefore, even if the area at the inner circumference of the HD 3309 (i.e., area at which access speed is low) is used to access the image data in the unit of page, the data writing operation can be normally performed by handling the data through the layout memory 3406.

In the present embodiment, the layout memory 3406 is composed of memories 0, 1, 2 and 3, and each memory has the capacity capable of holding the A4-size data of one page.

In case of handling the A4-size original, a double buffer process is performed by using the two memories (e.g., memories 0 and 1). Concretely, while the image data in the memory 0 is being written into the HD 3309, the image data is received by using the memory 1. In case of performing the image synthesis process, e.g., the form image from the HD 3309 is written into the memory 2.

If the original is the large-size (e.g., A3 size) original, the image data writing is performed by using the memories 0 and 1 as one memory, and simultaneously the image data reception is performed by using the memories 2 and 3. In case of handling the A3-size image data (representing binary image) of which resolution is 600 dpi, the capacity of about 18 Mbytes is necessary.

The rotation process units 3407 and 3409 change the bit arrangement of the image data output from the layout memory 3406 and also change a start value at a memory address (not shown) so as to rotate and output the image data when it is printed out.

Each of parallel/serial conversion units 3408 and 3410 converts the transferred 16-bit image data into one-bit serial data. Concretely, since the input image data consists of 16 bits of "four pixels x four lines", the image data of predetermined four pixels are read for each line, and the read data is then converted into the serial data.

It is assumed that the image data (A) output from the parallel/serial conversion unit 3408 represents the read image and the image data (B) output from the parallel/serial conversion unit 3410 represents the form image previously stored in the HD 3309. These two kinds of image data are both input to the image synthesis unit 3306.

Hereinafter, an operation and its timing in case of performing an electronic sort by using the layout memory 3406 will be explained with reference to FIGS. 20 and 21.

Figure 20:
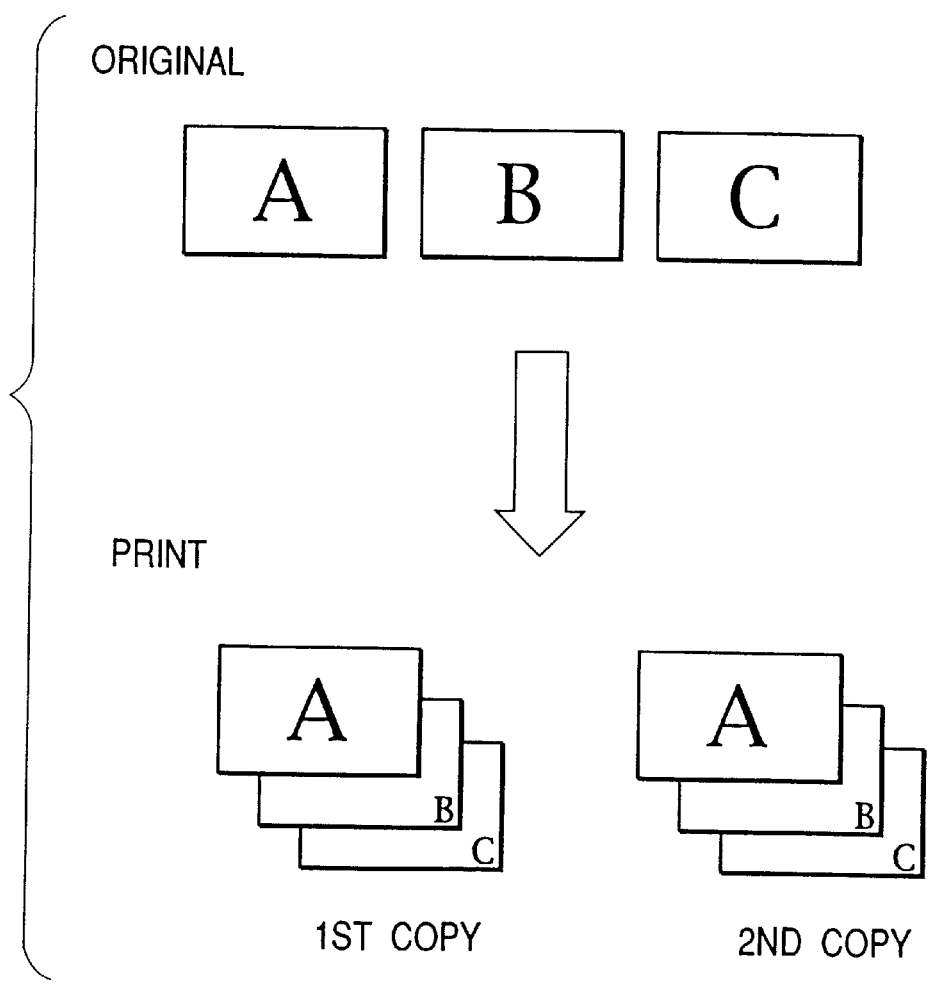
FIG. 20 is a view showing an electronic sort process according to the third embodiment.

FIG. 20 shows relation between originals and prints in a case where originals A, B and C are printed to produce two copies. By the above double buffer process, the image data of the original read by the scanner is stored in the HD 3309 and the image data of the first copy is printed out. The image data stored in the HD 3309 are sequentially read and output to produce the second and following copies, whereby it is unnecessary to read the original for the second and following copies. Subsequently, the operation timing of the electronic sort process will be explained with reference to FIG. 21.

Figure 21:
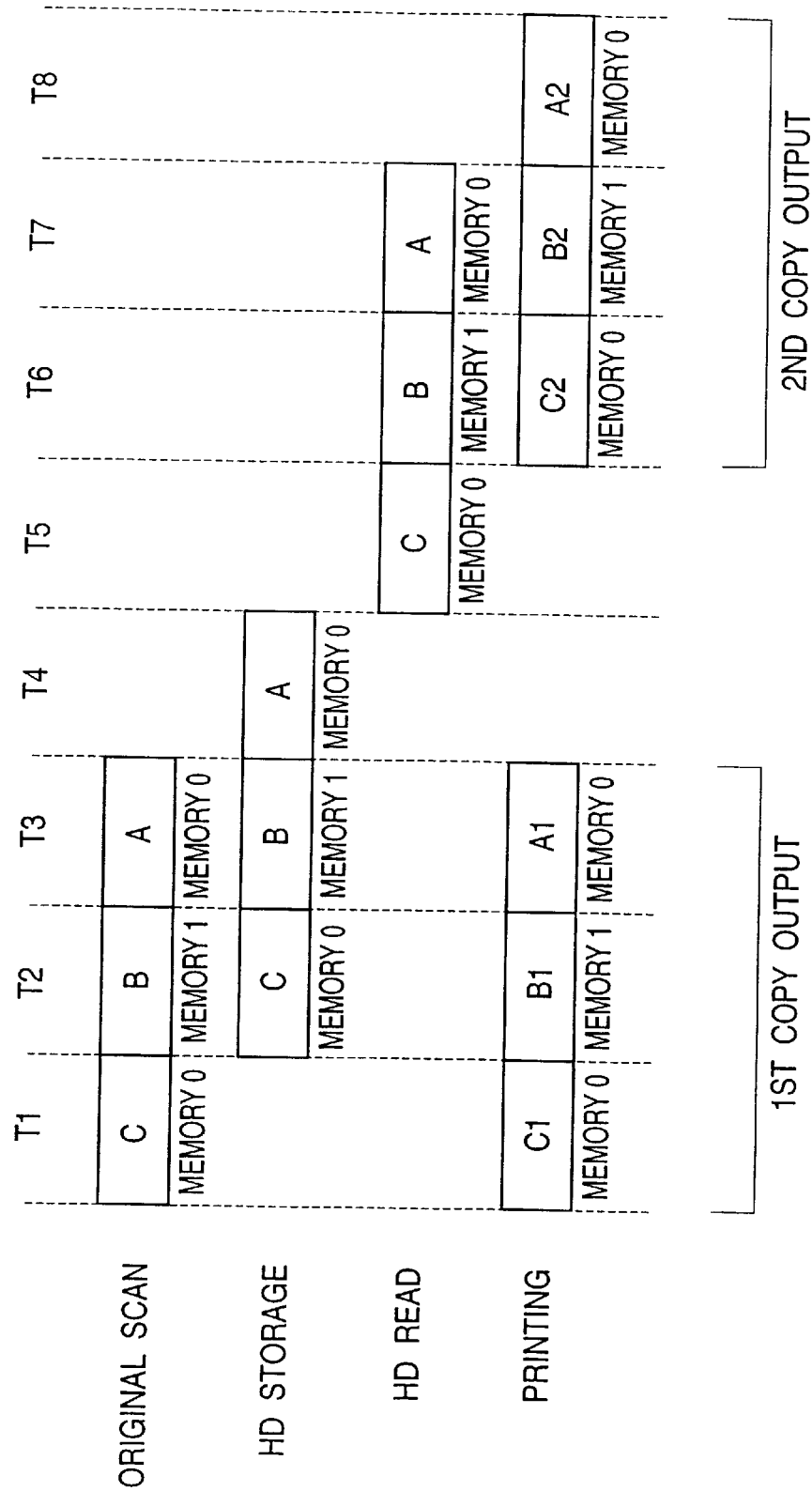
FIG. 21 is a view showing the electronic sort process according to the third embodiment.

FIG. 21 shows the operation timing in case of performing the double buffer process by using the memories 0 and 1 in the layout memory 3406.

In FIG. 21, the axis of ordinates represents operations in the electronic sort process. Namely, FIG. 21 shows the operation timing of an original scan (i.e., image data writing into layout memory 3406), HD storage (i.e., image data reading from layout memory 3406 and image data writing into HD 3309), HD reading (i.e., image data reading from HD 3309 and image data writing into layout memory 3406), and print (i.e., data reading from layout memory 3406 and data recording) from the top. Further, symbols T1 to T8 respectively denote periods during which the above operations are performed. For convenience of explanation, it is assumed that all the periods have an identical time interval.

Initially, the originals A, B and C shown in FIG. 20 are fed from the RDF 3180 to the platen glass 3101 and then read by the scanner 3102 in that order. Then the obtained image data are respectively written into the memory 0, the memory 1 and the memory 0 in sequence.

In the period T1, the image data of the scanned original C is written into the memory 0. Slightly later, the image data of the original C is read from the memory 0 and printed as an output C1 of the first page. That is, the image data is written into the memory 0, and at substantially the same time the image data is read and printed. Thus, it is possible to complete the printing of the first copy without waiting until all the originals are stored.

In the period T2, the image data of the original B is written into the memory 1 and printed as an output B1 of the first copy. Also, in the period T2, the image data of the original C written into the memory 0 in the period T1 is stored in the HD 3309.

As above, the image data is written by using any one of the memories, and the image data is read by using another memory, whereby it is possible to improve entire process efficiency.

Hereinafter, in the period T3, the image data of the original A is written into the memory 0 and then printed as an output Al of the first copy, and the image data of the original B is stored in the HD 3309. In the period T4, the image data of the original A is stored in the HD 3309. At this time, the printing of the first copy of the originals A, B and C and the storage of the image data of the originals A, B and C into the HD 3309 terminate.

In the periods T5 to T8, the image data of the originals A, B and C stored in the HD 3309 are read in sequence, and printed as outputs C2, B2 and A2 of the second copy. In this case, the reading and the writing are also performed simultaneously by using the memories 0 and 1.

Figure 22:
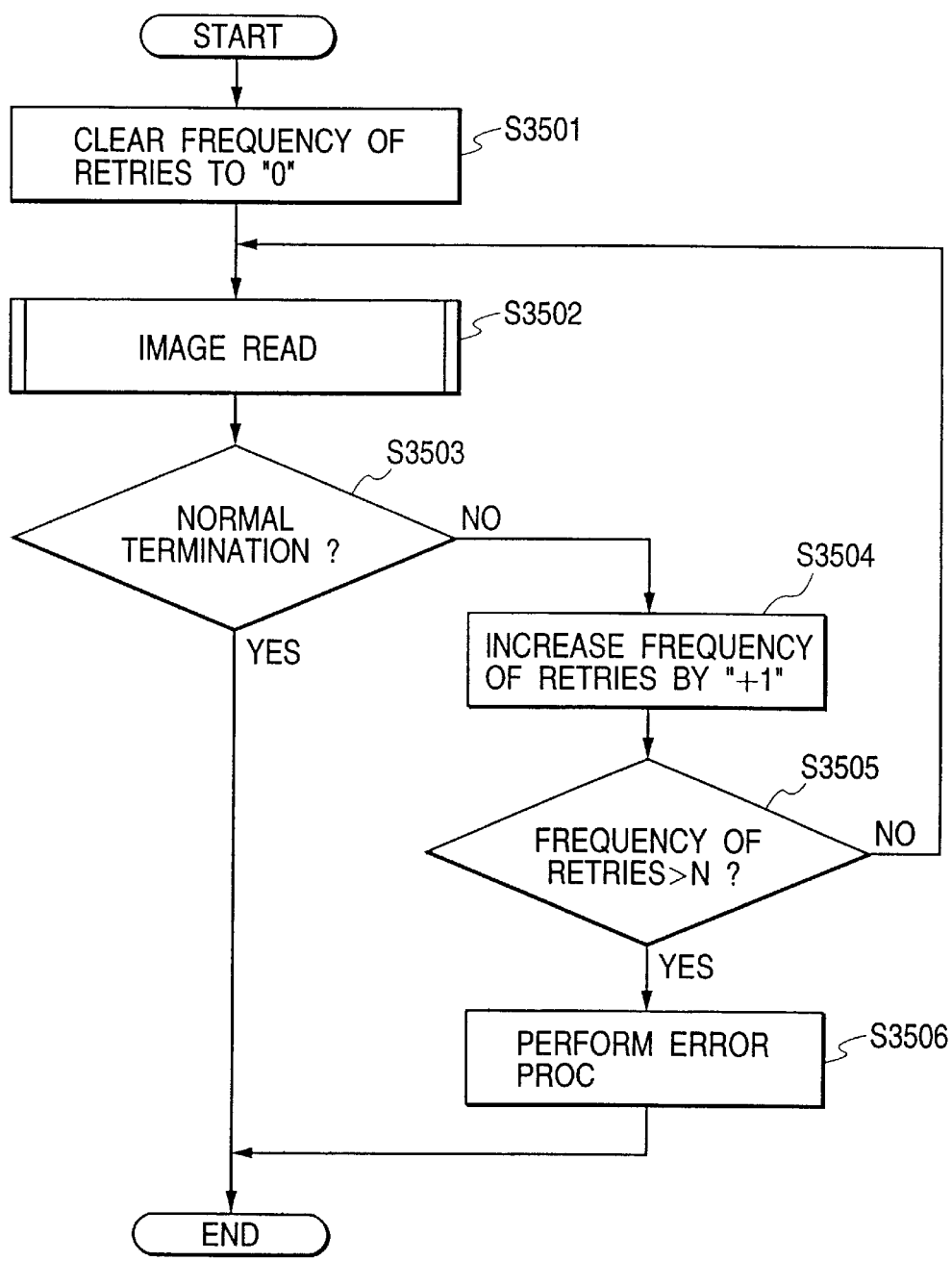
FIG. 22 is a flow chart showing an image data reading process according to the third embodiment.

FIG. 22 is a flow chart showing a procedure in a retry process which is performed if a reading error occurs in case of reading the image from the HD 3309. That is, the retry process is performed if the reading error occurs when the image data compressed and stored in the HD 3309 is read, decompressed and transferred to the layout memory 3406 in the memory control unit 3303. It should be noted that the retry process is performed by the CPU 3206 in the CPU circuit unit 3205. Hereinafter, the procedure will be explained.

The HD is accessed in the unit of so-called sector. For example, in a case where the capacity of one sector is 512 bytes and the capacity of the image data is 512 Kbytes, the image data transfer terminates after accessing the HD 1000 times.

Initially, the frequency (i.e., the number of times) of retry processes is cleared or set to zero (step S3501), and the data reading operation is performed (step S3502). Then it is judged whether or not the reading error does not occur and the reading operation normally terminates (step S3503). If judged in the step S3503 that the reading error does not occur, then the process terminates.

On the other hand, if judged that the reading error occurs, then the frequency of retry processes is increased by "+1" (step S3504). Subsequently, it is judged whether or not the frequency of retry processes exceeds a predetermined frequency "N" (e.g., five times) (step S3505). If the frequency of retry processes does not exceed "N", then the flow returns to the step S3502.

On the other hand, if the frequency of retry processes exceeds "N", the error process is performed (step S3506). In the step S3506, the data reading operation from the HD 3309 is stopped and an HD error detection flag is set.

Figure 23:
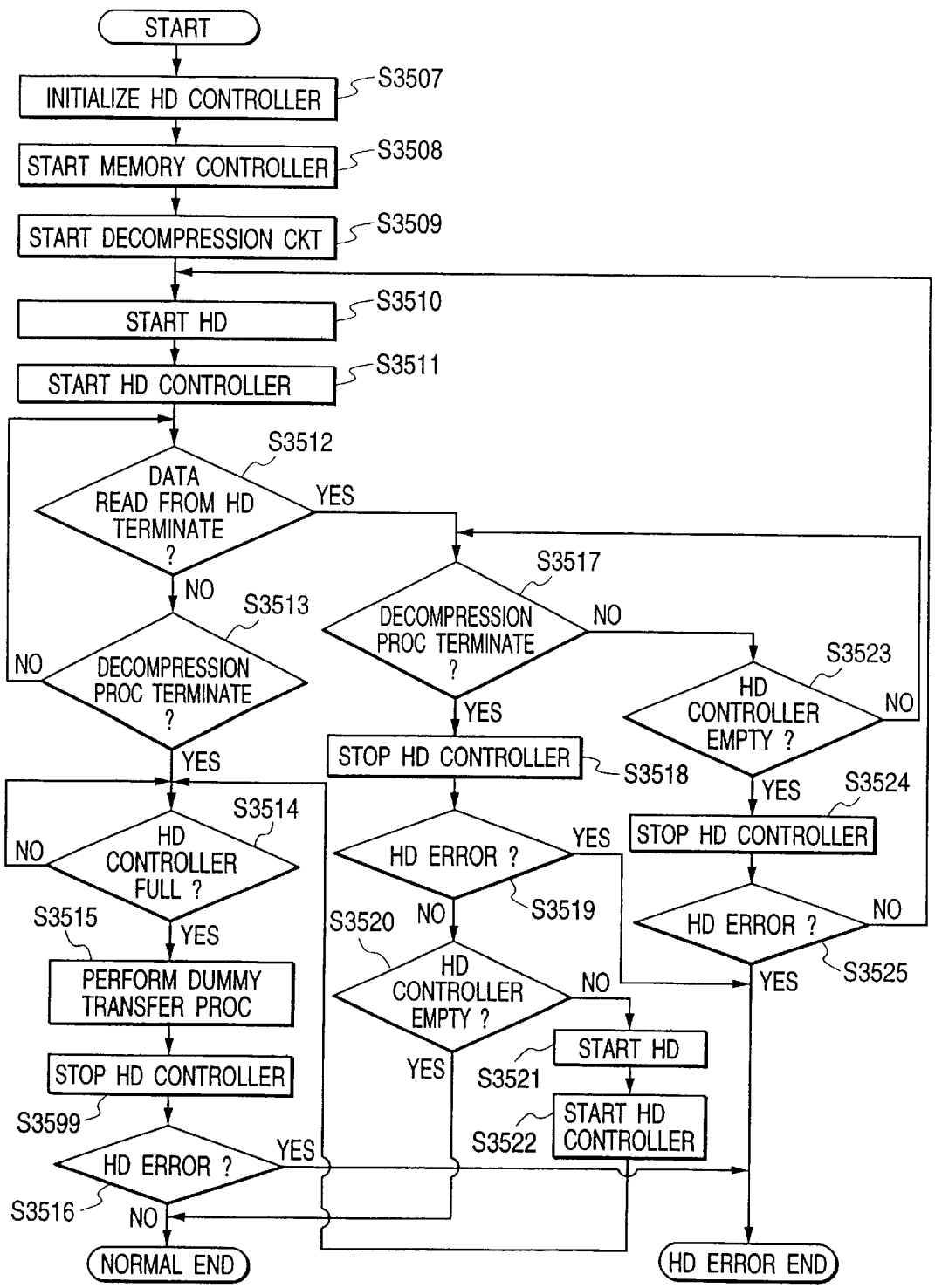
FIG. 23 is a detailed flow chart showing the image data reading process according to the third embodiment.

FIG. 23 is a flow chart showing the detailed procedure in the step S3502 of FIG. 22. Initially, the HD controller 3308 is initialized (step S3507). Then a memory controller (corresponding to control unit 3303 in FIG. 18) is started up (step S3508), and a decompression circuit (corresponding to image compression/decompression circuit 3304 in FIG. 18) is started up (step S3509).

After then, the HD 3309 is started up (step S3510), and the HD controller 3308 is also started up (step S3511). By these processes, the reading operation of the compressed image data within the HD 3309 designated by the CPU 3206 starts.

Subsequently, it is judged whether or not the image data reading from the HD 3309 terminates (step S3512). If judged in the step S3512 that the image data reading does not terminate, then it is judged whether or not a decompression process terminates (step S3513). If judged in the step S3513 that the decompression process does not terminate, then the flow returns to the step S3512.

On the other hand, if judged in the step S3512 that the image data reading from the HD terminates, then it is judged whether or not the decompression process terminates (step S3517). If judged in the step S3517 that the decompression process terminates, then the HD controller 3308 is stopped (step S3518).

If judged in the step S3517 that the decompression process does not terminate, then it is judged whether or not a first-in first-out area (FIFO) in the HD controller 3308 is empty (step S3523). If judged in the step S3523 that the FIFO is not empty, the flow returns to the step S3517.

If judged in the step S3523 that the FIFO in the HD controller 3308 is empty, then the HD controller 3308 is stopped (step S3524), and it is judged whether or not an HD error (i.e., reading error) occurs (step S3525).

If judged in the step S3525 that the HD error occurs, then it is considered that the HD error occurs, and the process terminates. On the other hand, if judged in the step S3525 that the HD error does not occur, the flow returns to the step S3510 to restart the HD 3309 for the reading process to the next sector.

If the HD controller 3308 is stopped in the step S3518, then it is judged whether or not the HD error occurs (step S3519). If judged in the step S3519 that the HD error occurs, then it is considered that the HD error occurs, and the process terminates.

On the other hand, if judged in the step S3519 that the HD error does not occur, then it is judged whether or not the FIFO in the HD controller 3308 is empty (step S3520). If judged in the step S3520 that the FIFO is empty, it is considered that all the data transfer processes normally terminate, and the process terminates.

On the other hand, if judged in the step S3520 that the FIFO in the HD controller 3308 is not empty, then the HD 3309 is started up (step S3521), and the HD controller 3308 is also started up (step S3522). After then, it is judged whether or not the FIFO in the HD controller 3308 is full of the data (step S3514). The flow repeats this process until the FIFO becomes full of the data.

If judged in the step S3514 that the FIFO in the HD controller 3308 is full of the data, then a dummy transfer process is performed (step S3515).

In the step S3515, the residual data unnecessary for the decompression process of the compressed data (i.e., residual data in one sector) is transferred. Such a process is to perform a dummy transfer of the residual data in one sector, in consideration of the fact that the HD 3309 is accessed in the unit of 512 bytes and the compressed data does not correspond to an integral multiple of one sector. The decompressed image data subjected to the dummy transfer is processed not to be written into the layout memory 3406 in the control unit 3303. Further, in this case, the image compression/decompression circuit 3304 is made through, and pseudo data having a fixed value is transferred.

If the dummy transfer process is performed in the step S3515, the HD controller 3308 is stopped (step S3599), and it is judged whether or not the HD error occurs (step S3516). If judged in the step S3516 that the HD error occurs, it is considered that the HD error occurs, and the process terminates. On the other hand, if judged that the HD error does not occur, it is considered that all the data transfer processes normally terminate, and the process terminates.

Figure 24:
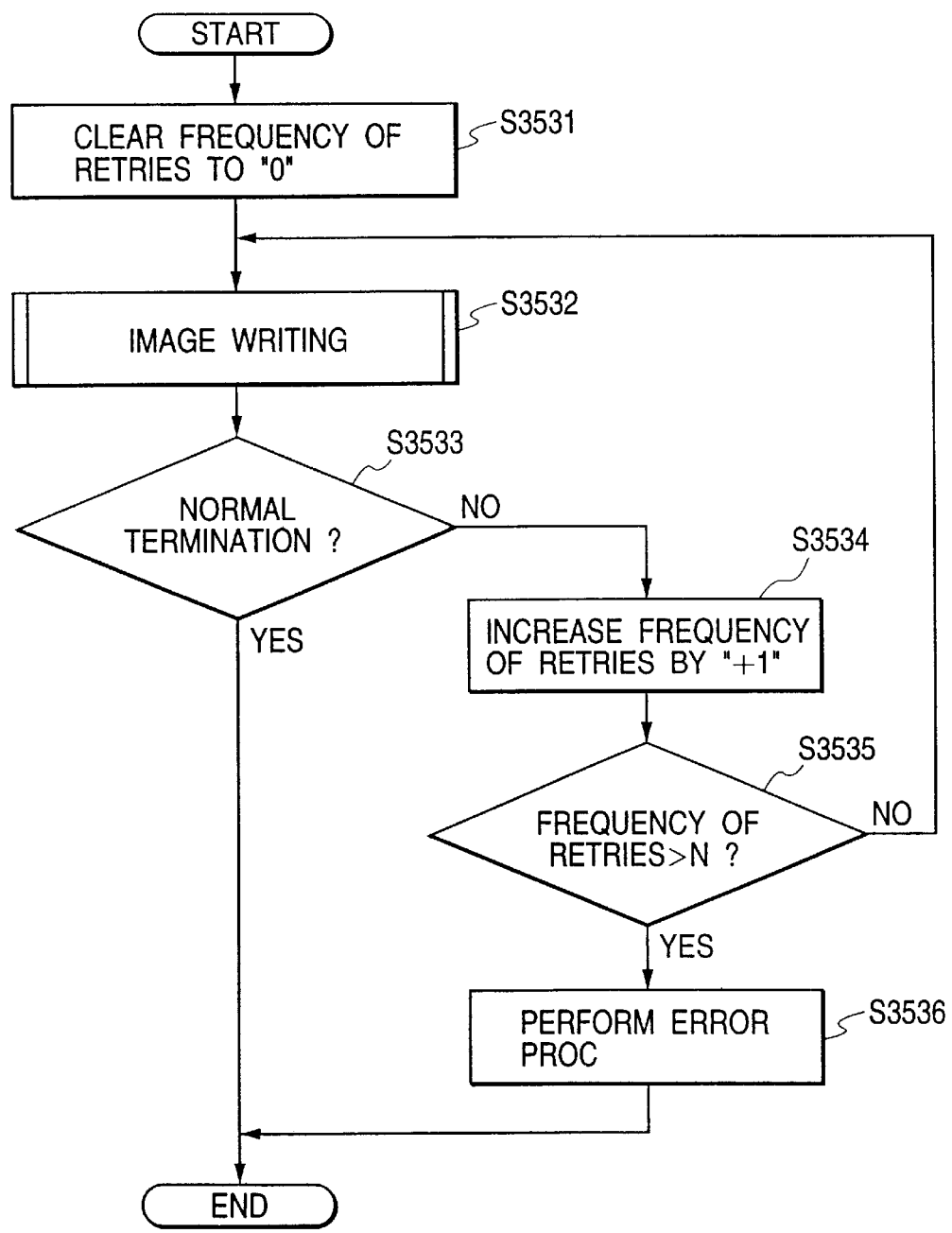
FIG. 24 is a flow chart showing an image data writing process according to the third embodiment.
Figure 25:
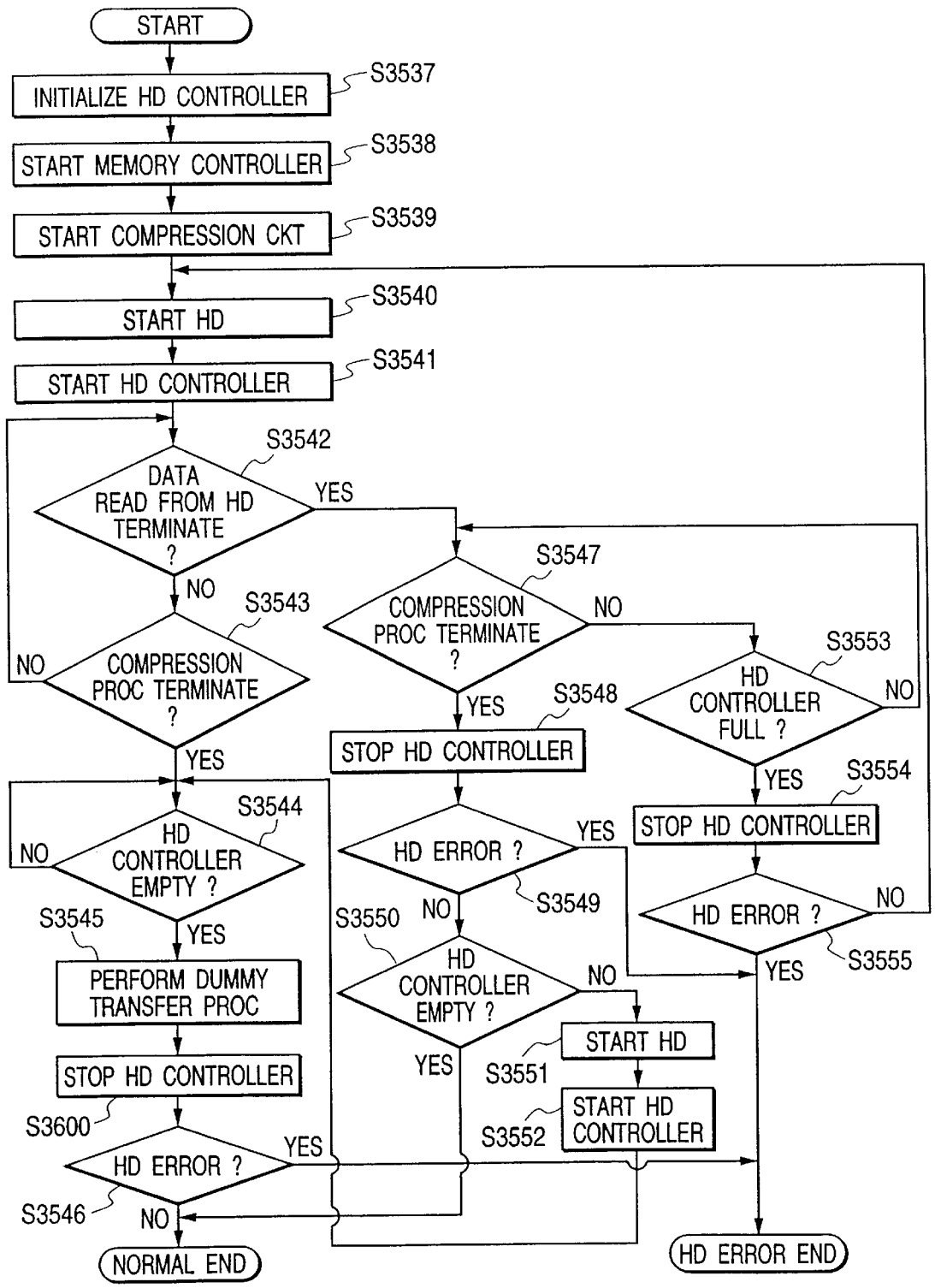
FIG. 25 is a detailed flow chart showing the image data writing process according to the third embodiment.

FIG. 24 is a flow chart for explaining the image data writing process into the HD. FIG. 25 is a detailed flow chart showing the image data writing process of FIG. 24. In the image data writing process, the image data read and stored in the layout memory 3406 of the control unit 3303 is compressed and written into the HD. It should be noted that this process is performed by the CPU 3206 in the CPU circuit unit 3205. Hereinafter, the procedure of this process will be explained.

Initially, the frequency (i.e., the number of times) of retry processes is cleared to zero (step S3531), and the data writing operation is performed (step S3532). Then it is judged whether or not the reading error does not occur and the writing operation normally terminates (step S3533). If judged in the step S3533 that the reading error does not occur, then the process terminates.

On the other hand, if judged that the reading error occurs, then the frequency of retry processes is increased by "+1" (step S3534). Subsequently, it is judged whether or not the frequency of retry processes exceeds a predetermined frequency "N" (e.g., five times) (step S3535). If the frequency of retry processes does not exceed "N", then the flow returns to the step S3532.

On the other hand, if the frequency of retry processes exceeds "N", the error process is performed (step S3536). In the step S3536, the data writing operation into the HD 3309 is stopped and the HD error detection flag is set.

FIG. 25 is the flow chart showing the detailed procedure in the step S3532 of FIG. 24. Initially, the HD controller 3308 is initialized (step S3537). Then the memory controller (corresponding to control unit 3303 in FIG. 18) is started up (step S3538), and a compression circuit (corresponding to image compression/decompression circuit 3304 in FIG. 18) is started up (step S3539).

After then, the HD 3309 is started up (step S3540), and the HD controller 3308 is also started up (step S3541). By these processes, the writing operation of the compressed image data designated by the CPU 3206 starts.

Subsequently, it is judged whether or not the image data writing into the HD 3309 terminates (step S3542). If judged in the step S3542 that the image data writing into the HD 3309 does not terminate, then it is judged whether or not the compression process terminates (step S3543). If judged in the step S3543 that the compression process does not terminate, then the flow returns to the step S3542.

On the other hand, if judged in the step S3542 that the image data writing into the HD terminates, then it is judged whether or not the compression process terminates (step S3547). If judged in the step S3547 that the compression process terminates, then the HD controller 3308 is stopped (step S3548).

If judged in the step S3547 that the compression process does not terminate, then it is judged whether or not the FIFO in the HD controller 3308 is full of the data (FULL) (step S3553). If judged in the step S3553 that the FIFO is not full of the data, the flow returns to the step S3547.

If judged in the step S3553 that the FIFO in the HD controller 3308 is full of the data (FULL), then the HD controller 3308 is stopped (step S3554), and it is judged whether or not an HD error (i.e., writing error) occurs (step S3555).

If judged in the step S3555 that the HD error occurs, then it is considered that the HD error occurs, and the process terminates. On the other hand, if judged in the step S3555 that the HD error does not occur, the flow returns to the step S3540 to restart the HD 3309 for the writing process into the next sector.

If the HD controller 3308 is stopped in the step S3548, then it is judged whether or not the HD error occurs (step S3549). If judged in the step S3549 that the HD error occurs, then it is considered that the HD error occurs, and the process terminates.

On the other hand, if judged in the step S3549 that the HD error does not occur, then it is judged whether or not the FIFO in the HD controller 3308 is empty (step S3550). If judged in the step S3550 that the FIFO is empty, it is considered that all the data transfer processes normally terminate, and the process terminates.

On the other hand, if judged in the step S3550 that the FIFO in the HD controller 3308 is not empty, then the HD 3309 is started up (step S3551), and the HD controller 3308 is also started up (step S3552). After then, it is judged whether or not the FIFO in the HD controller 3308 is empty (step S3544). The flow repeats this process until the FIFO becomes empty.

If judged in the step S3544 that the FIFO in the HD controller 3308 is empty, then the dummy transfer process is performed (step S3545).

In the step S3545, the data necessary after the compression process terminates (i.e., residual data in one sector) is transferred. Such a process is to perform the dummy transfer of the residual data in one sector, in consideration of the fact that the HD 3309 is accessed in the unit of 512 bytes and the compressed data does not correspond to an integral multiple of one sector. In this case, the image compression/decompression circuit 3304 is made through, and pseudo data having a fixed value is transferred.

If the dummy transfer process is performed in the step S3545, the HD controller 3308 is stopped (step S3600), and it is judged whether or not the HD error occurs (step S3546). If judged in the step S3546 that the HD error occurs, it is considered that the HD error occurs, and the process terminates. On the other hand, if judged that the HD error does not occur, it is considered that all the data transfer processes normally terminate, and the process terminates.

Normally, the disk of the HD is divided into about 16 to 20 areas according to its recording density, and each zone is called a zone. The access speed (i.e., data reading or writing speed to HD) of each zone differs from others, and the access speed in one zone is constant. Further, each zone is divided into plural sectors, and each sector is used as the minimum unit for the data reading and writing. That is, the HD is accessed in the unit of sector. For example, in a case where the capacity of one sector is 512 bytes and the capacity of the image data is 512 Kbytes, the image data transfer terminates after accessing the HD 1000 times.

In a zone bit recording system, the quantity of the data stored at the outer circumference (i.e., zone 0 side) of the disk is made larger than that of the data stored at the inner circumference (i.e., zone 15 side) thereof. Therefore, processing speed in case of accessing the outer circumference is higher than that in case of accessing the inner circumference.

Figures 26, 27:
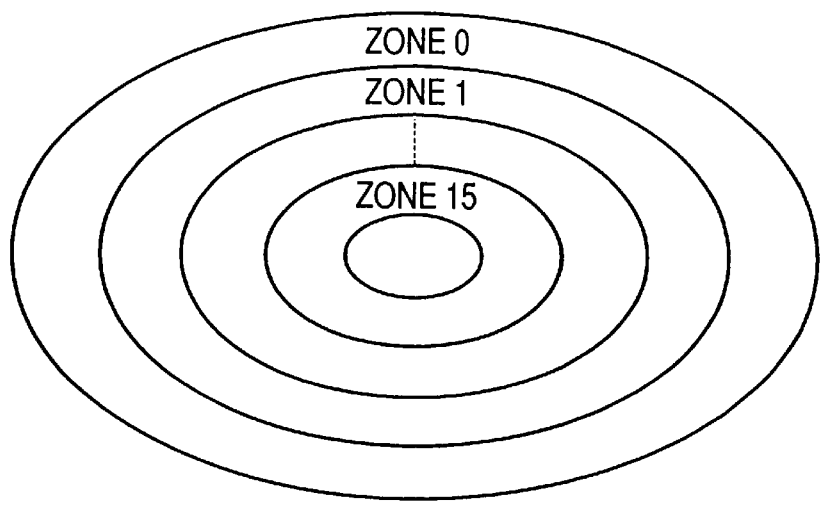
FIG. 26 is a view showing relation between a disk face and zones of an HD according to the third embodiment.
FIG. 27 is a view showing relation among a logical block address (LBA) mode, the disk face and the zones according to the third embodiment.

In the present embodiment, the two HD's (i.e., four disk faces) are used. FIG. 26 shows relation between the disk face and the zones on the HD 3309, and FIG. 27 shows relation among an LBA mode, the disk faces and the zones.

The LBA mode relates to a logical address, and the disk face and the zone relate to physical addresses. As shown in FIG. 27, the LBA mode (logical address) is corresponding to the disk faces and the zones (physical addresses). On the basis of the logical address set by the user, the CPU 3206 in the CPU circuit unit seeks the corresponding physical addresses, and then accesses the predetermined sector in the HD 3309.

As shown in FIG. 26, the HD 3309 is divided into the 16 zones, and these zones are allocated with zone numbers from its outer circumference toward its inter circumference in due order. It should be noted that the access speed of the outer circumference (i.e., side of smaller zone number) is higher than that of the inner circumference (i.e., side of larger zone number).

Figure 28:
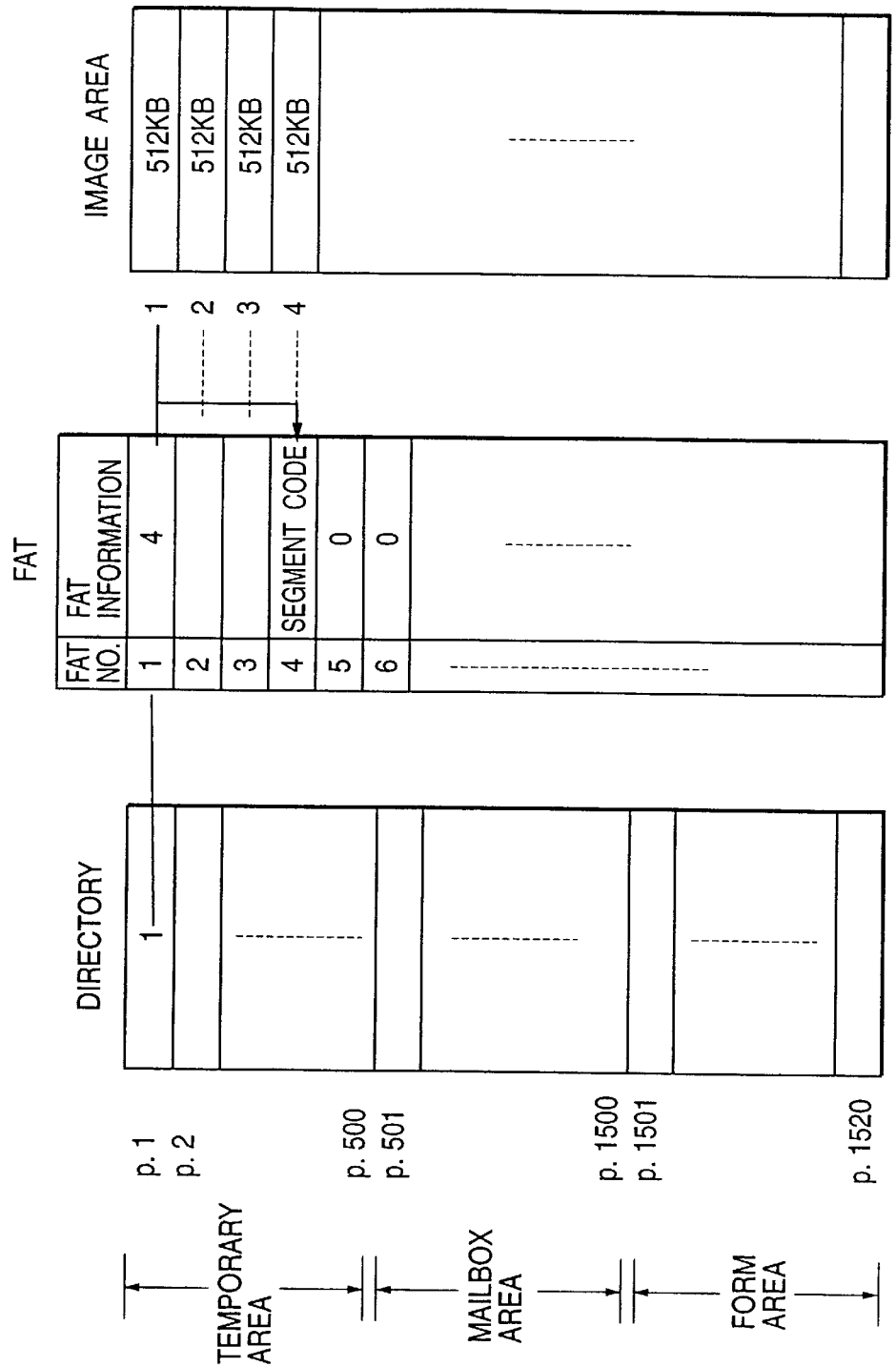
FIG. 28 is a conceptional view of the HD provided in an image storage unit according to the third embodiment.

FIG. 28 is a conceptional view of the HD 3309 provided in the image storage unit 3305. Hereinafter, image data management and an image data storage state will be explained with reference to FIG. 28.

The HD 3309 is roughly divided into three storage areas, i.e., a temporary area, a mailbox area and a form area. Each storage area is composed of plural image areas, and access speed of each storage area differs from others. In this case, it is assumed that the storage capacity of each image area is 512 Kbytes.

The temporary area temporarily stores image data used in, e.g., a pamphlet operation which performs electronic sort, grouping and magazine binding. The image data stored in the temporary area is erased after a job terminates. Then the temporary area is on standby until the image data for a next job is input.

The image data stored in the temporary area is the image data which is required to be read at high speed from the HD 3309 in real time. Therefore, the temporary area is composed of the image areas of which access speeds are high.

The mailbox area stores the image data which is obtained by expanding the PDL image from the external computers 3002 or 3003. The mailbox area includes plural mailboxes, and a PIN code is set for each mailbox. The image data stored in the mailbox is read and printed according to a mailbox number and the PIN code input from the control unit 3700 of the copying machine. It should be noted that the image data in the mailbox is not erased from the HD 3309 until a manager (e.g., owner of mailbox) instructs to do so.

Since the image data stored in the mailbox area can not be read unless the owner of this mailbox inputs the PIN code, strict real time operations are not so required for the mailbox area. Namely, it is enough for the mailbox area to perform the high-speed process when the PIN code is input. For this reason, the mailbox area is composed of the image areas to which the real time operations are not required and of which access speed is high. That is, the mailbox area is composed of the image areas of which access speed is lower than that of the image area of the temporary area.

The form area stores registration images (i.e., form image) such as a table, an illustration and the like input from the scanner or the computer. The image data stored in the form area is used to be synthesized with the image data read from the temporary area or the mailbox area.

When the image data stored at the form area is used, only the form image to be synthesized may be read from the HD 3309 once. Thus, it is unnecessary to read the form image every time the form image is synthesized with the image data read from the temporary area or the mailbox area. Therefore, the real time operations are not so required for the image data which is to be stored at the form area, and the high-speed process for this data is not so required. For this reason, in the present embodiment, the form area is structured by the image areas of which access speed is lower than that of the image areas in the temporary area and the mailbox area.

The storage capacity of each of these three storage areas is changeable by the user.

A directory is the table in which information (the number of dots in X and Y directions of image, head FAT number information, resolution, density information, the number of bytes of image before/after compression, and the like) used to perform image data management in the unit of page has been stored. The directory has been stored in the RAM 3208 of the CPU circuit unit 3205 and the HD 3309.

The FAT is the table which is used to manage or control a use state of each image area in the HD 3309, and thus the FAT and each image area have one-to-one relation. The FAT controls the use state of each image area such that each image area is correlated with others and then stored. Further, the FAT stores FAT numbers so as to judge, if one image area is in use, whether or not the image data can be stored in the subsequent image area. Like the directory, also the FAT has been stored in the RAM 3208 and the HD 3309. It should be noted that, if the FAT has no value (e.g., "0"), the corresponding image area is a vacant (i.e., unused) area. In the present embodiment, it should be noted that allocation of the FAT number starts from the image area of which access speed is highest in due order.

The image data quantity of one page differs according to the original. In a case where the image data quantity of one page is large, the plural image areas are used to manage such the image data. Therefore, the FAT numbers of the image areas used for such the large-capacity one-page original are correlated with others and then stored in the FAT, as shown in FIG. 28.

Since the FAT number information of the original image data corresponding to a page "p.1" has been stored in the directory, the CPU refers to an FAT 1. The FAT number "4" has been stored in the FAT 1, and a segment code has been stored in an FAT 4. The segment code (e.g., "FFFFh") is the FAT number information of the final image area of the one-page image data composed of one or the plural image areas. It should be noted that the FAT 1 corresponds to an image area 1, and the FAT 4 corresponds to an image area 4 in the drawing.

Therefore, the image data of the page "p.1"represents that such the image data is composed of the image area 1 (FAT number "1") and the image area 4 (FAT number "4"). It should be noted that the number of image areas used for the one-page image data differs according to a characteristic of the image data to be actually stored.

The CPU 3206 in the CPU circuit unit selects in the directory the page number corresponding to the image data to be output. Then the CPU 3206 accesses the predetermined image area in the HD 3309 to read the necessary image data. As above, since the HD 3309 is divided into the plural image areas each having the predetermined capacity, it is possible to perform the memory management according to the image data quantity, whereby it is also possible to effectively use the memory.

Subsequently, the storage capacity of the image area per one FAT will be explained. If the storage capacity of the image area per one FAT is small, utilization efficiency of the entire HD is high. However, in this case, the number of FAT's is large. Thus, when the quantity of the image data to be stored is large, since the number of image areas to be used is also large, high speed access is difficult.

On the other hand, if the storage capacity of the image area per one FAT is large, utilization efficiency of the entire HD is low. However, in this case, since the number of FAT's is small, even when the quantity of the image data to be stored is large, high speed access is possible and also compression efficiency is high.

In the present embodiment, when the A4-size original is read at resolution 600 dpi, the storage capacity of about 4 Mbytes is used. That is, the data quantity posterior to the image compression is made sufficiently smaller than 512 Kbytes on average. In consideration of the above things, the storage capacity of the image area per one FAT is set as 512 Kbytes.

Figure 29:
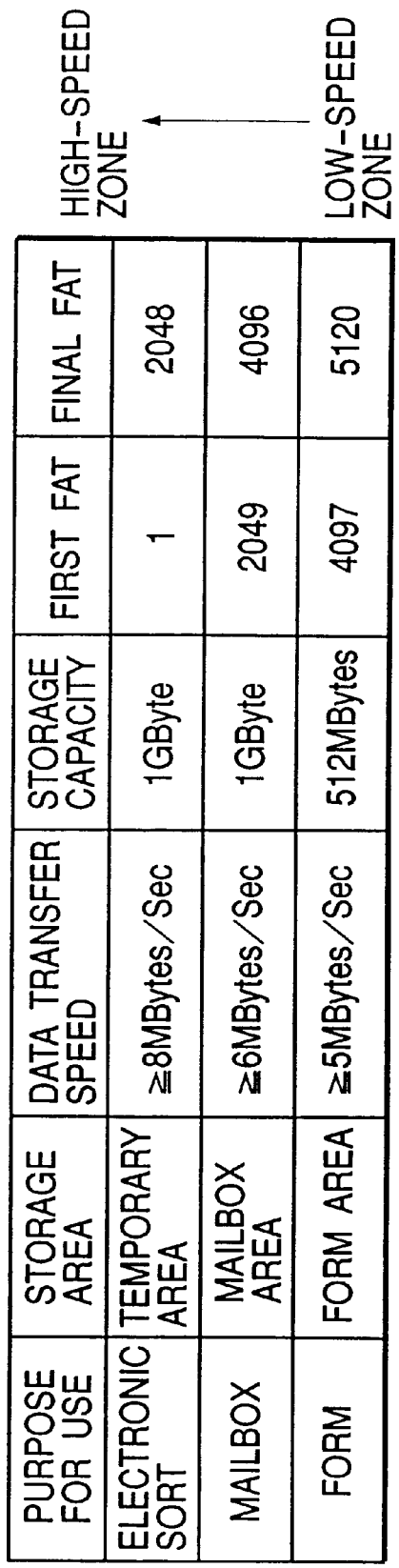
FIG. 29 is a view showing a file allocation table (FAT) management table according to the third embodiment.

FIG. 29 shows a FAT management table which indicates relation between the three storage areas (i.e., temporary area, mailbox area and form area) in the HD 3309 and the FAT explained in FIG. 28. The FAT management table has been stored in the RAM 3208 in the CPU circuit unit 3205 and the HD 3309. When the image data is stored in the HD 3309, the CPU refers to the FAT management table of FIG. 29.

In the present embodiment, the HD 3309 has the plural image areas, and access speed of each storage area differs from others. These things will be explained with reference to FIG. 29.

As described above, since the temporary area is the storage area at which the image data required to be processed in real time are stored, the image areas of which access speed is high are used in the temporary area.

In the present embodiment, the image areas of which access speed is equal to or higher than 8 Mbytes/sec are allocated to the temporary area. FIG. 29 represents that the image areas of FAT numbers "1"to "2048" are included in the temporary area. Further, since one image area has the capacity 512 Kbytes, the temporary area has the storage capacity of about 1 Gbyte.

Since the mailbox area is the storage area at which the image data not so required to be processed in real time are stored, the image areas of which access speed is lower than that of the image areas allocated to the temporary area are used in the mailbox area.

In the present embodiment, the image areas of which access speed is equal to or higher than 6 Mbytes/sec is allocated to the mailbox area. FIG. 29 represents that the image areas of FAT numbers "2049" to "4096" are included in this storage area. The mailbox area has the storage capacity of about 1 Gbyte. That is, in consideration of the fact that the mailbox area has the plural mailboxes and is used by a number of unparticular persons, the mailbox area has the large storage capacity.

Since the form area is also the storage area at which the image data not so required to be processed in real time are stored, the image areas of which access speed is lower than that of the image areas allocated to the temporary area are used in the form area.

In the present embodiment, the image area of which access speed is equal to or higher than 5 Mbytes/sec is allocated to the form area. FIG. 29 represents that the image areas of FAT numbers "4097" to "5120" are included in the form area. The form area has the storage capacity of about 512 Mbytes.

Subsequently, it will be explained which of the temporary, mailbox and form areas is to be used when the image data is stored in the HD 3309.

The control unit 3303 and the HD 3309 handle the data through a two-way bus. Thus, if it is required to output the data to a recording device without lowering data input speed from an input device, it is necessary to perform a reading/writing process to the data quantity of one page.

For example, in the image formation apparatus having the recording speed of 60 sheets/minute for the A4 size, it is necessary to perform the reading/writing process for the image data (4 Mbytes with no compression) of one sheet for one second. That is, the access speed necessary in the reading/writing process is 4 Mbytes/sec×2=8 Mbytes/sec. Therefore, it is necessary to perform the reading/writing process on condition that the storage area composed of the image areas of which access speed is equal to or higher than 8 Mbytes/sec is used.

If the image data has been compressed at a satisfactory compression rate, it is possible to use the storage area composed of the image areas of which access speed is rather lower (e.g., 6 Mbytes/sec). In any case, the CPU 3206 of the CPU circuit unit takes the worst value into consideration and thus determines the storage area to be used, such that the recording speed is never lowered even if any image data is processed.

As explained in FIGS. 26 and 27, the inner circumference zone of the HD 3309 is the low access speed zone, and the outer circumference zone is the high access speed zone.

Therefore, the plural image areas composing the temporary area correspond to the outer circumference zones, and the plural image areas composing the form area correspond to the inner circumference zones of which access speed is relatively low. Further, the plural image areas composing the mailbox area correspond to the zones of which access speed is lower than that of the zones used for the temporary area and higher than that of the zones used for the form area.

Figure 30:
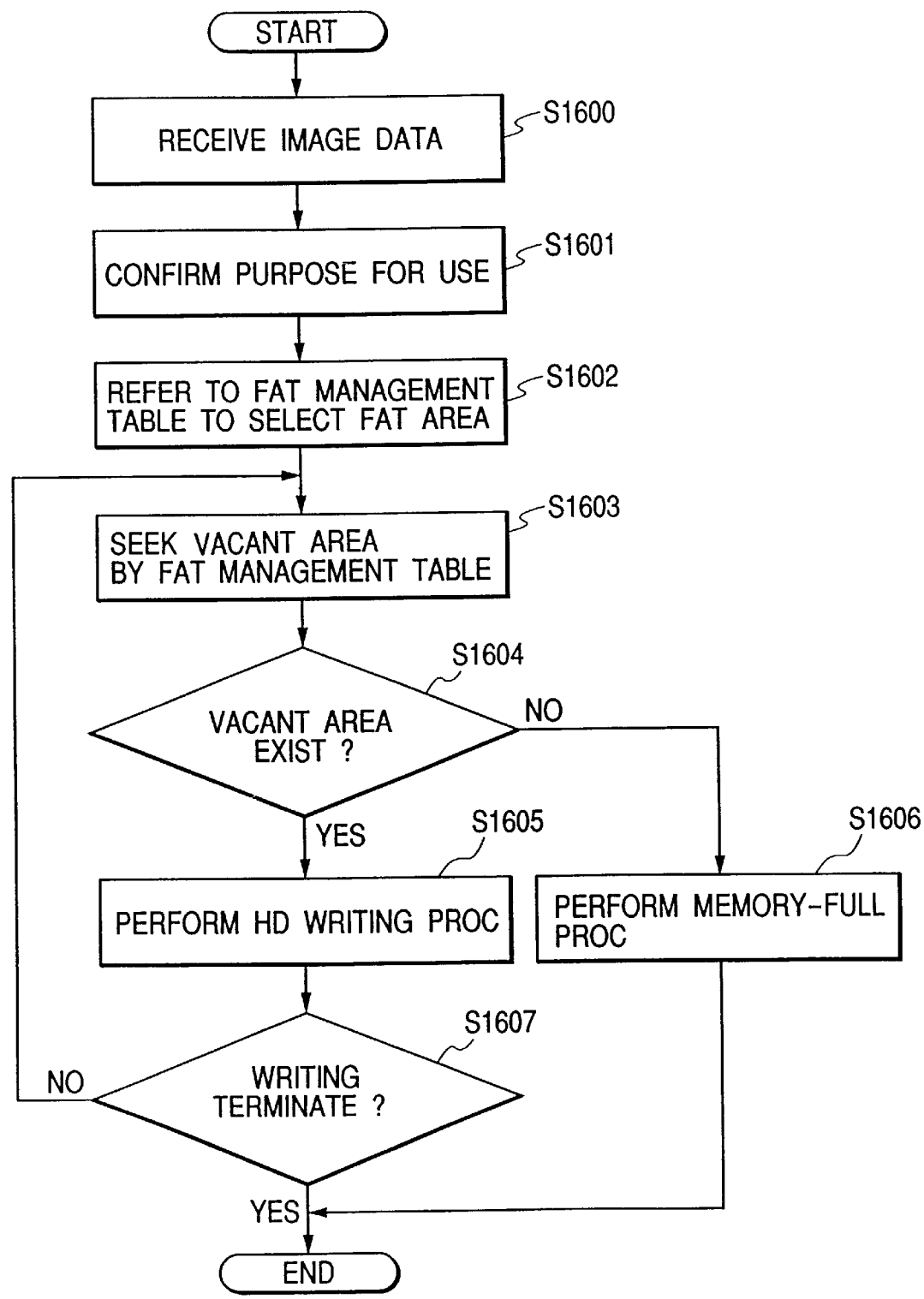
FIG. 30 is a flow chart showing a process in case of writing the image data, according to the third embodiment.

FIG. 30 is a flow chart showing the process to be performed when the image data is written into (or stored in) the HD 3309 having the plural storage areas (i.e., temporary area, mailbox area and form area) of which access speeds differ from others. This process is performed by the CPU 3206 in the CPU circuit unit every time the image data is stored in the HD 3309.

Initially, the image data to be input to the HD 3309 is received (step S1600). Then a purpose of the received data is judged or discriminated. That is, it is judged which of the temporary area (i.e., electronic sort area), the mailbox area and the form area is used to store the received image data, and then the storage area to store the image data is selected (step S1601).

In the step S1601, the purpose of the image data is discriminated from among the electronic sort process, the mailbox process and the form process. The electronic sort process is to change the output order of the image data stored in the HD 3309, the mailbox process is to maintain secrecy or concealment of the image data stored in the HD 3309, and the form process is to output the synthesis of the image data stored in the HD 3309.

The CPU 3206 refers to the FAT management table shown in FIG. 29 and thus selects the FAT areas in the storage area at which the image data is stored (step S1602). In this step, the FAT areas according to the discriminated purpose are selected.

For example, if the purpose discriminated in the step S1601 is the electronic sort process, the FAT areas of FAT numbers "1" to "20448" corresponding to the temporary area are selected. If the image data is to be stored for the mailbox process, the FAT areas of FAT numbers "2049" to "4096" corresponding to the mailbox area are selected. Further, if the image data is to be stored for the form process, the FAT areas of FAT numbers "4097" to "5120" corresponding to the form area are selected.

Then the CPU 3206 seeks the vacant image area from among the image areas corresponding to the FAT areas selected in the step S1602 (step S1603). In the step S1603, the CPU refers to the FAT management table and the FAT shown in FIG. 28 so as to seek the vacant image area (i.e., unused image area) from among the image areas corresponding to the FAT areas selected in the step S1602.

Then it is judged based on the result of the step S1603 whether or not the vacant image area exists in the selected storage area (step S1604). If judged in the step S1604 that the vacant image area exists in the selected storage area, then the image area used to store the image data is selected, and the image data is written into the HD 3309 (step S1605). Subsequently, it is judged whether or not the writing of the image data to be stored terminates (step S1607). If judged that the writing does not terminate, the flow returns to the step S1603.

The flow repeats the processes in the steps S1603 to S1605 in accordance with the quantity of the input image data. If the writing of the image data to be stored terminates, the process terminates.

On the other hand, if judged in the step S1604 that the vacant image area does not exist in the selected storage area, a memory-full process is performed (step S1606). That is, in the step S1606, the CPU displays on the operation unit the fact that the vacant image area does not exist in the selected storage area and the memory is full of data. Further, the CPU notifies the user of such the fact by sending messages to the computer.

As the other process in this step, for example, the CPU erases from the HD 3309 the image data which is inherently unnecessary or becomes unnecessary as a result of the printout operation, to release the image area. Then the CPU restarts the image input when the vacant area can be secured.

As a result of the above processes, the purpose of the image data to be input to the HD 3309 having the plural storage areas of which access speeds differ from other is discriminated, the storage area used to store the image data is selected according to the discriminated purpose, and then the image data is actually stored in the selected storage area. Thus, it is possible to increase utilization efficiency of the HD 3309, perform the plural processes including the processes required to be performed in real time, and guarantee the productivity. Therefore, it is possible to derive such effects as above without using plural HD's or an HD having excessive capacity, thereby decreasing the cost.

Subsequently, the process in case of changing the capacity of each storage area will be explained.

Figure 31:
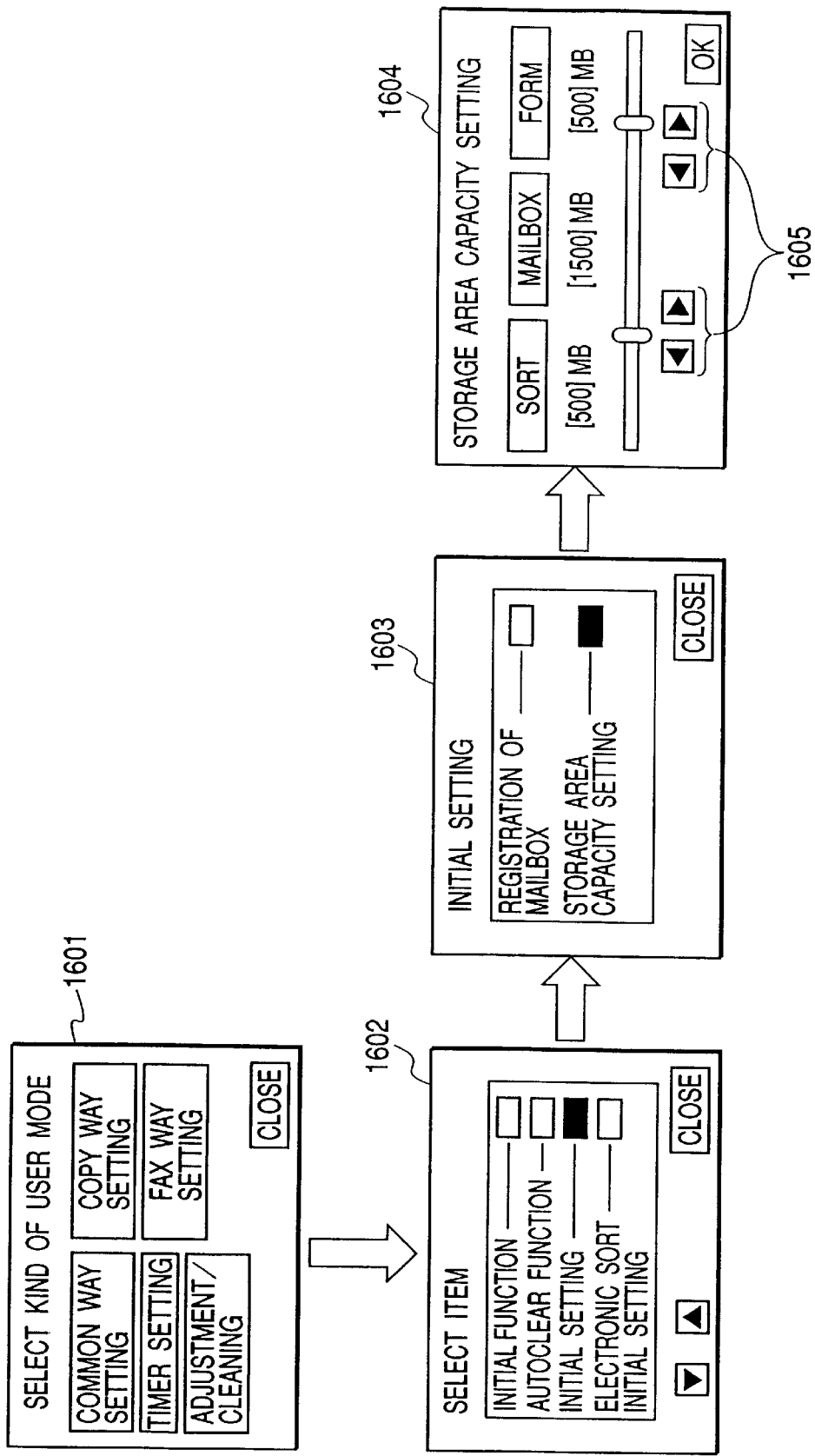
FIG. 31 is a view showing an operation unit (or console unit) of a copying machine according to the third embodiment.

FIG. 31 is a transition view showing screens displayed on the operation unit 3700 of the copying machine. The screen is composed of a liquid crystal screen and a touch panel, and the displayed contents of the screen vary according to a setting mode, thereby making detailed mode setting easy. The front of the screen acts as a touch sensor. Thus, if the user touches a displayed frame representing one function, such the function is executed.

The method in a case where the user changes the storage capacity of each storage area (temporary area, mailbox area or form area) in the HD 3309 will be explained with reference to FIG. 31. A screen 1601 is the initial screen for selecting a user mode. That is, the user initially selects the item of common way setting on the screen 1601. A screen 1602 is the common way setting screen. The user then selects the item of initial setting on the screen 1602.

A screen 1603 is the initial setting screen. This screen is used to register the mailbox (i.e., setting box number, password and box name) or enter the mode for setting the storage capacity of each storage area in the HD 3309. That is, if the user selects the item of storage area capacity setting on the screen 1603, then the screen 1603 changes into a screen 1604.

The screen 1604 is the storage area capacity setting screen. The user sets the storage capacity of each storage area on this screen. That is, on the screen 1604, the item of sort corresponds to the temporary area, the item of mailbox corresponds to the mailbox area, and the item of form corresponds to the form area. It should be noted that cursor keys 1605 on the screen 1604 are used to change the storage capacity of each storage area.

For example, in a case where the large storage capacity is allocated to the mailbox area because such the area is used by a number of unparticular persons, the storage capacity of the temporary area is set as 500 Mbytes, the storage capacity of the mailbox area is set as 1500 Mbytes, and the storage capacity of the form area is set as 500 Mbytes as shown in FIG. 31.

According as the capacity of each storage area is changed by the user, the CPU 3206 of the CPU circuit unit automatically changes the correspondence of the directory, the FAT and the image area explained in FIG. 28 and the management information (information concerning image areas used by each storage area, information concerning FAT areas corresponding to image areas) in the FAT management table explained in FIG. 29. This operation of the CPU 3206 is performed every time the storage capacity of each storage area is changed by the user.

When the storage capacity of the storage area is changed, the image data stored in each storage area is handled not to be erased from the HD 3309. For example, before the image data is erased, the CPU notifies the operation unit 3700 of such a fact. Further, when the user changes the storage capacity of the storage area on the screen 1604, the movable range of the cursor keys 1605 is limited such that the image areas currently used for the other storage areas are not reduced.

Therefore, even if the user does not always observe the use condition of the HD 3309, he can easily change allocation of storage capacity to each storage area from the operation unit 3700.

In the present embodiment, the case where the storage capacity of each storage area in the HD 3309 is changed from the operation unit 3700 of the copying machine has been explained. However, the setting state data concerning the storage capacity of each storage area in the HD 3309 may be obtained at the external (i.e., distant) computer 3002 or 3003 connected to the copying machine 3100 through the network. In this case, the storage capacity of each storage area can be changed from the external computer 3002 or 3003.

Subsequently, the process in case of obtaining the storage capacity of the HD 3309 from device information of the HD 3309 and then automatically allocating the predetermined storage capacity to each storage area will be explained.

FIG. 32 shows a table concerning parameter information of 256 words which is the device information of the HD 3309. The parameter information can be obtained by an IDENTIFY DEVICE command.

The parameter information of 256 words in a buffer (not shown) is defined by such arrangements and values (hexadecimal: Hex) as shown in FIG. 32. Further, each word is added with a word number. Hereinafter, each word will be explained.

The word of word number "1" is the information concerning the number of cylinders, and represents that the value of this number is "5086" being "13DE (Hex)". The word of word number "3" is the information concerning the number of heads, and represents that the value of this number is "16" being "0100 (Hex)". The word of word number "6" is the information concerning the number of sectors per each track, and represents that the value of this number is "63" being "003F (Hex)".

Further, the words of word numbers "61" and "62"are the information concerning the total number of sectors accessible by the user, and represent that the value of this number is "5126964" being "4E3B34 (Hex)".

Among these words, the words used to set the storage area are the words of word numbers "61" and "62" being the information concerning the total number of sectors. In the present embodiment, since one sector is set as 512 bytes, the storage capacity of the HD 3309 is "5126964×512 bytes= 2625005568 bytes (about 2.6 Gbytes)".

Figure 33:
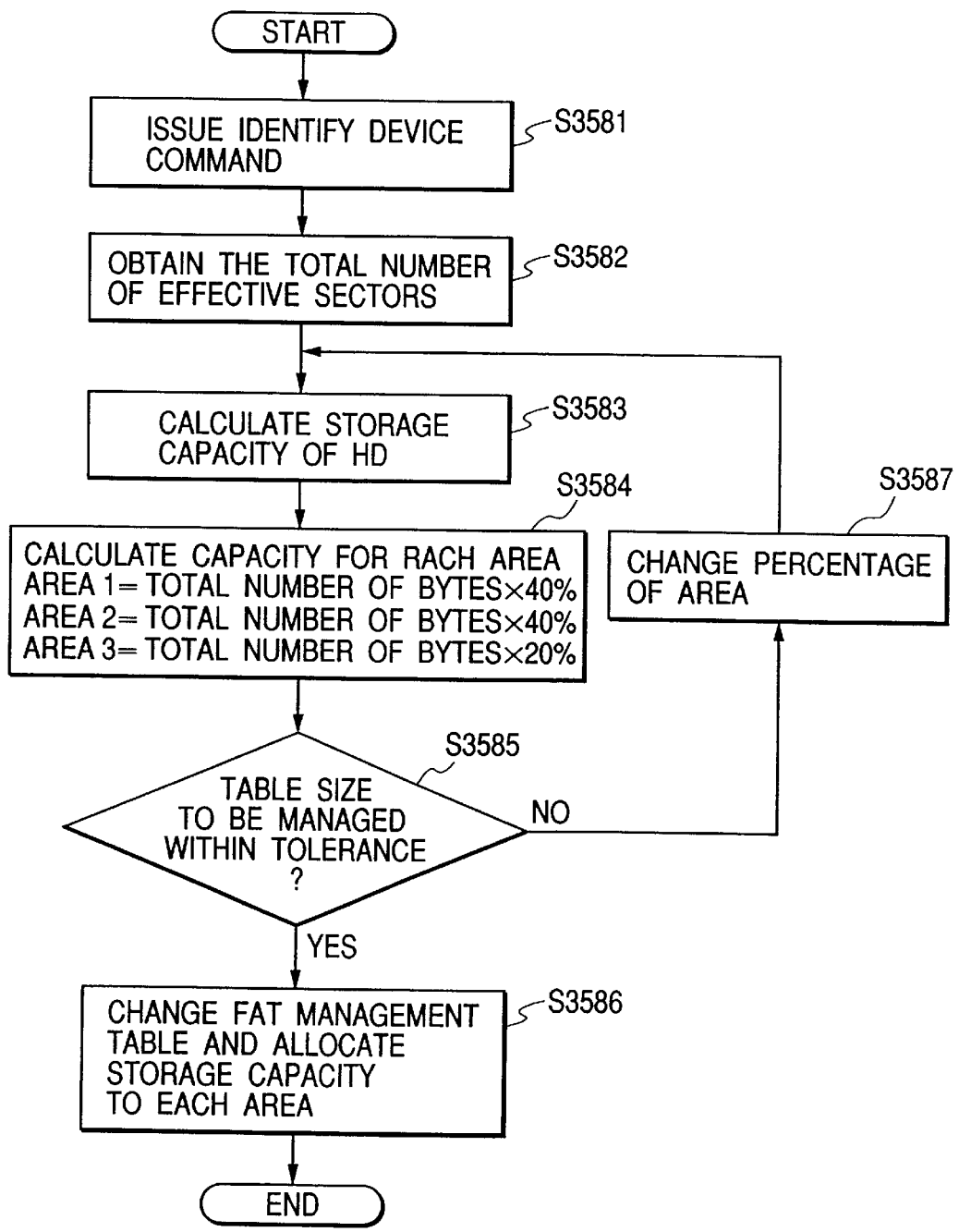
FIG. 33 is a flow chart showing a case where a predetermined storage capacity is allocated to each storage area of the HD according to the third embodiment.

FIG. 33 is a flow chart showing the process in case of automatically allocating the predetermined storage capacity to each storage area of the HD 3309. This process is automatically performed by the CPU 3206 of the CPU circuit unit every time the storage capacity of the HD 3309 is changed.

Initially, the IDENTIFY DEVICE command is read from the buffer to obtain the device information (step S3581). Then the information concerning the total number of sectors in the HD 3309 is obtained on the basis of the device information in the step S3581 (step S3582). Subsequently, the total storage capacity of the HD 3309 is calculated from the result of the step S3582 (step S3583). In the present embodiment, it is assumed that the total storage capacity of the HD is 2625005568 bytes (about 2.6 Gbytes).

Then the storage capacity of each storage area is calculated on the basis of a predetermined percentage (%) (step S3584). For example, the percentage of the storage capacity of the temporary area is set as 40% of the entire capacity, the percentage of the mailbox area is set as 40%, the percentage of the form area is set as 20%, and the storage capacity is calculated for each storage area.

Then it is judged whether or not the storage capacity of each storage area calculated in the step S3584 is within tolerance (i.e., permissible range) (step S3585). In the step S3585, it is judged for each storage area whether or not the calculated storage capacity is within the tolerance of storage capacity managed by the FAT management table.

If judged in the step S3585 that the storage capacity of each storage area is within the tolerance, then the contents of the FAT management table are changed on the basis of the process in the step S3584, and the predetermined storage capacity is allocated to each storage area (step S3586). On the other hand, if judged in the step S3585 that the storage capacity of each storage area is not within the tolerance, then the percentage of each storage area is changed (step S3587). After then, the flow returns to the step S3583.

By the above processes, the entire storage capacity of the HD is automatically calculated from the device information of the HD 3309, and the predetermined storage capacity is allocated to each storage area on the basis of the calculated result. Therefore, even if the storage capacity of the HD varies due to exchange of HD's, the user can allocate the predetermined storage capacity to each storage area without always observing and managing the use state of the HD 3309.

Although the present embodiment has been explained for the HD 3309, the present invention is not limited to this. That is, the present invention can be applied to a disk-like medium in which plural storage areas respectively having different access speeds and to which data writing and reading are performed by rotating it. For example, the present invention can be applied to a floppy disk, an optical disk, a magnetooptical disk, a CD-ROM, a CD-R or the like.

Further, in the present embodiment, the data to be stored in the storage area is the image data. However, font data used in the printer or program data may be stored in the storage area.

Further, in the present embodiment, the HD 3309 has the three storage areas of which access speeds differ from others. However, the present invention can be applied to a case where the HD has four or more storage areas of which access speeds differ from others.

For example, the temporary area may be divided into a storage area for storing the image data from the scanner, and a storage area for storing the image data from the computer 3002 or 3003. That is, the HD 3309 may be divided into the four storage areas and used according to access speed. In this case, the storage area for storing the image data from the scanner is set as the area of which access speed is highest, since the user takes out copied results immediately after he performs the copy operation at the operation unit 3700 of the copying machine.

Figure 34:
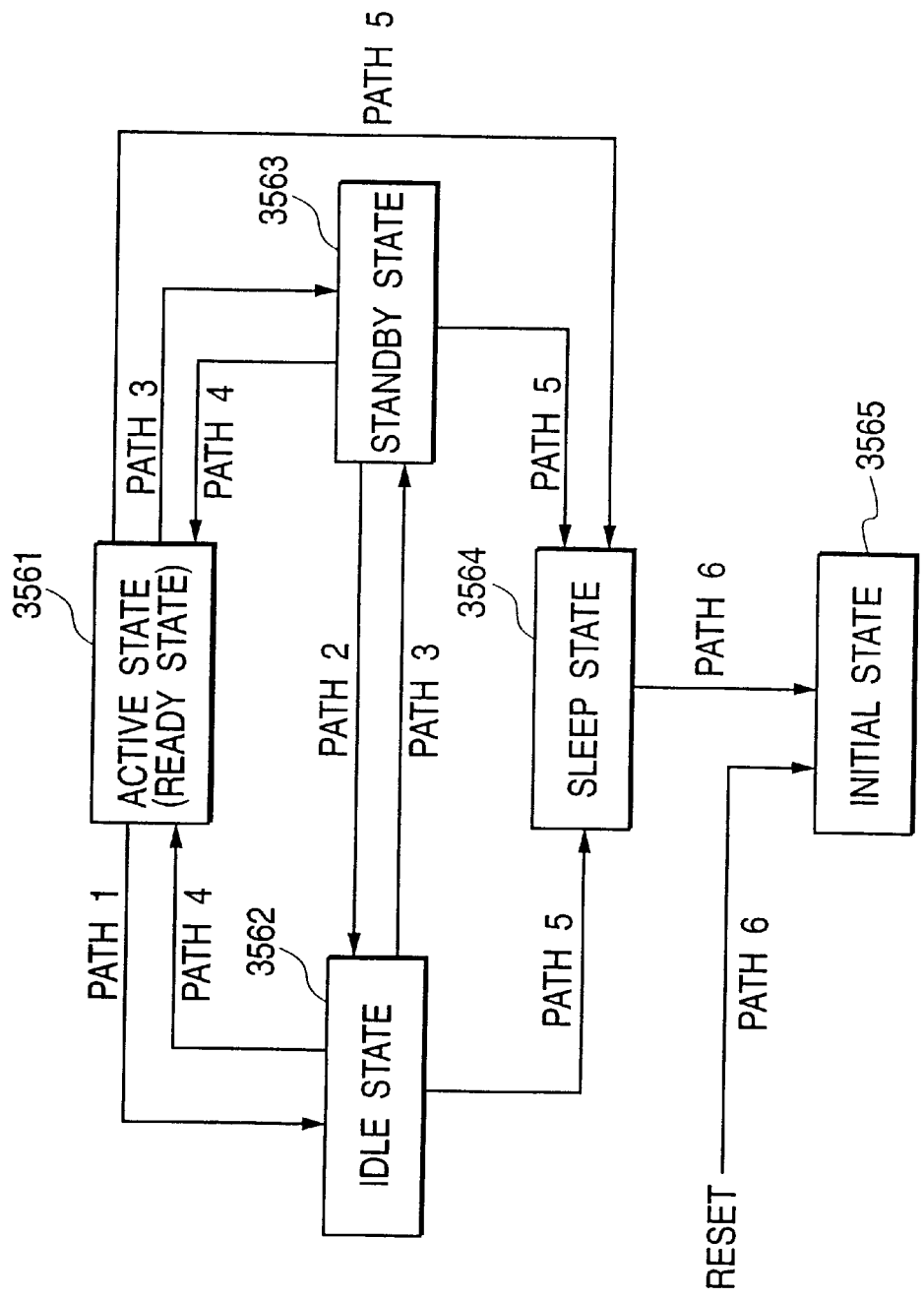
FIG. 34 is a view showing access state transition of the HD according to the third embodiment.

FIG. 34 shows access state transition of the HD 3309. Hereinafter, the state transition of a general-purpose HD will be explained by using FIG. 34.

The active state 3561 is the state that the HD is operating (i.e., being accessed). The idle state 3562 is the state that a spindle motor (not shown) for rotatively driving the HD is being driven, and thus the idle state 3562 can immediately change into the active state 3561. In the idle state 3562, it is possible to immediately start to access the HD 3309. Of course, the HD 3309 is operating in the active state 3561, whereby no time is necessary before the access to the HD 3309 starts.

The standby state 3563 is the state that the spindle motor completely stops. In order to change the standby state 3563 into the idle state 3562 or the active state 3561, it is necessary to start the stopped spindle motor.

Therefore, in the case where the standby state 3563 changes into the idle state 3562 or the active state 3561, the time (about 20 seconds) to start the spindle motor is necessary.

The sleep state 3564 is the state that the spindle motor completely stops and also a power supply stops. An initial state 3565 is the state immediately after the power supply of the body of the copying machine is turned on.

The above state transition is determined according to standardized commands concerning the HD or specifications peculiar to the HD. Subsequently, state transition paths 1, 2, 3, 4, 5 and 6 will be explained.

The path 1 which is used when the active state 3561 changes into the idle state 3562 uses an IDLE command. The path 2 which is used when the standby state 3563 changes into the idle state 3562 uses the IDLE command.

The path 3 which is used when the active state 3561 changes into the standby state 3563 or the idle state 3562 changes into the standby state 3563 uses a STANDBY command.

In the general-purpose HD, even if the STANDBY command is not used, the active state 3561 or the idle state 3562 forcedly changes into the standby state 3563 when HD access (i.e., data writing and reading to HD) is not performed for a predetermined time (e.g., 45 minutes), and thus the spindle motor for rotatively driving the HD stops.

Concretely, a standby timer (not shown) in the apparatus starts operating at the time when the access (i.e., final access) to the HD 3309 terminates, thereby stopping the spindle motor for rotatively driving the HD according as the predetermined time elapses.

The path 4 is used when the standby state 3563 changes into the active state 3561 or the idle state 3562 changes into the active state 3561. By reading access or writing access to the HD, the standby state 3563 changes into the active state 3561 or the idle state 3562. The path 5 which is used when the state changes into the sleep state 3564 uses a SLEEP command. The path 6 is used when the state changes into the initial state 3565 due to resetting.

As above, the state of the general-purpose HD forcedly changes into the standby state if the HD access is not performed for the predetermined time, whereby the spindle motor stops. Thus, when the HD access is performed in the standby state, the time (about 20 seconds) for starting the spindle motor is necessary.

Therefore, in the case where the process such as the electronic sort function in which the data are required to be processed in real time is performed by using the general-purpose HD, if the HD is in the standby state, it is impossible to immediately start the HD access, whereby process efficiency and productivity are decreased.

For this reason, in the present embodiment, dummy access is automatically performed to the HD according as a second predetermined time shorter than a first predetermined time elapses from the time when the access (i.e., final access) to the HD 3309, so as to maintain the rotation of the HD 3309.

The dummy access is to perform the access irrelative to image formation to the HD 3309. In other words, data reading or writing which does not perform any image formation is performed to the HD 3309 on the basis of an active command (e.g., reading or writing).

The first predetermined time is the period from the time when the access to the HD 3309 terminates to the time when the spindle motor stops, and the second predetermined time is the period from the time when the access to the HD 3309 terminates to the time when the dummy access is performed.

Concretely, on the basis of the first predetermined time (e.g., 45 minutes) clocked by the standby timer of the HD 3309, the CPU 3206 performs the dummy access to the HD 3309 according as the second predetermined time (e.g., 40 minutes) shorter than the first predetermined time elapses from the time when the access to the HD 3309 terminates. In the dummy access, the user can set the second predetermined time at the operation unit 3700.

In the present embodiment, since the reading process (see FIG. 23) of the HD 3309 does not so influence the entire structure of the copying machine 3100, the reading process of the HD 3309 is managed as the dummy process. When the dummy access is performed, the number of transfer bytes is set to be minimum by the CPU 3206.

Figure 35:
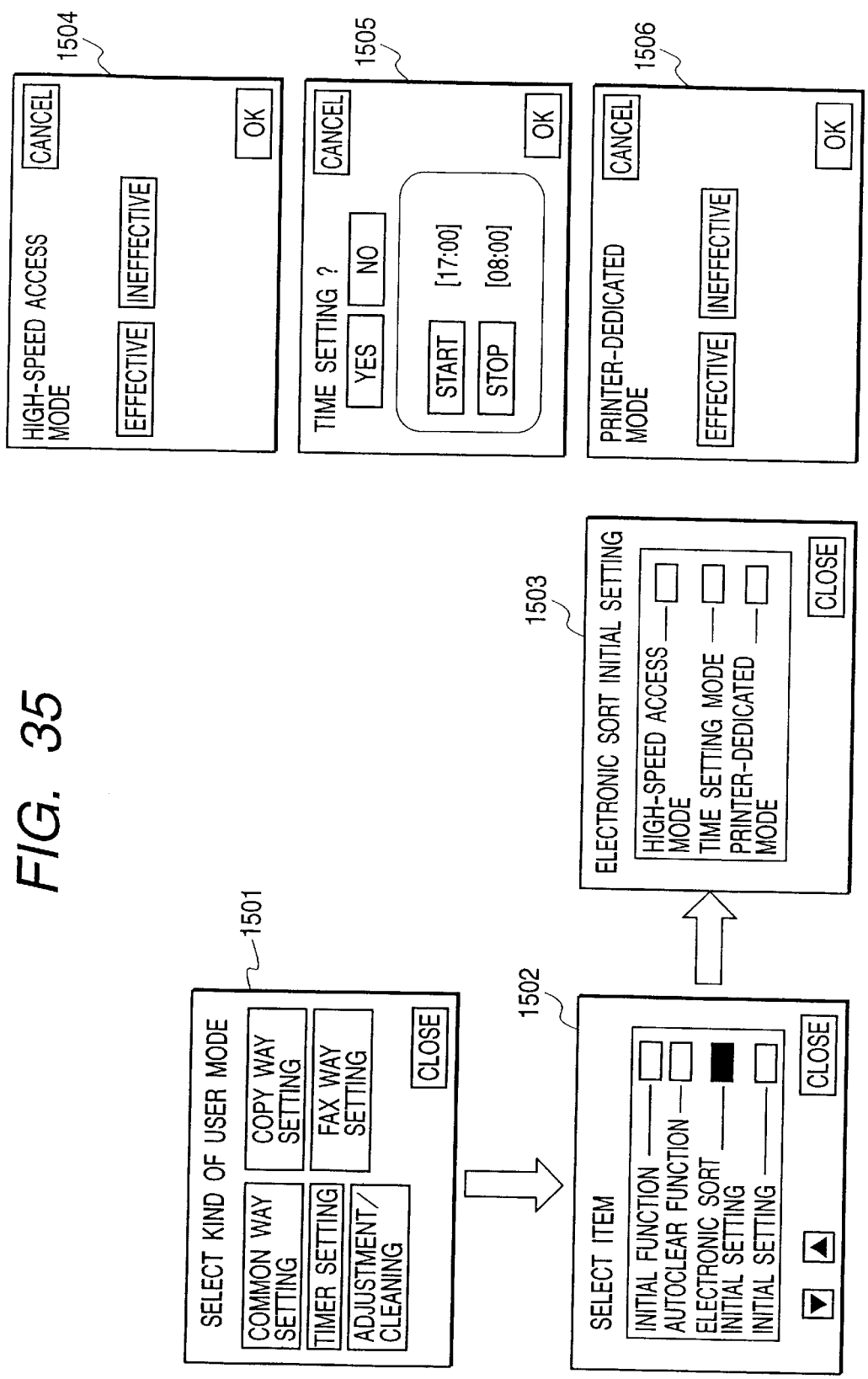
FIG. 35 is a view showing the operation unit of the copying machine according to the third embodiment.

FIG. 35 is a transition view showing screens displayed on the operation unit 3700 of the copying machine. The screen is composed of a liquid crystal screen and a touch panel, and the displayed contents of the screen change according to a setting mode, thereby making the detailed mode setting easy. The front of the screen acts as the touch sensor. Thus, if the user touches a displayed frame representing one function, such the function is executed.

The method in a case where the control of the HD access and the dummy access is made effective or ineffective or the time zone for the control is set will be explained with reference to FIG. 35. A screen 1501 is the initial screen for selecting a user mode. That is, the user initially selects the item of common way setting on the screen 1501. A screen 1502 is the common way setting screen. If the user selects the item of electronic sort initial setting on the screen 1502, the screen changes into a screen 1503.

The screen 1503 is the electronic sort initial setting screen. On this screen, a high-speed access mode, a time setting mode or a printer-dedicated mode is selected. The high-speed access mode is to perform the dummy access to the HD to always maintain the active state 3561 or the idle state 3562 (see FIG. 34), the time setting mode is not to perform the dummy access only in the designated time zone, and the printer-dedicated mode is to prohibit the dummy access.

The high-speed access mode is to maintain the state that the access to the HD 3309 can immediately start, i.e., the active state 3561 or the idle state 3562. Further, this mode is to perform the dummy access to the HD 3309 according as the second predetermined time elapses from the time when the access to the HD terminates.

The time setting mode is not to perform the dummy access to the HD 3309 but to set the standby state 3563 (see FIG. 34) only in the designated time zone, in consideration of a time zone, e.g., from five p.m. to eight a.m. (next morning) during which the frequencies of print, copy and the like are small.

The printer-dedicated mode is to use the copying machine 3100 as the printer-dedicated apparatus. In this case, since it is possible to know the print termination by a printer monitor, it is unnecessary for the user to wait the print termination in front of the machine. Therefore, in this mode, the copying machine 3100 may not perform the process such as the electronic sort function in which the data are required to be processed in real time, whereby it is unnecessary for this printer-dedicated apparatus to immediately start the access to the HD 3309. Thus, the dummy access is not performed in the printer-dedicated mode.

If the high-speed access mode is selected on the screen 1503, the screen changes into a screen 1504. If the time setting mode is selected, the screen changes into a screen 1505. If the printer-dedicated mode is selected, the screen changes into a screen 1506. Thus, it is possible to independently select the necessary operation mode.

The screen 1504 is used to select effectiveness or ineffectiveness of the high-speed access mode. If the user selects the effectiveness of the high-speed access mode on the screen 1504, the dummy access is performed according as the second predetermined time shorter than the first predetermined time clocked by the standby counter elapses from the time when the access to the HD 3309 terminates, thereby maintaining the state that the access to the HD 3309 can immediately start, i.e., the active state 3561 or the idle state 3562.

Therefore, since the spindle motor for rotatively driving the HD 3309 does not stop, the HD 3309 can be accessed at any time. Thus, it is possible to shorten user's waiting time and maintain high process speed.

The screen 1505 is used to select whether or not the time zone during which the dummy access is not performed is to be set, and to designate the time zone when the dummy access is not performed. When the time zone is designated, a start time and a stop time are respectively designated (see screen 1505). In this case, the ten key (not shown) of the operation unit 3700 is used.

The screen 1505 displays that the start time is "17:00" and the stop time is "08:00". Therefore, only in the time zone from five p.m. to eight a.m. (next morning), the dummy access is not performed even if the access to the HD 3309 is not performed for the second predetermined time, and the spindle motor of the HD 3309 stops after the first predetermined time elapses from the time when the access to the HD 3309 terminates.

The dummy access to the HD 3309 is not performed only in the designated time zone, and the state of the HD 3309 is changed into the standby state 3563 according as the first predetermined time elapses from the time when the access to the HD 3309 terminates, thereby stopping the spindle motor. By doing so, wasteful power consumption in the time zone during which the frequencies of print, copy and the like are small (i.e., in a case where the immediate access to the HD 3309 is unnecessary) is suppressed.

The screen 1506 is used to select the effectiveness or the ineffectiveness of the printer-dedicated mode. If the user selects the effectiveness on the screen 1506, the dummy access is not performed even if the second predetermined time elapses from the time when the access to the HD 3309 terminates. It is possible to confirm whether or not the copying machine 3700 is the printer-dedicated machine, by a set DIP switch (not shown) or the operation unit 3700.

In the present embodiment, the case where the effectiveness or the ineffectiveness of the dummy access is set at the operation unit 3700 of the copying machine has been explained. However, setting state data of the copying machine 3100 may be obtained at the side of the computer 3002 or 3003 through the network such that the user can set the effectiveness or the ineffectiveness of the dummy access at the computer 3002 or 3003. Further, the user may set the second predetermined time shorter than the first predetermined time (i.e., time for performing dummy access) at the operation unit 3700, on the basis of the first predetermined time clocked by the standby counter.

In a case where a reading or writing request of the image data to be used for the image formation is sent while the dummy access to the HD 3309 is being performed, the CPU immediately terminates the dummy access and performs the ordinary process such as the image formation process or the like.

Figure 36:
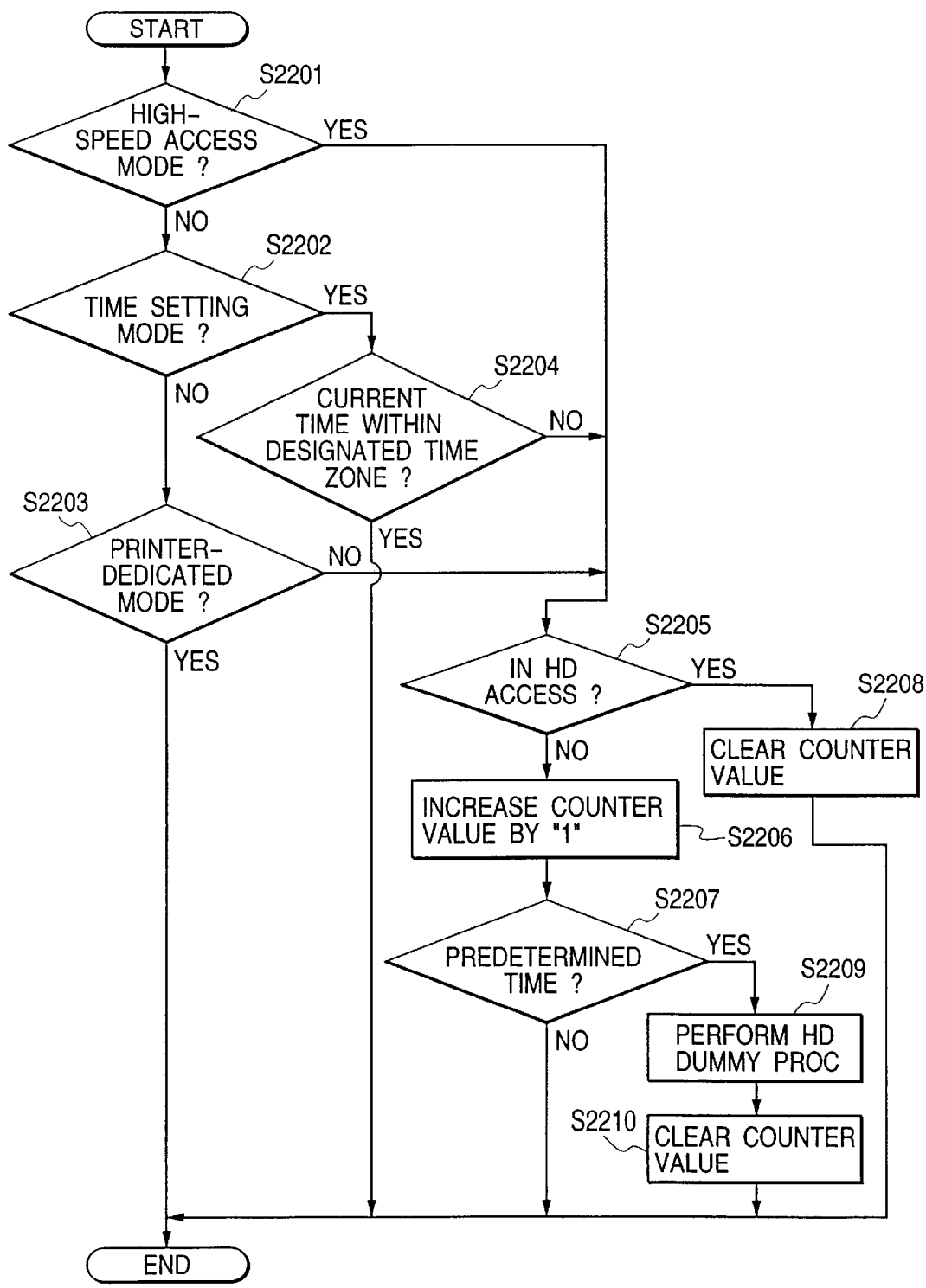
FIG. 36 is a flow chart showing a process in case of performing dummy access according to the third embodiment.

FIG. 36 is a flow chart showing the process in a case where the dummy access is performed to the HD 3309 on the basis of the setting condition of each mode (high-speed access mode, time setting mode and printer-dedicated mode) explained in FIG. 35. This process is periodically performed by the CPU 3206.

Initially, it is judged whether or not the effectiveness of the high-speed access mode is selected on the screen 1504 (step S2201). If judged in the step S2201 that the effectiveness of the high-speed access mode is not selected, then it is judged whether or not the time setting mode is selected on the screen 1505 (step S2202).

If judged in the step S2202 that the time setting mode is not selected, then it is judged whether or not the effectiveness of the printer-dedicated mode is selected on the screen 1506 (step S2203). If judged in the step S2203 that the effectiveness of the printer-dedicated mode is selected, the process terminates.

On the other hand, if judged in the step S2202 that the time setting mode is selected, then it is judged whether or not the current time is included in the time zone designated on the screen 1505 (step S2204). If judged in the step S2204 that the current time is included in the designated time zone, the process terminates without performing the dummy access.

If judged in the step S2201 that the effectiveness of the high-speed access mode is selected, or if judged in the step S2204 that the current time is not included in the designated time zone, then it is judged whether or not the HD is being accessed (step S2205). Since the spindle motor of the HD 3309 does not stop during the HD access, the HD 3309 is in the active state 3561 that the HD 3309 can be immediately accessed (see FIG. 34).

If judged in the step S2205 that the HD is being accessed, then the value of a counter for clocking the period from the time when the access to the HD 3309 terminates until the first predetermined time and the period until the second predetermined time shorten than the first predetermined time is cleared (step S2208). Then this process terminates and the HD is on standby for next dummy access. The value of the counter is used to clock the period from the time when the access to the HD 3309 terminates until the first predetermined time and the period from the time when the access to the HD 3309 terminates until the second predetermined time.

If judged in the step S2205 that the HD 3309 is not being accessed, then the counter value is increased by "1" (step S2206). Then it is judged based on the counter value obtained in the step S2206 whether or not the second predetermined time elapses from the time when the access to the HD 3309 terminates (step S2207). If judged in the step S2207 that the second predetermined time does not elapse from the time when the access to the HD 3309 terminates, the process terminates, and the HD is on standby for next dummy access.

On the other hand, if judged in the step S2207 that the second predetermined time elapses from the time when the access to the HD 3309 terminates, then the dummy access to the HD 3309 is performed (step S2209). After then, the counter value is cleared (step S2210), the process terminates, and the HD is on standby for next dummy access.

By the above processes, the dummy access to the HD 3309 is automatically performed according as the second predetermined time shorter than the first predetermined time elapses from the time when the access to the HD 3309 terminates, whereby the HD 3309 is always in the active state.

Therefore, in the case where the general-purpose HD (i.e., data writing or reading is possible to storage medium by relatively moving storage head and storage medium) to which the time is necessary for reaccess if the access is not performed for a predetermined period of time is used to perform the process such as the electronic sort function in which the data are required to be processed in real time, it is possible to immediately start the access to the HD 3309, thereby increasing process efficiency and productivity.

When the dummy access is prohibited (i.e., in time zone designated based on effectiveness of printer-dedicated mode or designated in time setting mode) and the HD 3309 is in the standby state 3563, the CPU 3206 issues the IDLE command to the HD 3309 according to the operations (setting change instruction from operation unit 3700, original mounting on document feeder (DF), opening and closing of DF, reception of REQ signal for communication DPRAM of electronic sorter from computer 3002 or 3003, and the like) in which the access to the HD 3309 is expected. Thus, the standby state 3563 is changed into the idle state 3562, whereby it may be controlled to immediately start the HD access.

Although the present embodiment has been explained with the HD, the present invention can be applied to a disk-like medium such as a floppy disk, an optical disk, a magnetooptical disk, a CD-ROM, a CD-R, a magnetic tape. Further, as a storage medium other than the disk-like medium, an optical memory card or the like can be used. That is, if data writing or reading to such the storage medium is performed by relatively moving a storage head and the medium, the present invention can be applied to such the medium.

Further, the present embodiment has been explained with the image data. However, font data used in the printer or program data may be used to derive the same effects.

Further, even if the structure for rotatively driving the HD by receiving the command from an external apparatus every predetermined time is not used, since the dummy access is automatically performed, it is possible to maintain the rotation (i.e., relative movement of storage head and storage medium) of the HD without externally receiving any command.

Further, in a case where the HD in which its state does not forcedly changes into the standby state, inquiry data of the HD may be previously obtained such that the dummy access is not performed to the ordinary HD.

In this case, the CPU confirms whether or not the used storage medium is the medium of which state forcedly changes into the standby state if the access is not performed for a predetermined time, every time the medium is mounted, and then performs the control whether the dummy access is to be performed according to the mounted storage medium.

The present invention can be applied to a system consisting of plural devices or to an apparatus comprising a single device. Further, needless to say, the present invention can be applied to a case where a storage medium storing therein program codes of software to realize the functions of the above embodiments is supplied to the system or the apparatus, and thus a computer (or CPU, MPU) in the system or the apparatus reads and executes the program codes stored in the medium.

In this case, the program codes themselves read from the storage medium realize the functions of the above embodiments. Therefore, the storage medium storing these program codes constitutes the present invention.

As the storage medium from which the program codes are supplied, e.g., a floppy disk, a hard disk, an optical disk, a magnetooptical disk, a CD-ROM, a CD-R, a magnetic tape, a non-volatile memory card, a ROM and the like can be used.

Further, needless to say, the present invention includes not only a case where the functions of the above embodiments are realized by executing the program codes read by the computer, but also a case where an OS (operating system) or the like running on the computer performs a part or all of the actual processes on the basis of instructions of the program codes and thus the functions of the above embodiments are realized by such the processes.

Further, needless to say, the present invention also includes a case where, after the program codes read from the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiments are realized by such the processes.

Figure 37:
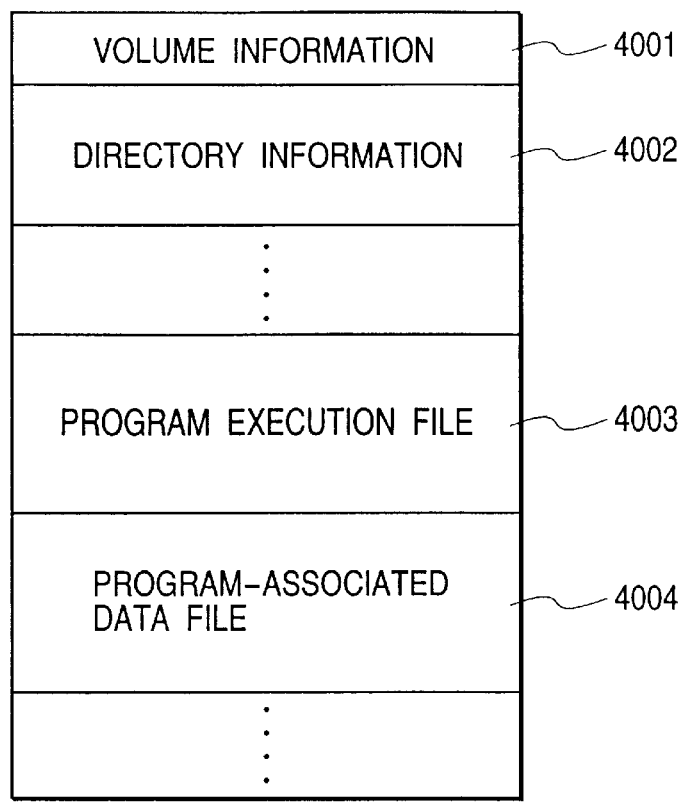
FIG. 37 is a view for explaining an example of the contents of a storage medium which has stored programs and associated data according to the present invention.

FIG. 37 is a view for explaining an example of the programs and the associated data according to the present invention which are stored in the storage medium. The stored contents of the storage medium such as a floppy disk, a CD-ROM or the like include, e.g., volume information 4001, directory information 4002, a program execution file 4003, a program-associated data file 4004 and the like. The programs used in the present invention are obtained as the program codes based on the above-described flow charts in the first, second and third embodiments.

Figure 38:
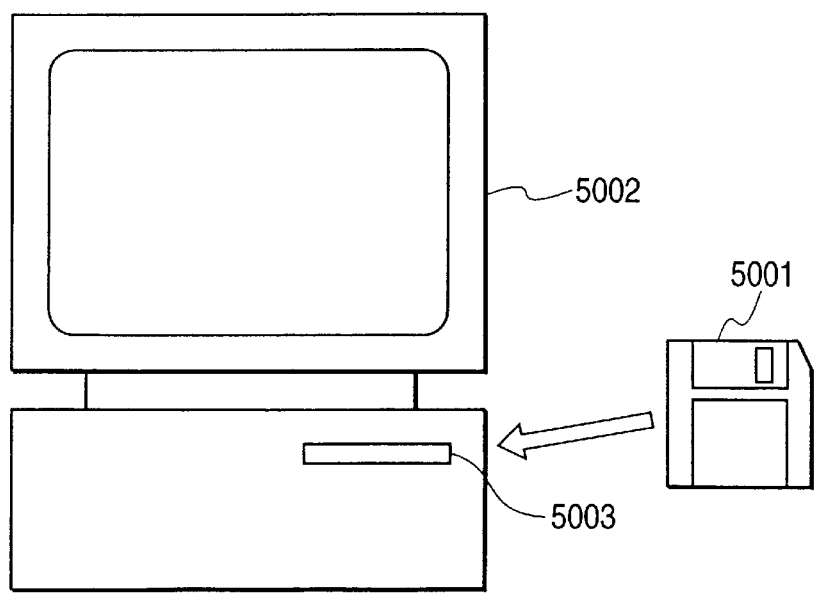
FIG. 38 is a conceptional view showing an example that the program and the associated data according to the present invention are supplied from the storage medium to the apparatus.

FIG. 38 is a conceptional view showing an example that the programs and the associated data used in the present invention are supplied from the storage medium to the apparatus. The programs and the associated data are supplied by inserting a storage medium 5001 such as a floppy disk or a CD-ROM into a slot 5003 (i.e., storage medium driver) of the body of an apparatus 5002. Then the programs and the associated data in the storage medium 5001 are once installed into the HD and then loaded into a RAM, whereby it becomes possible to execute the programs. On the other hand, it is also possible to execute the programs by directly loading the programs and the associated data from the floppy disk or the CD-ROM into the RAM without once installing them into the HD.

In the above-described first, second and third embodiments, the CPU provided in the apparatus performs the processes shown in the above flow charts on the basis of the control programs stored in the ROM. However, the present invention is not limited to this. For example, the present invention can be also realized by the operation that the programs and the associated data stored in the storage medium are directly loaded into the RAM of the apparatus and the CPU performs the above processes on the basis of the programs loaded into the RAM.

What is claimed is:

1. A data storage control apparatus comprising:

storage means having plural storage areas of which access speeds are different from others, for storing image data;

discrimination means for discriminating a purpose of the image data to be stored in said storage means; and selection means for selecting the predetermined storage area from among the plural storage areas, according to the purpose of the image data discriminated by said discrimination means, wherein it is controlled that the image data is stored at the storage area selected by said selection means.

2. An apparatus according to claim 1, wherein said storage means is a disk-like storage medium in which data writing and data reading are performed by rotating a disk, a storable data quantity of an outer periphery zone of the disk is larger than a storable data quantity of an inner periphery zone of the disk, and the outer periphery zone is the high-speed accessible zone and the inner periphery zone is the low-speed accessible zone.

3. An apparatus according to claim 1, wherein said discrimination means discriminates any of a first purpose, a second purpose and a third purpose, said first purpose is to change output order of the image data stored in said storage means, said second purpose is to hold secrecy of the image data stored in said storage means, and said third purpose is to output a synthesis of the image data stored in said storage means.

4. An apparatus according to claim 1, further comprising:

image formation means for forming an image on a sheet on the basis of the image data stored in said storage means, said storage means having a first storage area, a second storage area and a third storage area;

first control means for performing control to change output order of the image data stored in said first storage area;

password input means for inputting a password;

second control means for performing control as to whether or not the image is to be formed based on the image data stored in said second storage area, according to the password input by said password input means; and third control means for synthesizing the image data stored in said third storage area and the image data stored in said first storage area or said second storage area, and causing said image formation means to form the image based on the synthesized data, wherein said discrimination means discriminates which of said first control means, said second control means and said third control means performs the control, on the basis of the image data stored in said storage means.

5. An apparatus according to claim 1, further comprising:

change instruction input means for inputting a change instruction to change a storage capacity of each storage area in said storage means; and change means for changing the storage capacity of each storage area in said storage means, on the basis of the change instruction input by said change instruction input means.

6. An apparatus according to claim 1, further comprising:

calculation means for calculating a storage capacity of said storage means; and allocation means for allocating the predetermined storage capacity to each storage area, on the basis of the storage capacity calculated by said calculation means.

7. A data storage control method which stores image data at any of plural storage areas of which access speeds are different from others, said method comprising:

a discrimination step of discriminating a purpose of the image data; and a selection step of selecting the predetermined storage area from among the plural storage areas, according to the purpose of the image data, wherein, in said selection step, it is controlled that the image data is stored at the selected storage area.

8. A method according to claim 7, wherein the plural storage areas are included in a disk-like storage medium in which data writing and data reading are performed by rotating a disk, a storable data quantity of an outer periphery zone of the disk is larger than a storable data quantity of an inner periphery zone of the disk, and the outer periphery zone is the high-speed accessible zone and the inner periphery zone is the low-speed accessible zone.

9. A method according to claim 7, wherein, in said discrimination step, any of a first purpose, a second purpose and a third purpose is discriminated, the first purpose is to change output order of the image data stored in the storage area, the second purpose is to hold secrecy of the image data stored in the storage area, and the third purpose is to output a synthesis of the image data stored in the storage area.

10. A method according to claim 7, further comprising:

an image formation step of forming an image on a sheet on the basis of the image data stored in the storage area, the plural storage areas including a first storage area, a second storage area and a third storage area;

a first control step of performing control to change output order of the image data stored in the first storage area;

a password input step of inputting a password;

a second control step of performing control as to whether or not the image is to be formed based on the image data stored in the second storage area, according to the password input in said password input step; and a third control step of synthesizing the image data stored in the third storage area and the image data stored in the first storage area or the second storage area, and forming the image based on the synthesized data, wherein said discrimination step discriminates which of said first control step, said second control step and said third control step performs the control, on the basis of the image data to be stored in the storage area.

11. A method according to claim 7, further comprising:

a change instruction input step of inputting a change instruction to change a storage capacity of each of the plural storage areas; and a change step of changing the storage capacity of each storage area on the basis of the change instruction input in said change instruction input step.

12. A method according to claim 7, further comprising:
a calculation step of calculating a storage capacity of each of the plural storage areas; and
an allocation step of allocating the predetermined storage capacity to each storage area, on the basis of the storage capacity calculated in said calculation step.

13. A data storage control apparatus which includes storage control means for causing plural storage areas of which access speeds are different from others to store data, said apparatus comprising:
discrimination means for discriminating a purpose of the data to be stored by said data storage control apparatus; and
selection means for selecting the predetermined storage area from among the plural storage areas, according to the purpose of the data discriminated by said discrimination means,
wherein said storage control means performs the control to store the data at the storage area selected by said selection means.

14. An apparatus according to claim 13, wherein the plural storage areas are storage media respectively different from others.

15. An apparatus according to claim 13, wherein the plural storage areas are included in one storage medium.

16. A data storage control method which includes a storage control step of causing plural storage areas of which access speeds are different from others to store data, said method comprising:
a discrimination step of discriminating a purpose of the data to be stored; and
a selection step of selecting the predetermined storage area from among the plural storage areas, according to the purpose of the data discriminated in said discrimination step,
wherein said storage control step performs the control to store the data at the storage area selected in said selection step.

17. A method according to claim 16, wherein the plural storage areas are storage media respectively different from others.

18. A method according to claim 16, wherein the plural storage areas are included in one storage medium.

19. A data storage control apparatus which rotatively drives a disk-like storage medium in case of performing a data writing process or a data reading process to the storage medium, and uses storage means for stopping the rotative driving of the storage medium according as a first predetermined time elapses from a time when an access to the storage medium terminates, said apparatus comprising:
control means for performing control to perform an automatic access to the storage medium according as a second predetermined time shorter than the first predetermined time elapses from the time when the access to the storage medium terminates.

20. An apparatus according to claim 19, wherein
said storage means stores image data,
image formation means for changing output order of the image data stored in said storage means and forming an image on a sheet on the basis of the image data is provided, and
the automatic access is the access irrelative to the image formation by said image formation means.

21. An apparatus according to claim 19, further comprising:
setting means for setting a time zone in which the automatic access to the storage medium is not performed; and
clock means for recognizing a current time, and
wherein said control means performs the control to prohibit the automatic access to the storage medium in a case where the current time is included in the time zone set by said setting means, and to allow the automatic access to the storage medium in a case where the current time is not included in the time zone set by said setting means.

22. An apparatus according to claim 19, further comprising input means for inputting an access control instruction to prohibit the automatic access to the storage medium, and
wherein said control means performs the control to prohibit the automatic access to the storage medium according to the access control instruction input by said input means.

23. An apparatus according to claim 19, wherein the storage medium is a hard disk.

24. An apparatus according to claim 19, wherein the automatic access is to perform the data reading process to the storage medium.

25. A data storage control apparatus comprising:
storage means for performing an image data writing process and an image data reading process to a rotating disk-like storage medium;
driving means for rotatively driving the disk-like storage medium; and
control means for controlling said driving means to maintain the rotation of the disk-like storage medium.

26. A data storage control method comprising:
a driving step of rotatively driving a disk-like storage medium in case of performing a data writing process or a data reading process to the storage medium; and
a storage step of stopping the rotative driving of the storage medium according as a first predetermined time elapses from a time when an access to the storage medium terminates,
wherein said method further comprises a control step of performing control to perform an automatic access to the storage medium according as a second predetermined time shorter than the first predetermined time elapses from the time when the access to the storage medium terminates.

27. A method according to claim 26, wherein
said storage step stores image data,
an image formation step of changing output order of the image data stored in said storage step and forming an image on a sheet on the basis of the image data is provided, and
the automatic access is the access irrelative to the image formation in said image formation step.

28. A method according to claim 26, further comprising:
a setting step of setting a time zone in which the automatic access to the storage medium is not performed; and
a recognition step of recognizing a current time, and
wherein said control step performs the control to prohibit the automatic access to the storage medium in a case where the current time is included in the time zone set in said setting step, and to allow the automatic access to the storage medium in a case where the current time is not included in the time zone set in said setting step.

29. A method according to claim 26, further comprising an input step of inputting an access control instruction to prohibit the automatic access to the storage medium, and wherein said control step performs the control to prohibit the automatic access to the storage medium according to the access control instruction input in said input step.

30. A method according to claim 26, wherein the storage medium is a hard disk.

31. A method according to claim 26, wherein the automatic access is to perform the data reading process to the storage medium.

32. A data storage control method comprising:

a storage step of performing an image data writing process and an image data reading process to a rotating disk-like storage medium;

a driving step of rotatively driving the disk-like storage medium; and a control step of controlling said driving step to maintain the rotation of the disk-like storage medium.

33. A data storage control apparatus which uses storage means for performing a data writing process or a data reading process to a storage medium by relatively moving a storage head and the storage medium, and for stopping the relative movement according as a first predetermined time elapses from a time when an access to the storage medium terminates, said apparatus comprising:

control means for performing control to perform an automatic access to the storage medium according as a second predetermined time shorter than the first predetermined time elapses from the time when the access to the storage medium terminates.

34. An apparatus according to claim 33, wherein said storage means stores image data, image formation means for changing output order of the image data stored in said storage means and forming an image on a sheet on the basis of the image data is provided, and the automatic access is the access irrelative to the image formation by said image formation means.

35. An apparatus according to claim 33, further comprising:

setting means for setting a time zone in which the automatic access to the storage medium is not performed; and clock means for recognizing a current time, and wherein said control means performs the control to prohibit the automatic access to the storage medium in a case where the current time is included in the time zone set by said setting means, and to allow the automatic access to the storage medium in a case where the current time is not included in the time zone set by said setting means.

36. An apparatus according to claim 33, further comprising input means for inputting an access control instruction to prohibit the automatic access to the storage medium, and wherein said control means performs the control to prohibit the automatic access to the storage medium according to the access control instruction input by said input means.

37. An apparatus according to claim 33, wherein the storage medium is a hard disk.

38. An apparatus according to claim 33, wherein the automatic access is to perform the data reading process to the storage medium.

39. A data storage control method which uses a storage step of performing a data writing process or a data reading process to a storage medium by relatively moving a storage head and the storage medium, and of stopping the relative movement according as a first predetermined time elapses from a time when an access to the storage medium terminates, said method comprising:

a control step of performing control to perform an automatic access to the storage medium according as a second predetermined time shorter than the first predetermined time elapses from the time when the access to the storage medium terminates.

40. A method according to claim 39, wherein said storage step stores image data, an image formation step of changing output order of the image data stored in said storage step and forming an image on a sheet on the basis of the image data is provided, and the automatic access is the access irrelative to the image formation in said image formation step.

41. A method according to claim 39, further comprising:

a setting step of setting a time zone in which the automatic access to the storage medium is not performed; and a recognition step of recognizing a current time, and wherein said control step performs the control to prohibit the automatic access to the storage medium in a case where the current time is included in the time zone set in said setting step, and to allow the automatic access to the storage medium in a case where the current time is not included in the time zone set in said setting step.

42. A method according to claim 39, further comprising an input step of inputting an access control instruction to prohibit the automatic access to the storage medium, and wherein said control step performs the control to prohibit the automatic access to the storage medium according to the access control instruction input in said input step.

43. A method according to claim 39, wherein the storage medium is a hard disk.

44. A method according to claim 39, wherein the automatic access is to perform the data reading process to the storage medium.

45. A data storage control apparatus which comprises driving means for relatively moving a storage head and a storage medium, and uses storage means for performing a data writing process or a data reading process to the storage medium by relatively moving the storage head and the storage medium and for stopping the relative movement according as a predetermined time elapses from a time when an access to the storage medium terminates, said apparatus comprising:

control means for controlling said driving means so as to maintain the relative movement.

46. A data storage control method which comprises a driving step of relatively moving a storage head and a storage medium, and uses a storage step of performing a data writing process or a data reading process to the storage medium by relatively moving the storage head and the storage medium and of stopping the relative movement according as a predetermined time elapses from a time when an access to the storage medium terminates, said method comprising:

a control step of controlling said driving step so as to maintain the relative movement.

* * * * *

UNITED STATES PATENT AND TRADEMARK OFFICE
CERTIFICATE OF CORRECTION

PATENT NO. : 6,621,592 B1
DATED : September 16, 2003
INVENTOR(S) : Makoto Takayama et al.

It is certified that error appears in the above-identified patent and that said Letters Patent is hereby corrected as shown below:

Drawings,
SHEET 31, Figure 33, "RACH" should read -- EACH --.

Column 2,
Line 7, "once" should be deleted.

Column 15,
Line 31, "once" should be deleted.

Column 16,
Line 44, "form image" should read -- image --.

Column 23,
Line 25, "that" should be deleted.
Line 26, "such the image data" should read -- image data that --.

Column 24,
Lines 66-67, "is processed" should read -- is being processed --.

Column 31,
Line 12, "wait" should read -- wait for --.

Column 32,
Line 60, "shorten" should read -- shorter --.

Column 33,
Line 65, "HD is which its" should read -- HD's --.
Line 66, "changes" should read -- change --.

UNITED STATES PATENT AND TRADEMARK OFFICE
CERTIFICATE OF CORRECTION

PATENT NO.    : 6,621,592 B1
DATED         : September 16, 2003
INVENTOR(S)   : Makoto Takayama et al.

It is certified that error appears in the above-identified patent and that said Letters Patent is hereby corrected as shown below:

Column 34,
Line 64, "once" should be deleted.

Column 35,
Line 2, "once" should be deleted.

Signed and Sealed this

Thirtieth Day of March, 2004

JON W. DUDAS
*Acting Director of the United States Patent and Trademark Office*